(12) United States Patent
Yahata et al.

(10) Patent No.: US 8,548,298 B2
(45) Date of Patent: Oct. 1, 2013

(54) RECORDING MEDIUM, REPRODUCING DEVICE, RECORDING METHOD AND REPRODUCING METHOD

(75) Inventors: Hiroshi Yahata, Osaka (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 43 days.

(21) Appl. No.: 13/344,783

(22) Filed: Jan. 6, 2012

(65) Prior Publication Data

US 2012/0106926 A1 May 3, 2012

Related U.S. Application Data

(63) Continuation of application No. 11/910,243, filed as application No. PCT/JP2006/307442 on Apr. 7, 2006, now Pat. No. 8,116,613.

(30) Foreign Application Priority Data

| Apr. 7, 2005 | (JP) | 2005-111425 |
| Apr. 7, 2005 | (JP) | 2005-111426 |
| Apr. 7, 2005 | (JP) | 2005-111427 |
| Apr. 7, 2005 | (JP) | 2005-111428 |
| Apr. 7, 2005 | (JP) | 2005-111429 |

(51) Int. Cl.
*H04N 9/935* (2006.01)
*H04N 5/765* (2006.01)
*H04N 5/84* (2006.01)
*H04N 9/80* (2006.01)
*H04N 5/92* (2006.01)

(52) U.S. Cl.
USPC ........... 386/214; 386/200; 386/239; 386/248; 386/326; 386/332; 386/334; 386/336

(58) Field of Classification Search
USPC ................. 386/200, 214, 239, 248, 326, 332, 386/334, 336
See application file for complete search history.

(56) References Cited

U.S. PATENT DOCUMENTS 5,448,440 A 9/1995 Law et al.
6,269,063 B1 * 7/2001 Fujinami et al. ........... 369/53.44

(Continued)

FOREIGN PATENT DOCUMENTS

CN 1383679 12/2002
EP 1 020 862 7/2000

(Continued)

OTHER PUBLICATIONS

Russian Decision on Grant, with English Translation, issued in Russian Application No. 2007141173 dated Oct. 6, 2010.

(Continued)

*Primary Examiner* — Daquan Zhao
(74) *Attorney, Agent, or Firm* — Panasonic Patent Center

(57) ABSTRACT

On a BD-ROM, PlayList information is recorded. The PlayList information includes MainPath information and SubPath information. The MainPath information specifies one of a plurality of AVClips as a MainClip, and defines a primary playback section (PlayItem) on the MainClip. The SubPath information specifies, among the rest of the AVClips, one AVClip as a SubClip, and defines, on the SubClip, a secondary playback section (SubPlayItem) to be synchronized with the primary playback section. The SubPath information includes In_Time information and Out_Time information which indicate In_Time and Out_Time, respectively, of the SubPlayItem. In_Time and Out_Time of the SubPlayItem match In_Time and Out_Time of the PlayItem.

3 Claims, 43 Drawing Sheets

(56) References Cited

U.S. PATENT DOCUMENTS

| | | | |
|---|---|---|---|
| 6,701,064 B1 | 3/2004 | De Haan et al. | |
| 7,206,892 B2 * | 4/2007 | Kim et al. | 711/100 |
| 7,336,889 B2 * | 2/2008 | Seo et al. | 386/334 |
| 7,512,322 B2 | 3/2009 | Seo et al. | |
| 7,587,122 B2 * | 9/2009 | Yoo et al. | 386/248 |
| 7,616,864 B2 * | 11/2009 | Tanaka et al. | 386/239 |
| 7,639,923 B2 | 12/2009 | Ikeda et al. | |
| 7,716,584 B2 * | 5/2010 | Yahata et al. | 715/721 |
| 7,865,062 B2 | 1/2011 | Kato et al. | |
| 2002/0145702 A1 | 10/2002 | Kato et al. | |
| 2004/0151472 A1 | 8/2004 | Seo et al. | |
| 2005/0025459 A1 | 2/2005 | Kato et al. | |
| 2005/0141401 A1 | 6/2005 | Kunimatsu | |
| 2005/0286866 A1 | 12/2005 | Takakuwa et al. | |
| 2006/0114800 A1 | 6/2006 | Takakuwa et al. | |
| 2006/0245729 A1 | 11/2006 | Itoh et al. | |
| 2007/0201831 A1 | 8/2007 | Yoo et al. | |

FOREIGN PATENT DOCUMENTS

| | | |
|---|---|---|
| EP | 1198133 A1 | 4/2002 |
| EP | 1 280 348 | 1/2003 |
| EP | 1408505 A1 | 4/2004 |
| EP | 1408505 A1 * | 4/2004 |
| EP | 1 435 736 | 7/2004 |
| EP | 1 463 340 | 9/2004 |
| EP | 1 494 472 | 1/2005 |
| EP | 1524669 A1 | 4/2005 |
| JP | 8-83478 | 3/1995 |
| JP | 2002-93125 | 3/2002 |
| JP | 2002-158971 | 5/2002 |
| JP | 2003-101964 | 4/2003 |
| JP | 2004-120099 | 4/2004 |
| JP | 2004-127396 | 4/2004 |
| RU | 2233011 | 7/2004 |
| TW | 200416708 | 9/2004 |
| TW | I271721 | 1/2007 |
| WO | 03/085972 | 10/2003 |
| WO | 2004/023481 | 3/2004 |
| WO | 2004/030356 | 4/2004 |
| WO | 2004/049329 | 6/2004 |
| WO | 2005/011273 | 2/2005 |
| WO | 2005-015907 A1 | 2/2005 |
| WO | 2006-019257 A1 | 2/2006 |

OTHER PUBLICATIONS

Russian Office Action, with English Translation, issued in Russian Application No. 2007141173 dated on Jul. 22, 2010.

The Extended European Search Report issued on Sep. 14, 2009 for the corresponding EP application No. 06731388.2.

Supplementary European Search Report issued on Aug. 31, 2009 regarding the corresponding EP application No. 06731390.8.

* cited by examiner

FIG. 19A    STN_table

| number_of_video_stream_entries |
| number_of_audio_stream_entries |
| number_of_PG_stream_entries |
| number_of_IG_stream_entries |

SHOW video_streams ALLOWED TO BE PLAYED BACK IN PlayItem
- entry-attribute

SHOW Audio Streams ALLOWED TO BE PLAYED BACK IN PlayItem
- entry-attribute
- entry-attribute
- entry-attribute
- entry-attribute
- ⋮
- entry-attribute SHOW PG_streams ALLOWED TO BE PLAYED BACK IN PlayItem
- entry-attribute
- entry-attribute
- entry-attribute
- entry-attribute
- ⋮
- entry-attribute SHOW IG_streams ALLOWED TO BE PLAYED BACK IN PlayItem
- entry-attribute
- entry-attribute

FIG. 19B

| Video_format |
| frame_rate |

IN THE CASE OF Video Stream

FIG. 19C

| Stream_coding_type |
| audio_presentation_type |
| Sampling_frequency |
| audio_language_code |

IN THE CASE OF Audio Stream

FIG. 19D

| ref_to_Stream_PID_of_Main_Clip |

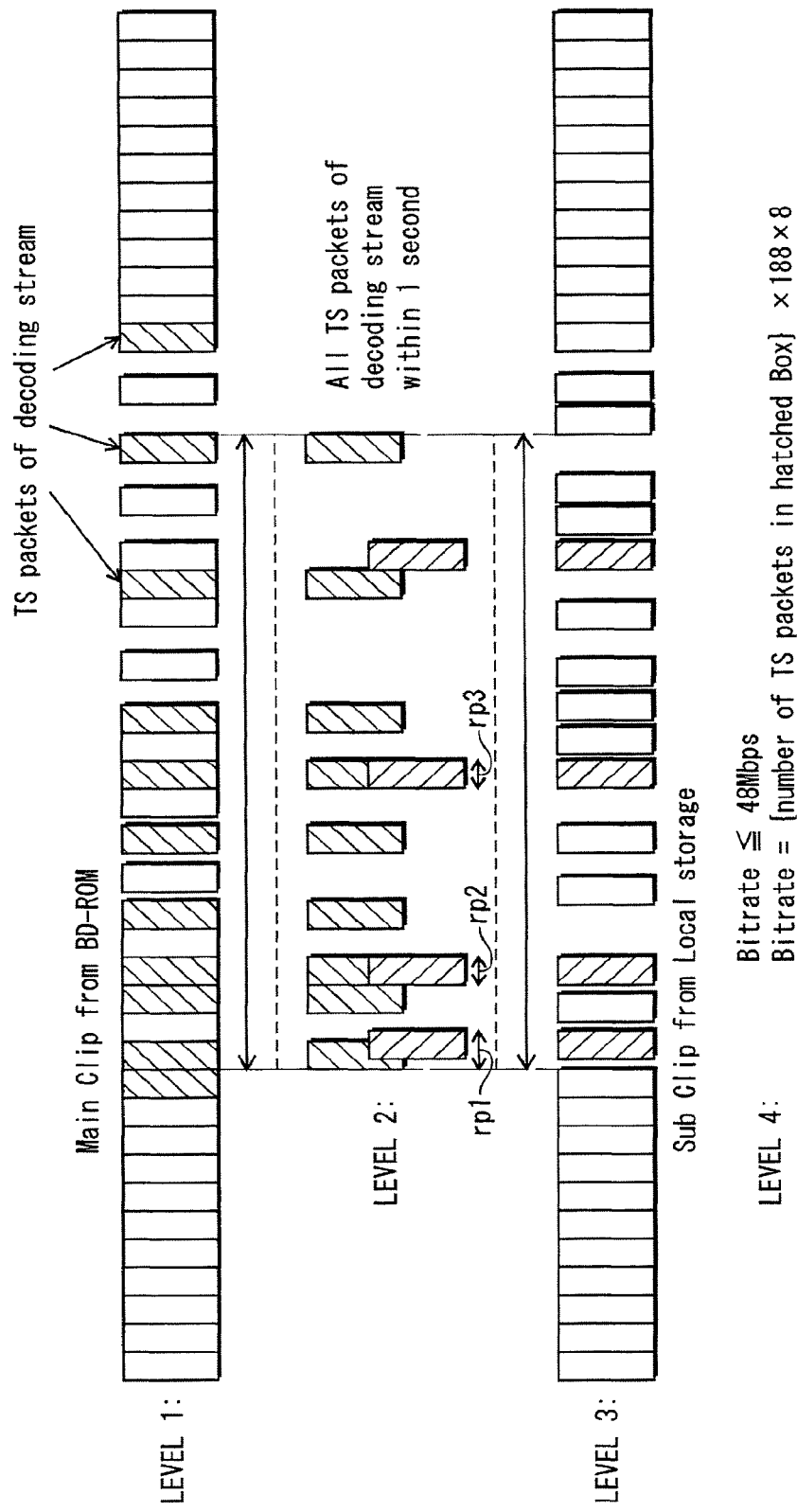

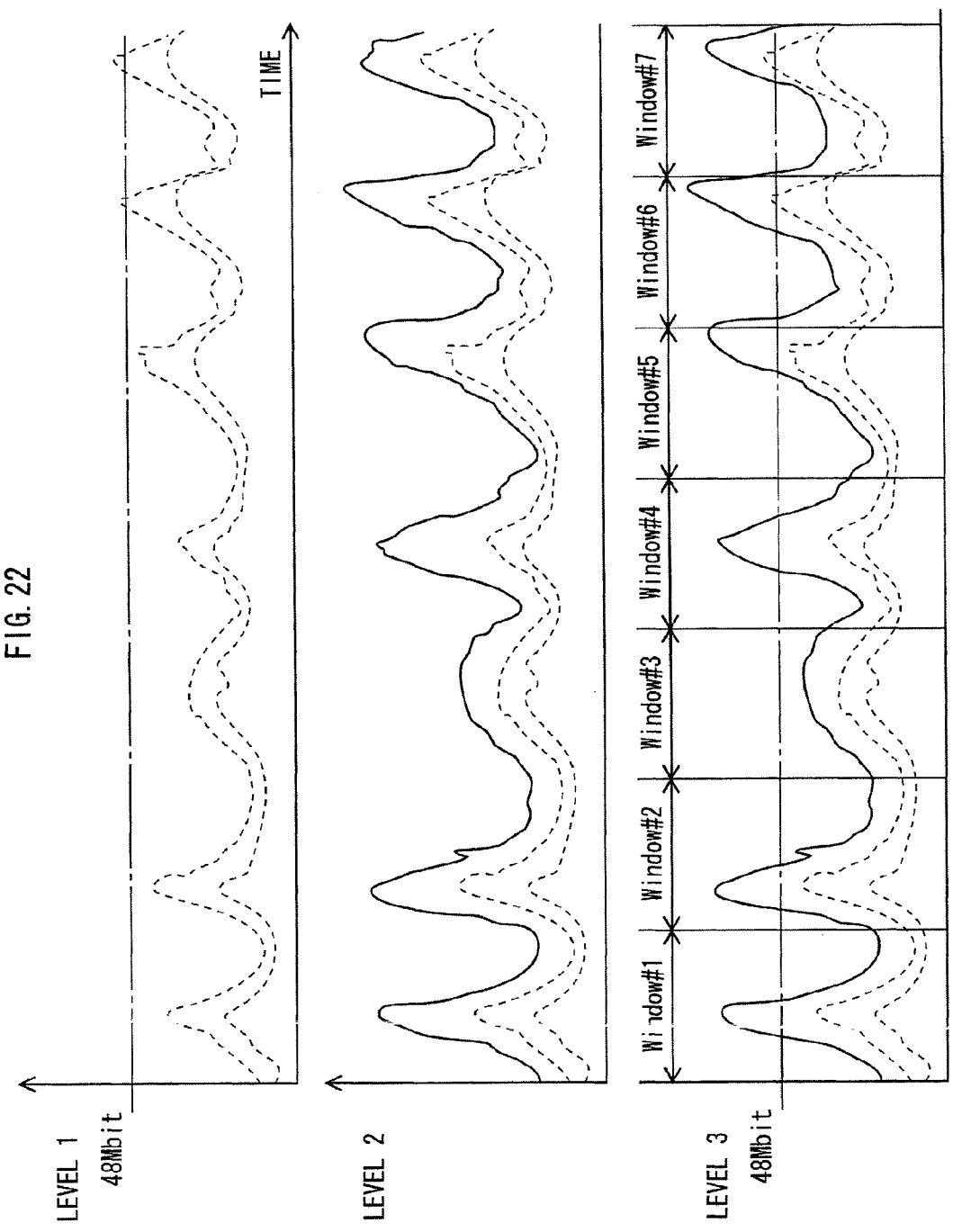

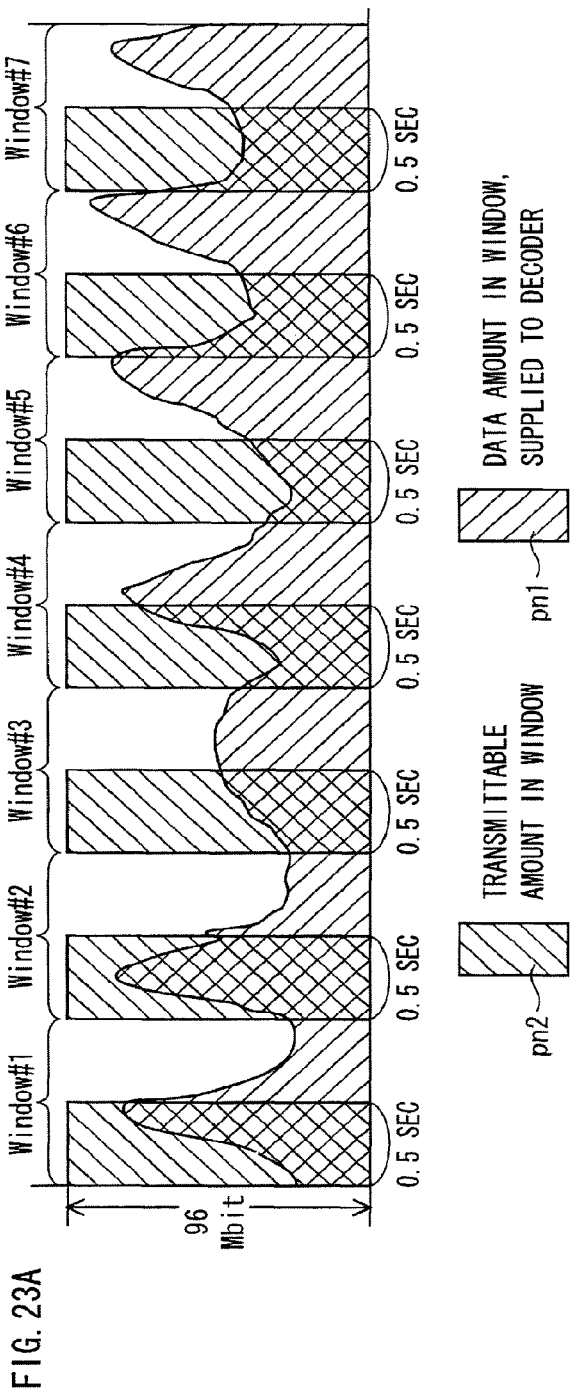
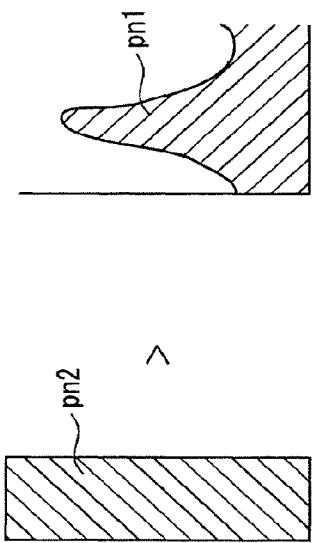
FIG. 23A
FIG. 23B

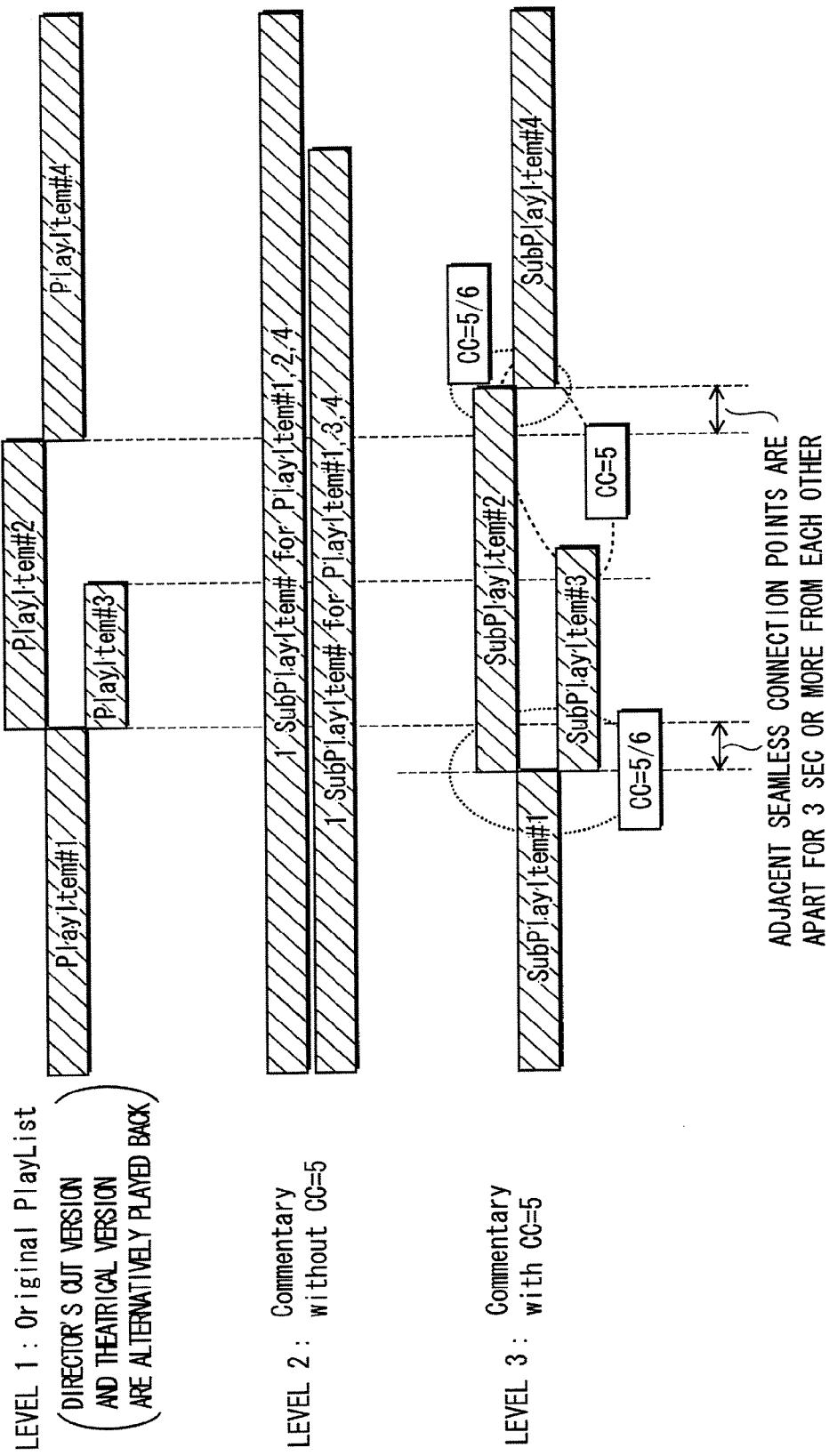

RECORDING MEDIUM, REPRODUCING DEVICE, RECORDING METHOD AND REPRODUCING METHOD

TECHNICAL FIELD

The present invention belongs to a technical field of Out-of-MUX framework.

BACKGROUND ART

The Out-of-MUX framework is a technology that simultaneously reads a digital stream recorded on a read-only recording medium, such as a BD-ROM, and a digital stream recorded on a rewritable recording medium, such as a hard disk, supplies them to a decoder, and then plays back them synchronously.

Here, assume that the digital stream recorded on a BD-ROM is a main portion of a movie while the digital stream recorded in a local storage is a commentary of the director of the movie. In this case, by realizing the above-mentioned Out-of-MUX framework, the main portion of the movie on the BD-ROM and the commentary can be played back together, which thereby improves and expands content on the BD-ROM.

The prior art regarding read-only recording media includes the following patent application.

<Patent Reference 1> Japanese Laid-Open Patent Application No. H8-83478

DISCLOSURE OF THE INVENTION

Problems that the Invention is to Solve

However, the implementation of the Out-of-MUX framework requires providing, in an apparatus, a demultiplexing unit for demultiplexing a digital stream read from a BD-ROM as well as a demultiplexing unit for demultiplexing a digital stream read from a local storage. In addition, two clock counters, each providing an STC to a corresponding demultiplexing unit, are necessary so as to cause the demultiplexing units to perform demultiplexing operations in reference to the corresponding STCs. In this case, their demultiplexing operations are independent from each other. Here, assume if there is a discontinuity in the time axis of a packet sequence that is a target of demultiplexing: one of the STCs needs to be changed so as to cause its corresponding demultiplexing unit to perform the demultiplexing operation based on the changed STC, and subsequently the second STC needs to be changed to thereby cause its corresponding demultiplexing unit to perform the demultiplexing operation based on the changed second STC.

If discontinuities are present on each time axis in an irregular manner, changes of the STCs in which a change of one STC is followed by a reset of the second STC occur repeatedly on a number of occasions. The frequent repetitions cause unnecessary complication in the control of the playback apparatus and make it difficult to implement software. The difficulty of the implementation is a factor for delaying the dissemination of playback apparatuses with a function to perform the Out-of-MUX framework and impeding a reduction in the prices of such playback apparatuses.

The present invention aims at offering a recording medium that allows a playback apparatus to perform the Out-of-MUX framework without causing difficulty in software implementation.

Means to Solve the Problem

In order to achieve the above-mentioned object, the recording medium of the present invention is characterized by that: the playlist information includes main-path information and sub-path information; the main-path information specifies, among a plurality of digital streams, two digital streams as a $1^{st}$ main stream and a $2^{nd}$ main stream, defines a primary playback section on each of the $1^{st}$ and $2^{nd}$ main streams, and includes (i) two $1^{st}$ time information pieces, one of which indicates a start point of the primary playback section of the $1^{st}$ main stream and the other of which indicates a start point of the primary playback section of the $2^{nd}$ main stream and (ii) $1^{st}$ connection information that indicates a connection state between the primary playback sections of the $1^{st}$ and $2^{nd}$ mainstreams; the sub-path information specifies, among rest of the plurality of digital streams, two digital streams as a $1^{st}$ substream and a $2^{nd}$ substream, defines a secondary playback section on each of the $1^{st}$ and $2^{nd}$ substreams, and includes (i) two $2^{nd}$ time information pieces, one of which indicates a start point of the secondary playback section of the $1^{st}$ substream and the other of which indicates a start point of the secondary playback section of the $2^{nd}$ substream and (ii) $2^{nd}$ connection information that indicates a connection state between the secondary playback sections of the $1^{st}$ and $2^{nd}$ substreams, the secondary playback sections of the $1^{st}$ and $2^{nd}$ substreams being to be synchronized with the primary playback sections of the $1^{st}$ and $2^{nd}$ main streams, respectively; and in a case where each of the $1^{st}$ and $2^{nd}$ connection information indicates a seamless connection at a same connection point, the $2^{nd}$ time information piece indicating the start point of the secondary playback section of the $2^{nd}$ substream, which is located immediately after the connection point, is equal to the $1^{st}$ time information piece indicating the start point of the primary playback section of the $2^{nd}$ main stream, which is located immediately after the connection point.

Advantageous Effects of the Invention

According to the present invention, the start point of the secondary playback section indicated by the $2^{nd}$ time information piece matches the start point of the primary playback section indicated by the $1^{st}$ time information piece. Therefore, in the case where the primary playback section is played back together with the secondary playback playback section also being played back, a discontinuity in the STC of the substream will appear at the same place as a discontinuity in the STC of the main stream is located. Since the discontinuities occur at the same point on the two STC time axes, it is possible to readily synchronize demultiplexing operations of respective demultiplexing units by resetting the demultiplexing units at this point. According to such synchronization, manufactures are able to introduce a number of playback apparatuses realizing the Out_of_MUX application into the market and disseminate them widely.

BRIEF DESCRIPTION OF THE DRAWINGS

FIG. 19A shows an internal structure of an STN_table;

FIG. 19B shows a Stream_attribute corresponding to a video stream;

FIG. 19C shows a Stream_attribute corresponding to an audio stream;

FIG. 19D shows a Stream_entry of the audio stream;

FIG. 20 shows TS packets read from a BD-ROM and from a local storage, and illustrates, of these TS packets, ones to be supplied to the decoder;

FIG. 22 is a graph showing temporal transition regarding a data amount of TS packets read from the BD-ROM as well as a data amount of TS packets read from the local storage;

FIGS. 23A and 23B show the comparison between the transmittable amount and the amount supplied to the decoder for each Window;

FIG. 43 shows an example of PlayList information making up both a theatrical version and a director's cut.

EXPLANATION OF REFERENCES

Figure 1:
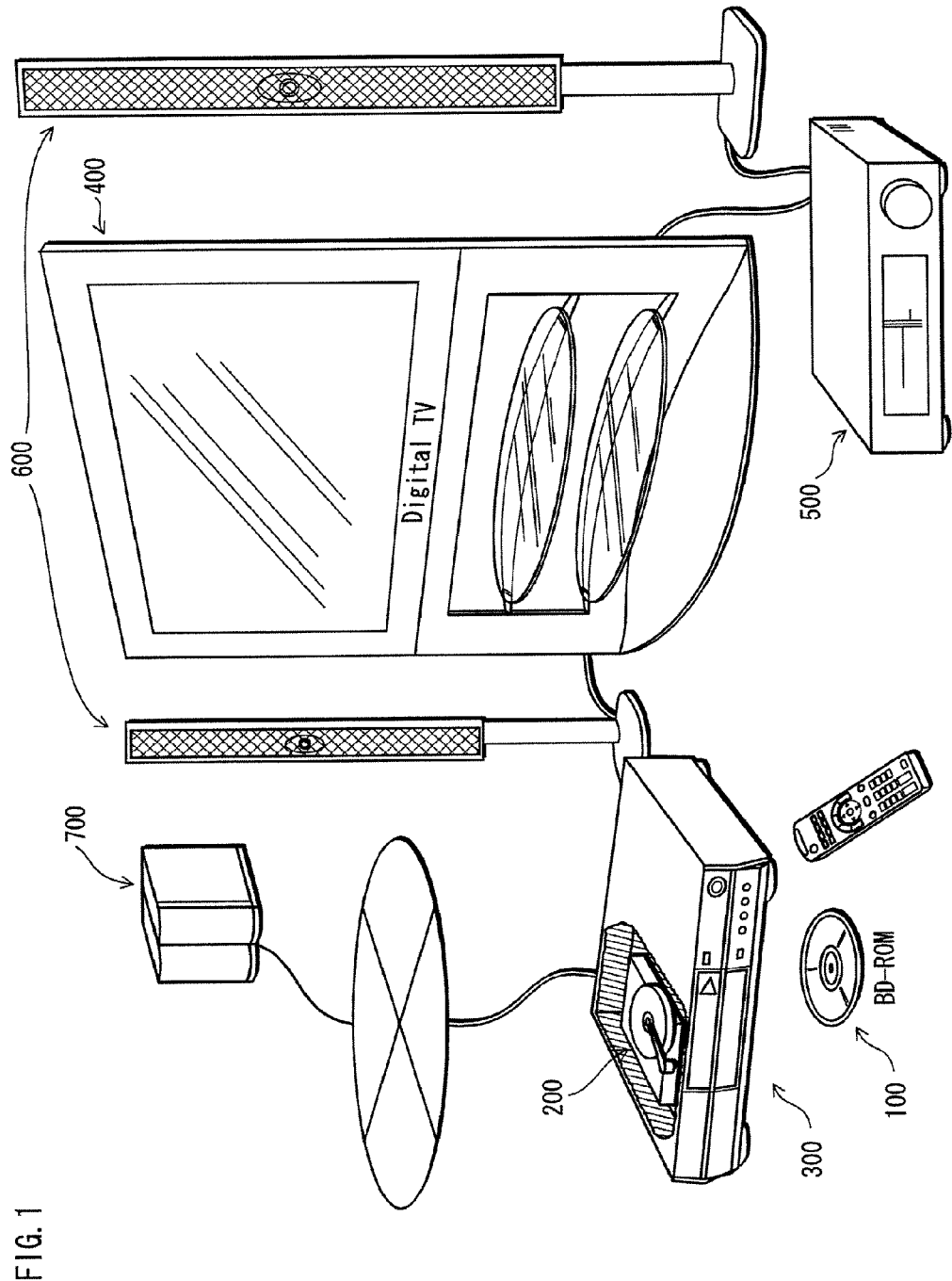
FIG. 1 shows a usage application of a recording medium according to the present invention.

1*a* BD-ROM drive
1*b, c* read buffer
1*b, a, c* ATC counter
2*a, d* source depacketizer
2*c, d* ATC counter
3*a, c* STC counter
3*b, d* PID filter
4 video decoder
5 video plane
6 transport buffer
7 elementary buffer
8 audio decoder
10*a, b, c, d* switch
11 interactive graphics decoder
12 interactive graphics plane
13 presentation graphics decoder
14 presentation graphics plane
17 synthesis unit
21 memory
22 controller
23 PSR set
24 PID conversion unit
25 network unit
26 operation receiving unit
100 BD-ROM
200 local storage
300 playback apparatus
400 television
500 AV amplifier

BEST MODE FOR CARRYING OUT THE INVENTION

Embodiment 1

The following gives an account of a preferred embodiment of a recording medium according to the present invention. First, a usage application is described in relation to the implementation of the recording medium of the present invention. FIG. 1 shows a usage application of the recording medium according to the present invention. A local storage 200 in FIG. 1 is the recording medium of the present invention. The local storage 200 is used for the purpose of supplying a movie to a home theater system composed of a playback apparatus 300, a television 400, an AV amplifier 500 and speakers 600.

The following explains a BD-ROM 100, the local storage 200 and the playback apparatus 300.

The BD-ROM 100 is a recording medium on which a movie is recorded.

The local storage 200 is a hard disk that is built in the playback apparatus, and is used for storing content distributed from a server of a movie distributor.

The playback apparatus 300 is a digital home electrical appliance supported for networks, and has a function to play the BD-ROM 100. The playback apparatus 300 is also able to download content from a server 700 of a movie distributor via a network, store the downloaded content in the local storage 200, and combine this content with content recorded on the BD-ROM 100 to expand/update the content of the BD-ROM 100. A technology called "virtual package" combines content recorded on the BD-ROM 100 with content stored in the local storage 200 and treats data not recorded on the BD-ROM 100 in the way as if it is recorded on the BD-ROM 100.

Thus concludes the description of the usage application of the recording medium of the present invention.

Next is described a production application of the recording medium of the present invention. The recording medium of the present invention can be realized as a result of improvements in the file system of a BD-ROM.

<General Description of BD-ROM>

Figure 2:
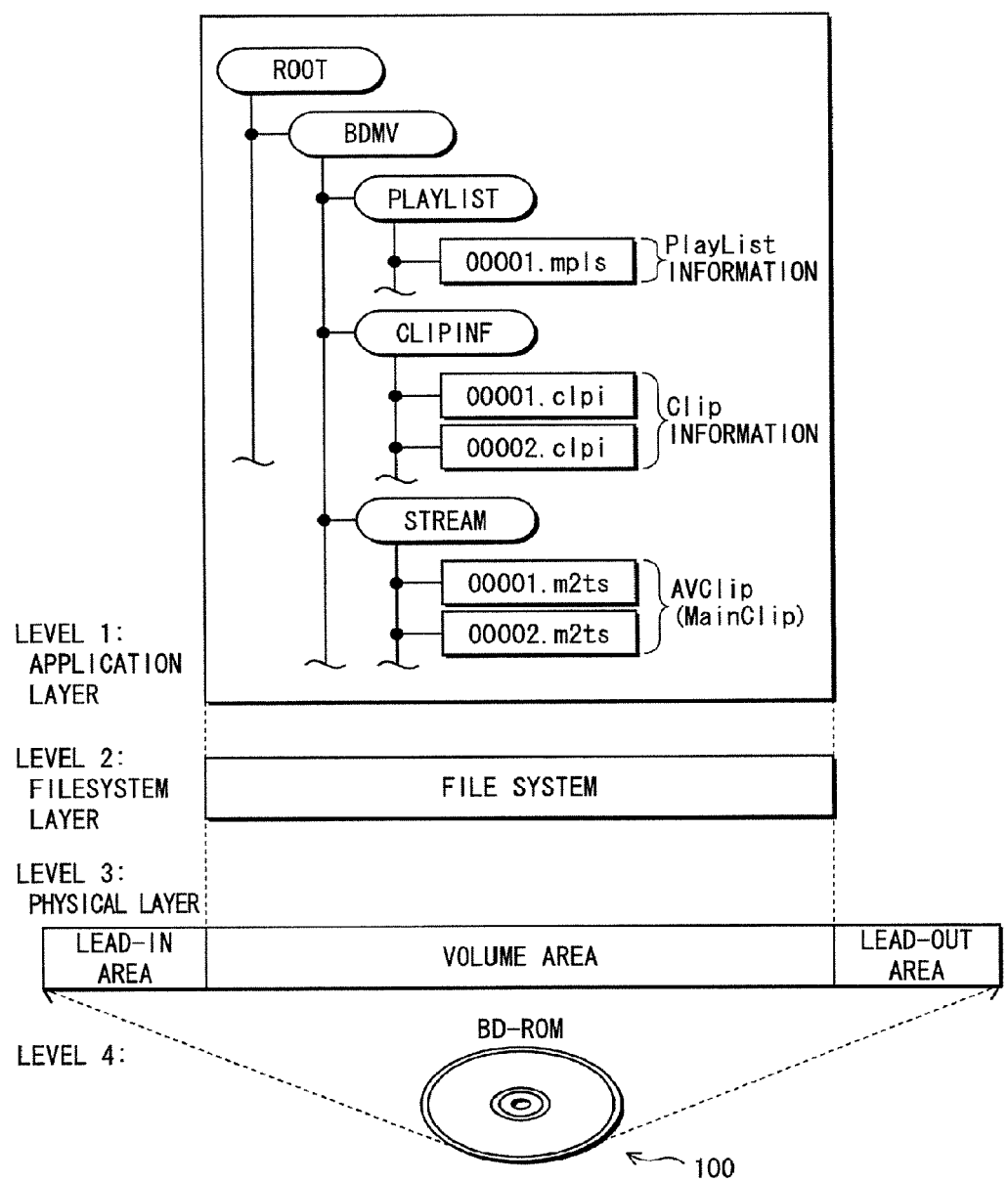
FIG. 2 shows an internal structure of a BD-ROM.

FIG. 2 shows an internal structure of a BD-ROM. Level 4 in the figure shows the BD-ROM, and Level 3 shows a track on the BD-ROM. The figure depicts the track in a laterally drawn-out form, although the track is, in fact, formed in a spiral, winding from the inside toward the outside of the BD-ROM. The track is composed of a lead-in area, a volume area, and a lead-out area. The volume area in the figure has a layer model made up of a physical layer, a filesystem layer, and an application layer. Level 1 in the figure shows a format of the application layer of the BD-ROM by using a directory structure. In Level 1, BD-ROM has BDMV directory under Root directory.

Furthermore, three subdirectories are located under the BDMV directory: PLAYLIST directory; CLIPINF directory; and STREAM directory.

The PLAYLIST directory includes a file to which an extension of mpls is attached (00001.mpls).

The CLIPINF directory includes files to each of which an extension of clpi is attached (00001.clip and 00002.clip).

The STREAM directory includes files to each of which an extension of m2ts is attached (00001.m2ts and 00002.m2ts).

Thus, it can be seen that multiple files of different types are arranged in the BD-ROM according to the directory structure above.

<BD-ROM Structure 1: AVClip>

Figure 3:
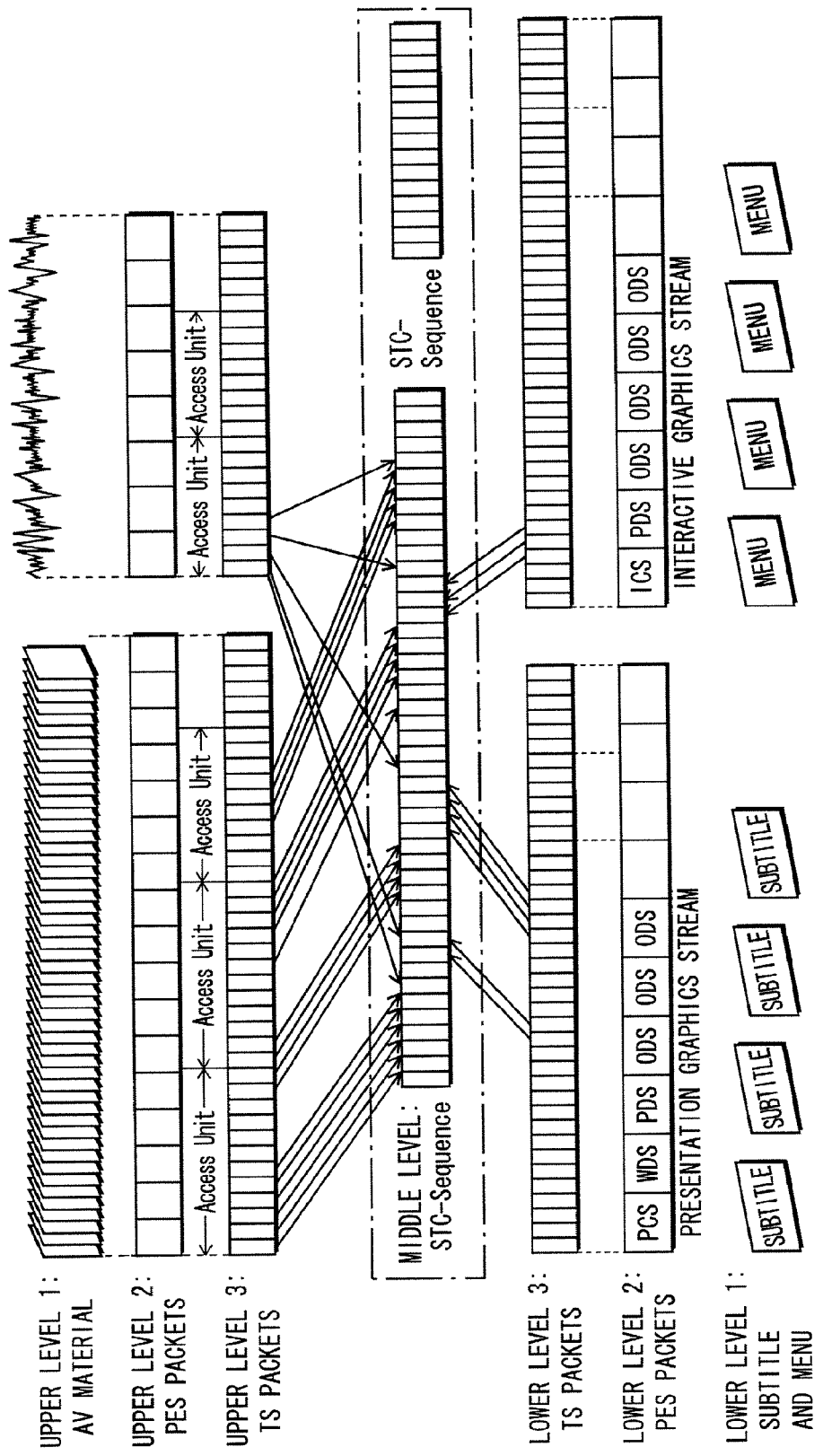
FIG. 3 is a schematic structure of a file with an extension of .m2ts attached thereto.

First, files to which the extension "m2ts" is attached are explained. FIG. 3 shows a schematic structure of the file to which the extension "m2ts" is attached. The files to each of which the extension "m2ts" is attached (00001.m2ts and 00002.m2ts) store an AVClip. The AVClip is a digital stream in the MPEG2-Transport Stream format. The digital stream is generated by converting the digitized video and audio (upper Level 1) into an elementary stream composed of PES packets (upper Level 2), and converting the elementary stream into TS packets (upper Level 3), and similarly, converting the Presentation Graphics (PG) stream for the subtitles or the like and the Interactive Graphics (IG) stream for the interactive purposes (lower Level 1 and lower Level 2) into the TS packets (lower Level 3), and then finally multiplexing these TS packets.

The following describes the video stream, audio stream, PG stream and IG stream.

<Video Stream>

The video stream is a stream forming moving images of the movie, and is composed of picture data of SD images and HD images. The video stream is in VC-1 video stream, MPEG4-AVC or MPEG2-Video format. When the video stream is a video stream in MPEG4-AVC format, time stamps such as PTS and DTS are attached to IDR, I, P and B pictures, and playback control is performed in units of pictures. A unit of a video stream, which is a unit for playback control with PTS and DTS attached thereto, is called the "Video Presentation Unit".

<Audio Stream>

The audio stream is a stream for an audio track of the movie, and the formats of the audio stream include LPCM audio stream format, DTS-HD audio stream format, DD/DD+ audio stream format, and DD/MLP audio stream format. Time stamps are attached to audio frames in the audio stream, and playback control is performed in units of audio frames. A unit of an audio stream, which is a unit for playback control with a time stamp attached thereto, is called the "Audio Presentation Unit".

<PG Stream>

The PG stream is a graphics stream constituting a subtitle written in a language. There are a plurality of streams that respectively correspond to a plurality of languages such as English, Japanese and French. The PG stream is composed of functional segments such as: PCS (Presentation Control Segment); PDS (Pallet Define Segment); WDS (Window Define Segment); ODS (Object Define Segment); and END (END of Display Set Segment). The ODS (Object Define Segment) is a functional segment that defines a graphics object which is a subtitle.

The WDS (Window Define Segment) is a functional segment that defines a bit amount of a graphics object on the screen. The PDS (Pallet Define Segment) is a functional segment that defines a color in drawing a graphics object. The PCS (Presentation Control Segment) is a functional segment that defines a page control in displaying a subtitle. Such page control includes Cut-In/Out, Fade-In/Out, Color Change, Scroll, and Wipe-In/Out. It is possible with the page control by the PCS to achieve a display effect—for example, making the current subtitle fade out while displaying the next subtitle.

<IG Stream>

The IG stream is a graphics stream for achieving interactive control. The interactive control defined by an IG stream is an interactive control that is compatible with an interactive control on a DVD playback apparatus. The IG stream is composed of functional segments such as: ICS (Interactive Composition Segment); PDS (Palette Definition Segment); and ODS (Object Definition Segment). The ODS (Object Definition Segment) is a functional segment that defines a graphics object. Buttons on the interactive screen are drawn by a plurality of such graphics objects. The PDS (Palette Definition Segment) is a functional segment that defines a color in drawing a graphics object. The ICS (Interactive Composition Segment) is a functional segment that achieves a state change in which the button state changes in accordance with a user operation. The ICS includes a button command that is executed when a confirmation operation is performed on a button.

Here, an AVClip is made up of at least one "STC_Sequence". The "STC_Sequence" is a section in which there is no discontinuity (system time-base discontinuity) in the STC (System Time Clock), which is a system base time of AV streams. A discontinuity in the STC is a point at which discontinuity information (discontinuity_indicator) of a PCR packet carrying a PCR (Program Clock Reference) referred to by the decoder to obtain the STC is ON.

Figure 4:
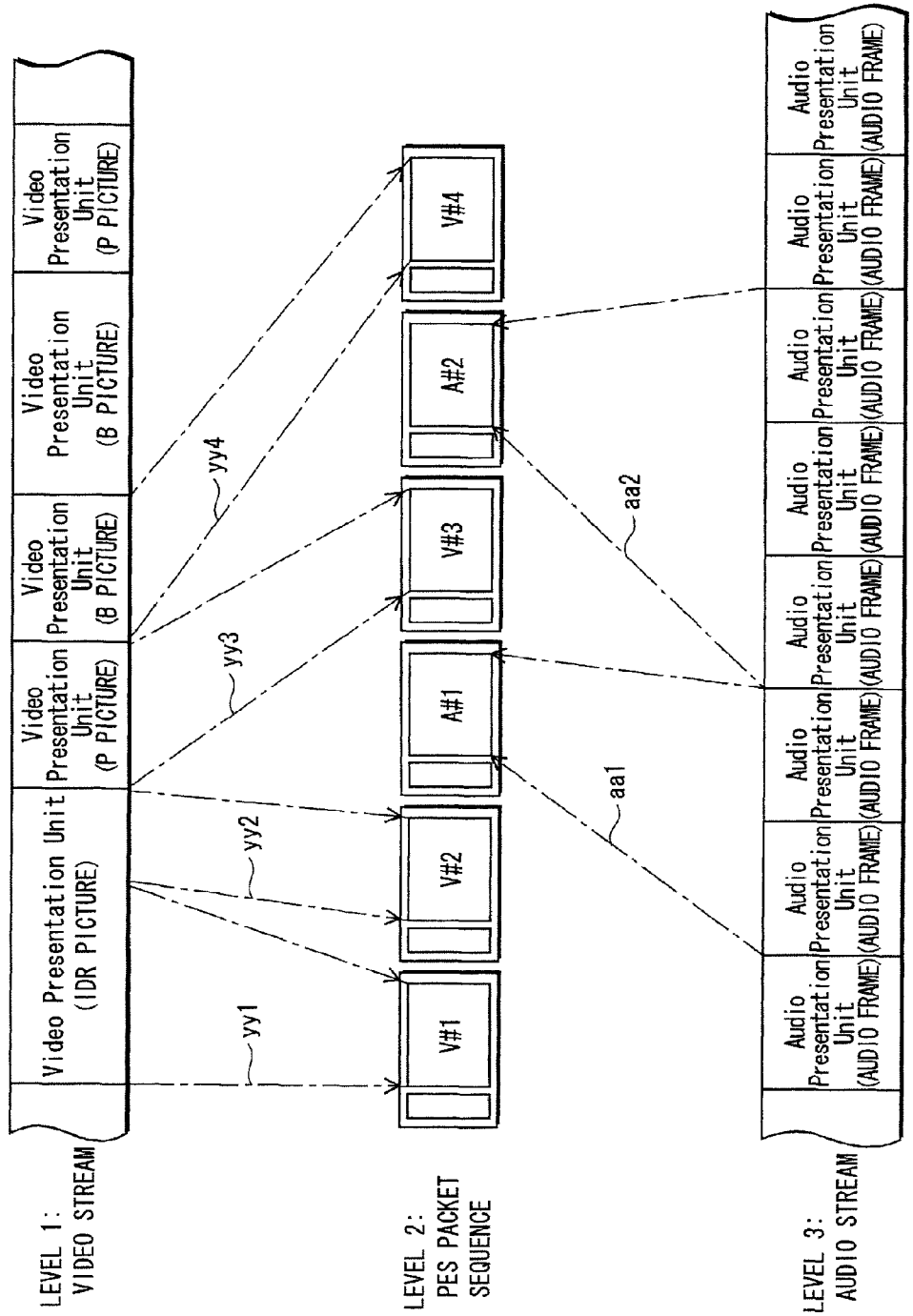
FIG. 4 shows further details of how video and audio streams are stored in a PES packet sequence.

FIG. 4 shows further details of how video and audio streams are stored in a PES packet sequence. Level 1 in the figure shows a video stream and Level 3 shows an audio stream. Level 2 shows a PES packet sequence. As shown by the arrows yy1, yy2, yy3 and yy4 in the figure, it can be seen that the IDR pictures, B pictures and P pictures, which are multiple Video Presentation Units in the video stream, are divided into multiple sections, and each of the divided sections is stored in one of the payloads (V#1, V#2, V#3 and V#4 in the figure) of the PES packets. It can be also understood that each of the audio frames, which are Audio Presentation Units constituting the audio stream, is stored in one of the payloads (A#1 and A#2 in the figure) of PES packets, as shown by the arrows aa1 and aa2.

Figure 5:
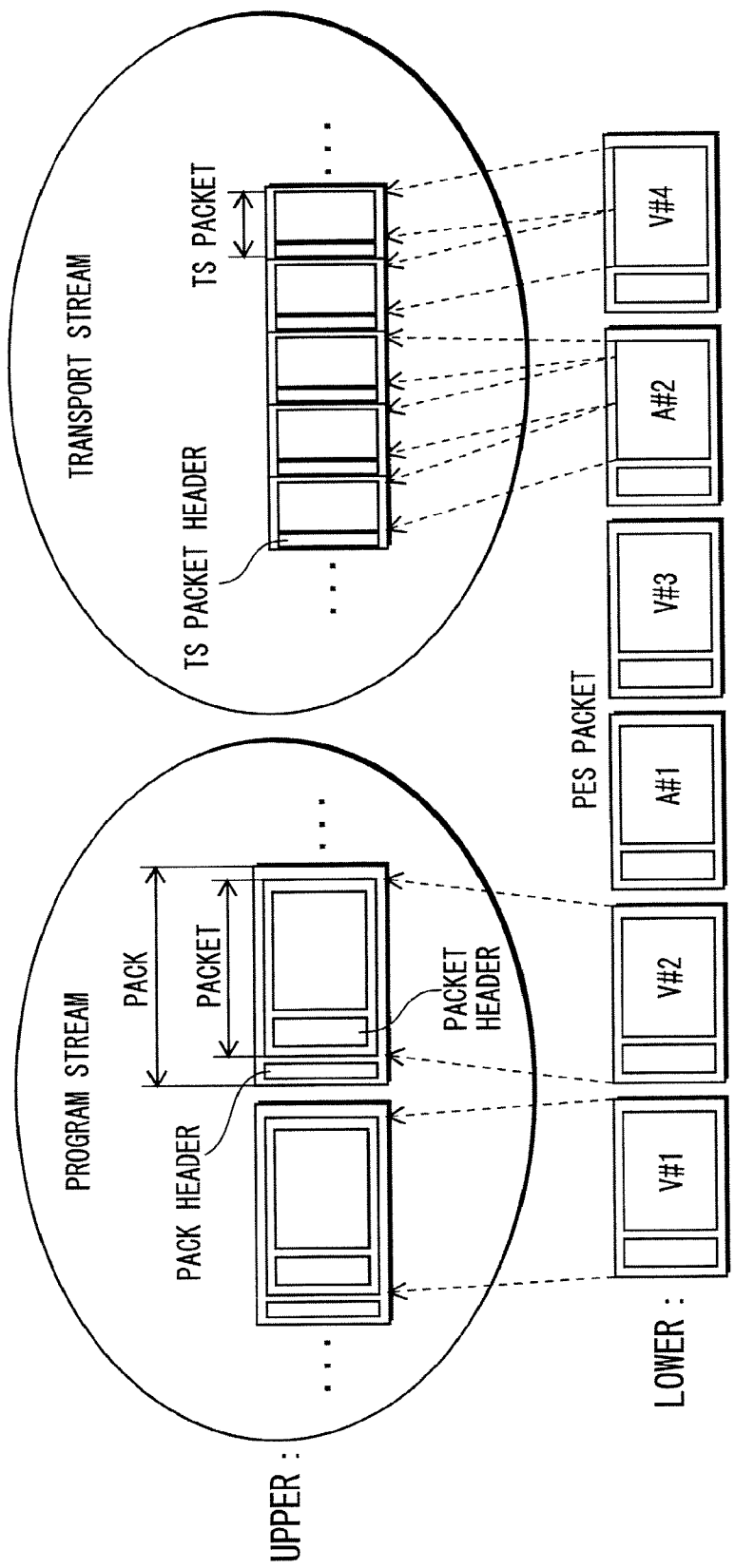
FIG. 5 shows how the video and audio are multiplexed into a program stream and a transport stream.

FIG. 5 shows how the video and audio are multiplexed into a program stream and a transport stream. The lower part of the figure shows multiple PES packets (V#1, V#2, V#3, V#4, A#1 and A#2 in the figure) which have stored therein the video and audio streams. It can be seen from the figure that the video and audio streams are stored in different PES packets. The upper part shows a program stream and a transport stream in which the PES packets shown in the lower part are stored. When multiplexed into a program stream, each PES packet is fit into one pack. When multiplexed into a transport stream, a PES packet is divided into sections, each of which is then stored in one of payloads of multiple TS packets. Not the format of the program stream but the format of the transport stream is used for the storage format of the BD-ROM. It is common that a video PES packet used for a transport stream stores therein one frame or two paired fields although FIG. 5 does not illustrate such a case.

Figure 6:
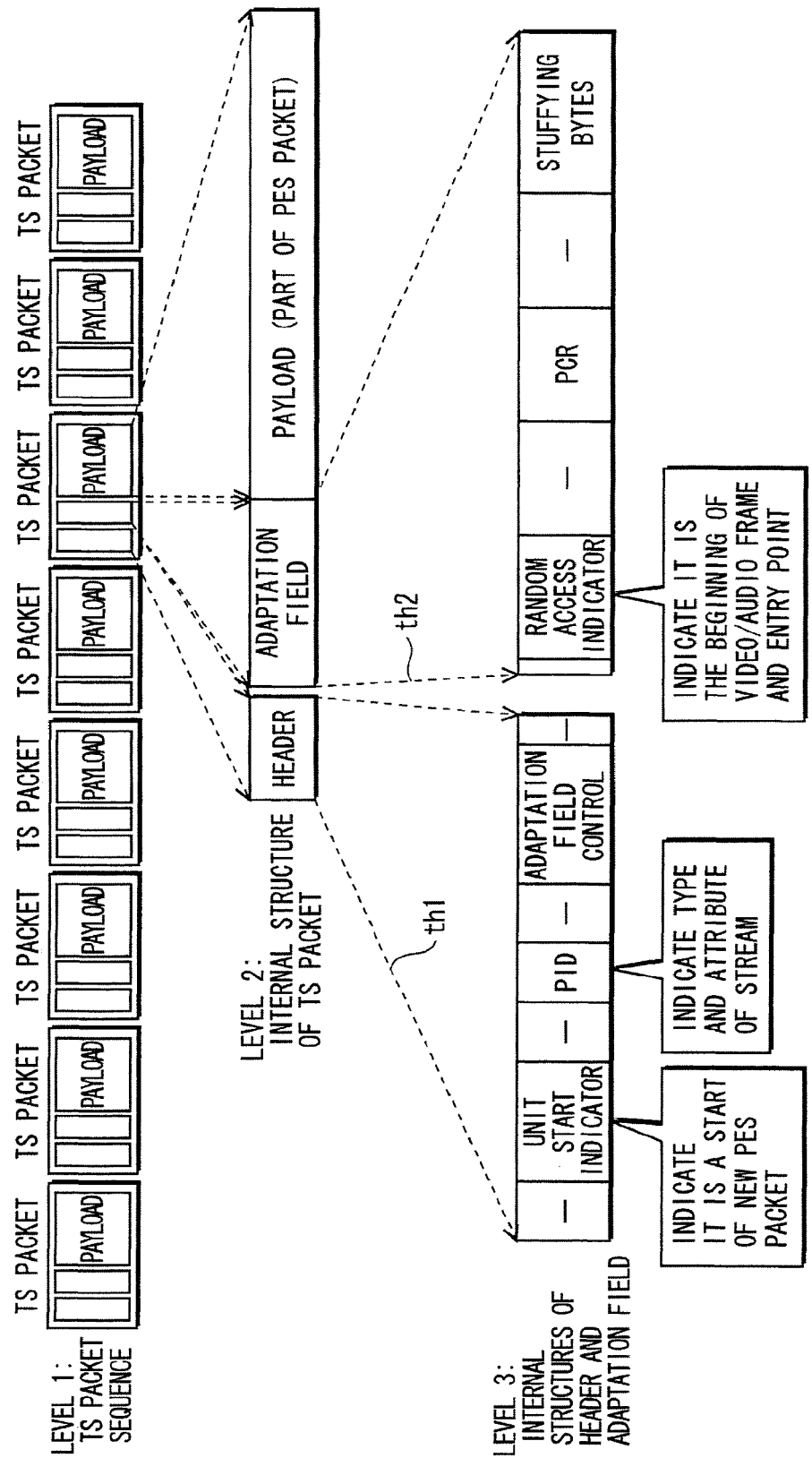
FIG. 6 shows details of a transport stream.

FIG. 6 shows details of a transport stream. Level 1 of the figure shows a sequence of multiple TS packets forming an MPEG2 transport stream and Level 2 shows the internal structure of a TS packet. As shown in Level 2, one TS packet is composed of a "header", an "adaptation field" and a "payload". The lead line th1 shows up-close details of the structure of the header of a TS packet. As shown by the lead line, the header of a TS packet includes: a "unit start indicator (payload_unit_start_indicator)" indicating the start of the PES packet is stored; a "PID (Packet Identifier)" indicating a type of an elementary stream which is multiplexed into the transport stream; and an "adaptation field control" indicating whether an adaptation field is present in the TS packet.

The lead line th2 shows up-close details of the internal structure of an adaptation field. An adaptation field is given to a TS packet in the case when the adaptation field control of the header of the TS packet is set to "1". Specifically speaking, the adaptation field stores: therein a "random access indicator (random_access_indicator)" indicating that the TS packet is the beginning of a video or audio frame and an entry point; and a "PCR (Program Clock Reference)" that gives an STC (System Time Clock) of the T-STD (Transport System Target Decoder).

Figure 7:
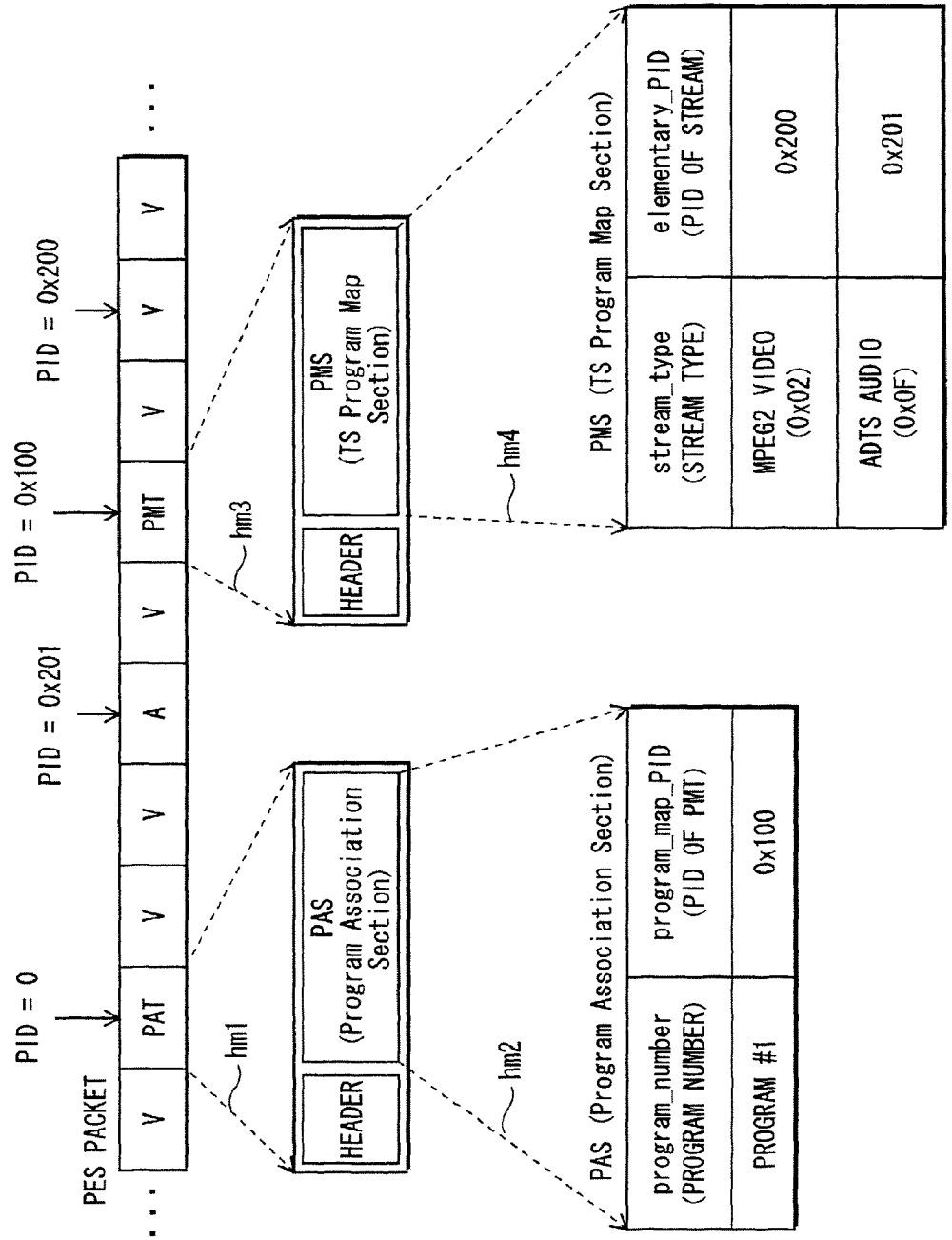
FIG. 7 shows internal structures of a PAT packet and a PMT packet.

FIG. 7 shows the internal structures of a PAT packet and a PMT packet. These packets describe the program structure of a transport stream.

The lead line hm1 of the figure shows up-close details of the structure of a TS packet with PID=0 in the transport stream. Such a TS packet is called the PAT (Program Association Table) packet, and indicates a program structure of the entire transport stream. The PID of a PAT packet is always "0". In a PAT packet, a PAS (Program Association Section) is stored. The lead line hm2 shows up-close details of the internal structure of a PAS. As shown by the lead line, a PAS shows the correspondence between program_number (program number) and a program map table (a PID of the PMT). The lead line hm3 shows up-close details of the structure of a TS packet with PID=0x100 present in the transport stream. Such a TS packet is called the PMT packet. As shown by the lead line hm4, a PMS of the PMT packet includes: "stream_type" indicating a type of the stream included in a program corresponding to the PMS; and "elementary_PID" which is a PID of the stream. According to the example of the figure, the program with the program number #1 has a PMT with PID=0x100, and a MPEG2 video with PID=0x200 and an ADTS audio with PID=0x201 make up the program with the program number #1. A program in the transport stream as well as a PID of a stream constituting the transport stream and a type of the stream can be found by obtaining the PID of the PMT from the PAT whose PID is always 0, then obtaining the PMT packet according to the PID of the PMT, and referring to the PMS.

Figure 8:
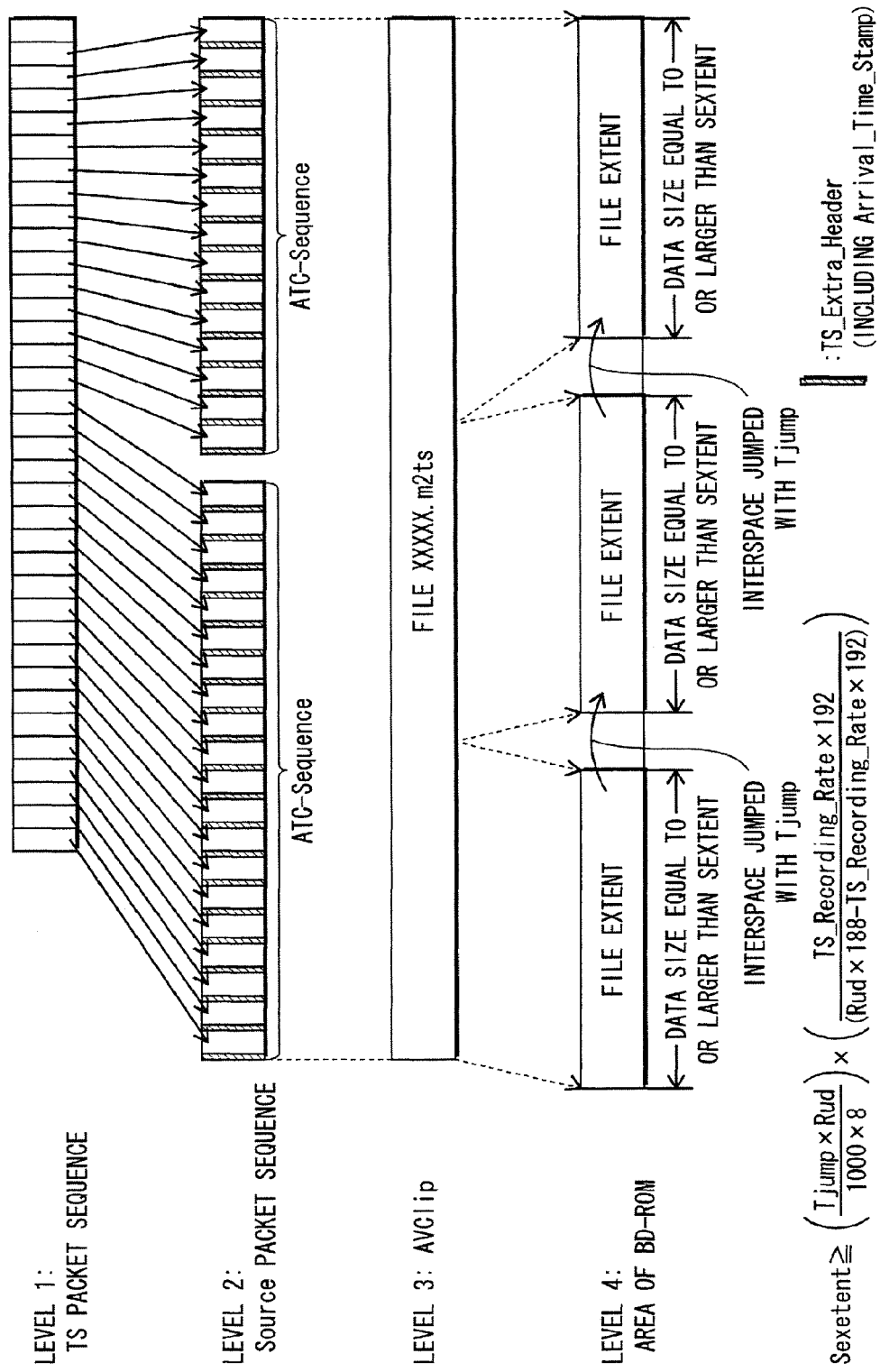
FIG. 8 shows what processes TS packets constituting an AVClip are subject to before they are written to the BD-ROM.

Next, how an AVClip having the above-described structure is written to the BD-ROM is explained. FIG. 8 shows what processes TS packets constituting an AVClip are subjected to before they are written to the BD-ROM. Level 1 of the figure shows the TS packets constituting the AVClip.

As shown in Level 2 of FIG. 8, a 4-byte TS_extra_header (hatched portions in the figure) is attached to each 188-byte TS packet constituting the AVClip to generate each 192-byte Source Packet. The TS_extra_header includes Arrival_Time_Stamp that is information indicating the time at which the TS packet is input to the decoder. The reason for attaching an ATS header to each TS packet to form a stream is to assign, to each TS packet, a time at which the TS packet is input to the decoder (STD). In the digital broadcasting, a transport stream is treated as a stream having a fixed bit rate. Therefore, dummy TS packets, called NULL packets, are also multiplexed together to form a transport stream so that the transport stream is broadcast at a fixed bit rate. However, in the case where streams are recorded on an optical disk or another recording medium having a limited recording capacity, such a fixed-bit-rate recording method is a disadvantage because it consumes the capacity wastefully. Therefore, NULL packets are not recorded on BD-ROMs. In order to comply with a variable-bit-rate recording method, an ATS is attached to each TS packet, and then the transport stream is recorded on a BD-ROM. The use of the ATS allows for restoring the decoder input time for each TS packet, and thus can comply with a variable-bit-rate recording method. Hereinafter, a pair of an ATS header and a TS packet is called a Source Packet.

The AVClip shown in Level 3 includes one or more "ATC_Sequences," each of which is a sequence of Source Packets. The "ATC_Sequence" is a sequence of Source Packets, where Arrival_Time_Clocks referred to by the Arrival_Time_Stamps included in the ATC_Sequence do not include "arrival time-base discontinuity". In other words, the "ATC_Sequence" is a sequence of Source Packets, where Arrival_Time_Clocks referred to by the Arrival_Time_Stamps included in the ATC_Sequence are continuous.

Such ATC_Sequences constitute the AVClip, and are recorded on the BD-ROM with a file name "xxxxx.m2ts".

The AVClip is, as is the case with the normal computer files, divided into one or more file extents, which are then recorded in areas on the BD-ROM. Level 4 shows how the AVClip is recorded on the BD-ROM. In Level 4, each file extent constituting the file has a data length that is equal to or larger than a predetermined length called Sextent.

Sextent is the minimum data length of each file extent, where an AVClip is divided into a plurality of file extents to be recorded.

The time required for the optical pickup to jump to a location on the BD-ROM is obtained by the following equation:

$$T\text{jump} = T\text{access} + T\text{overhead}.$$

The "Taccess" is a time required that corresponds to a jump distance (a distance to a jump-destination physical address).

The TS packets read out from the BD-ROM are stored in a buffer called read buffer, and then output to the decoder. The "Toverhead" is obtained by the following equation when the input to the read buffer is performed with a bit rate called "Rud" and the number of sectors in the ECC block is represented by Secc:

$$T\text{overhead} \leq (2 \times Secc \times 8)/Rud = 20 \text{ msec}.$$

TS packets read out from the BD-ROM are stored in the read buffer in the state of Source Packets, and then supplied to the decoder at a transfer rate called "TS_Recording_rate".

To keep the transfer rate of the TS_Recording_rate while the TS packets are supplied to the decoder, it is necessary that, during Tjump, the TS packets are continuously output from the read buffer to the decoder. Here, Source Packets, not TS packets, are output from the read buffer. As a result, when the ratio of the TS packet to the Source Packet in size is 192/188, it is necessary that during Tjump, the Source Packets are continuously output from the read buffer at a transfer rate of "192/188×TS_Recording_rate".

Accordingly, the amount of occupied buffer capacity of the read buffer that does not cause an underflow is represented by the following equation:

$$B\text{occupied} \leq (T\text{jump}/1000 \times 8) \times ((192/188) \times TS\_\text{Recording\_rate}).$$

The input rate to the read buffer is represented by Rud, and the output rate from the read buffer is represented by TS_Recording_rate×(192/188). Therefore, the occupation rate of the read buffer is obtained by performing "(input rate)−(output rate)", and thus obtained by "(Rud−TS_Recording_rate)× (192/188)".

The time "Tx" required to occupy the read buffer by "Boccupied" is obtained by the following equation:

$$Tx = B\text{occupied}/(Rud - TS\_\text{Recording\_rate} \times (192/188)).$$

When reading from the BD-ROM, it is necessary to continue to input TS packets with the bit rate Rud for the time period "Tx". As a result, the minimum data length Sextent per extent when the AVClip is divided into a plurality of file extents to be recorded is obtained by the following equations:

$$\begin{aligned} Sextent = Rud \times Tx = Rud \times Boccupied / \\ (Rud - TS\_Recording\_rate \times (192/188)) \geq Rud \times \\ (Tjump/1000 \times 8) \times (192/188) \times TS\_Recording\_rate)/ \\ (Rud - TS\_Recording\_rate \times (192/188)) \geq \\ (Rud \times Tjump/1000 \times 8) \times \\ TS\_Recording\_rate \times \\ 192/(Rud \times 188 - TS\_Recording\_rate \times 192). \end{aligned}$$

Hence, $$Sextent \geq (T\text{jump} \times Rud/1000 \times 8) \times (TS\_\text{Recording\_rate} - 192/(Rud - 188 - TS\_\text{Recording\_rate} \times 192)).$$

If each file extent constituting the AVClip has the data length equal to or larger than Sextent that is calculated as a value that does not cause an underflow of the decoder, even if the file extents constituting the AVClip are located discretely on the BD-ROM, TS packets are continuously supplied to the decoder so that the data is read out continuously during the playback.

The minimum constituent unit of the above-mentioned file extent is an Aligned Unit (the data size is 6 Kbytes) that is composed of a group of 32 Source Packets. Accordingly, the size of a stream file (XXXX.AVClip) on a BD is always a multiple of 6 Kbytes.

Figure 9:
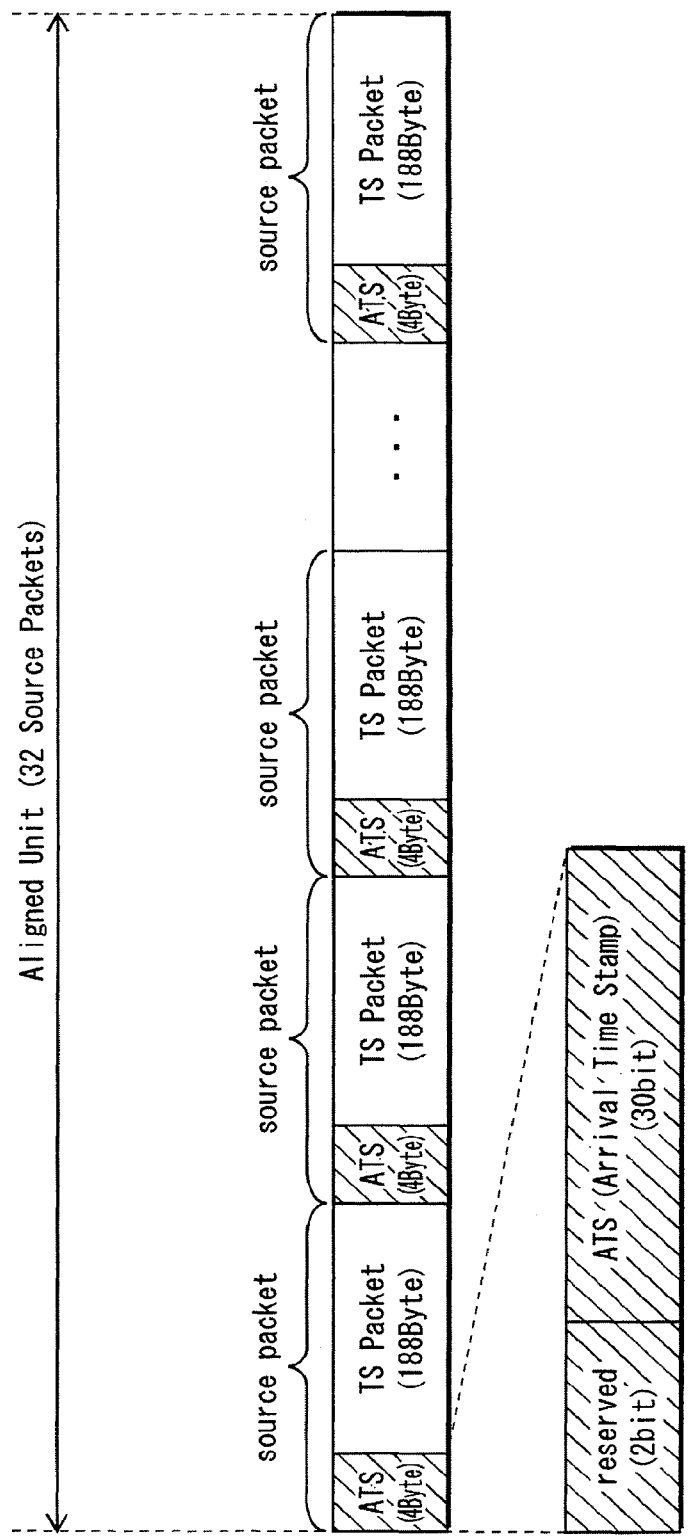
FIG. 9 shows an internal structure of an Aligned Unit.

FIG. 9 shows the internal structure of an "Aligned Unit". The Aligned Unit is composed of 32 Source Packets and is then written into a set of three consecutive sectors. The group of 32 Source Packets is 6144 bytes (=32×192), which is equivalent to the size of three sectors (=2048×3). As to sectors on the BD-ROM, an error correction code is attached for every 32 Source Packets to thereby form an ECC block. As long as accessing the BD-ROM in units of Aligned Units, the playback apparatus can obtain 32 complete Source Packets. Thus concludes the description of the process of writing an AVClip to the BD-ROM. An AVClip that is recorded on the BD-ROM and with which high-resolution video streams are multiplexed together is hereinafter referred to as the "MainClip". On the other hand, an AVClip that is stored in the local storage and played back with a MainClip is called the "SubClip".

A partial transport stream is obtained by demultiplexing a MainClip recorded on the BD-ROM. A partial transport stream corresponds to each elementary stream. A partial transport stream obtained by demultiplexing a MainClip and corresponding to each elementary stream is called the "Primary TS".

<BD-ROM Structure 2: Clip Information>

Figure 10:
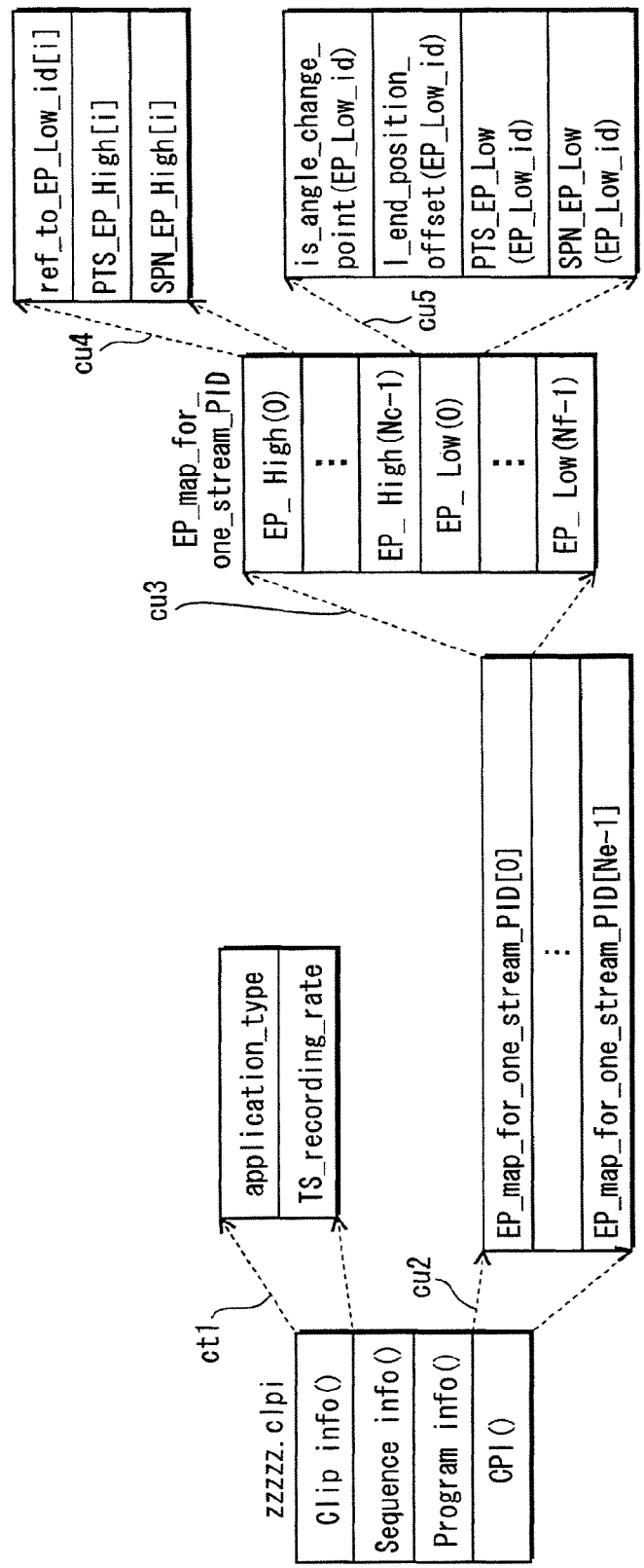
FIG. 10 shows an internal structure of Clip information.

Next are described files to which an extension "clpi" is attached. Files (00001.clpi and 00002.clpi) to which an extension "clpi" is attached store Clip information. The Clip information is management information on each AVClip. FIG. 10 shows the internal structure of Clip information. As shown on the left-hand side of the figure, the Clip information includes:

i) "ClipInfo( )" storing therein information regarding the AVClip;

ii) "Sequence Info( )" storing therein information regarding the ATC_Sequence and the STC Sequence;

iii) "Program Info( )" storing therein information regarding the Program Sequence; and iv) "Characteristic Point Info (CPI( )".

The "ClipInfo" includes "application_type" indicating the application type of the AVClip referred to by the Clip information. Referring to the ClipInfo allows identification of whether the application type is the MainClip or SubClip, whether video is contained, or whether still pictures (slide show) are contained. In addition, the above-mentioned TS_recording_rate is described in the ClipInfo.

The Sequence Info is information regarding one or more STC-Sequences and ATC-Sequences contained in the AVClip. The reason that these information are provided is to preliminarily notify the playback apparatus of the system time-base discontinuity and the arrival time-base discontinuity. That is to say, if such discontinuity is present, there is a possibility that a PTS and an ATS that have the same value appear in the AVClip. This might be a cause of defective playback. The Sequence Info is provided to indicate from where to where in the transport stream the STCs or the ATCs are sequential.

The Program Info is information that indicates a section (called "Program Sequence") of the program where the contents are constant. Here, "Program" is a group of elementary streams that have in common a time axis for synchronous playback. The reason that the Program Info is provided is to preliminarily notify the playback apparatus of a point at which the Program contents change. It should be noted here that the point at which the Program contents change is, for example, a point at which the PID of the video stream changes, or a point at which the type of the video stream changes from SDTV to HDTV.

Next is described the Characteristic Point Info. The lead line cu2 in FIG. 9 indicates a close-up of the structure of CPI. As indicated by the lead line cu2, the CPI is composed of Ne pieces of EP_map_for_one_stream_PIDs (EP_map_for_one_stream_PID[0] to EP_map_for_one_stream_PID[Ne−1]). These EP_map_for_one_stream_PIDs are EP_maps of the elementary streams that belong to the AVClip. The EP_map is information that indicates, in association with an entry time (PTS_EP_start), a packet number (SPN_EP_start) at an entry position where the Access Unit is present in one elementary stream. The lead line cu3 in the figure indicates a close-up of the internal structure of EP_map_for_one_stream_PID.

It is understood from the close-up that the EP_map_for_one_stream_PID is composed of Ne pieces of EP_Highs (EPHigh(0) to EPHigh(Nc−1)) and Nf pieces of EP_Lows (EP_Low(0) to EP_Low(Nf−1)). Here, the EP_High plays a role of indicating upper bits of the SPN_EP_start and the PTS_EP_start of the Access Unit (Non-IDR I-Picture, IDR-Picture), and the EP_Low plays a role of indicating lower bits of the SPN_EP_start and the PTS_EP_start of the Access Unit (Non-IDR I-Picture and IDR-Picture).

The lead line cu4 in the figure indicates a close-up of the internal structure of EP_High. As indicated by the lead line cu4, the EP_High(i) is composed of: "ref_to_EP_Low_id[i]" that is a reference value to EP_Low; "PTS_EP_High[i]" that indicates upper bits of the PTS of the Access Unit (Non-IDR I-Picture, IDR-Picture); and "SPN_EP_High[i]" that indicates upper bits of the SPN of the Access Unit (Non-IDR I-Picture, IDR-Picture). Here, "i" is an identifier of a given EP_High.

The lead line cu5 in the figure indicates a close-up of the structure of EP_Low. As indicated by the lead line cu5, the EP_Low(i) is composed of: "is_angle_change_point(EP_Low_id)" that indicates whether the corresponding Access Unit is an IDR picture; "I_end_position_offset(EP_Low_id)" that indicates the size of the corresponding Access Unit; "PTS_EP_Low(EP_Low_id)" that indicates lower bits of the PTS of the Access Unit (Non-IDR I-Picture, IDR-Picture); and "SPN_EP_Low(EP_Low_id)" that indicates lower bits of the SPN of the Access Unit (Non-IDR I-Picture, IDR-Picture). Here, "EP_Low_id" is an identifier for identifying a given EP_Low.

<Clip Information Explanation 2: EP_Map>

Figure 11:
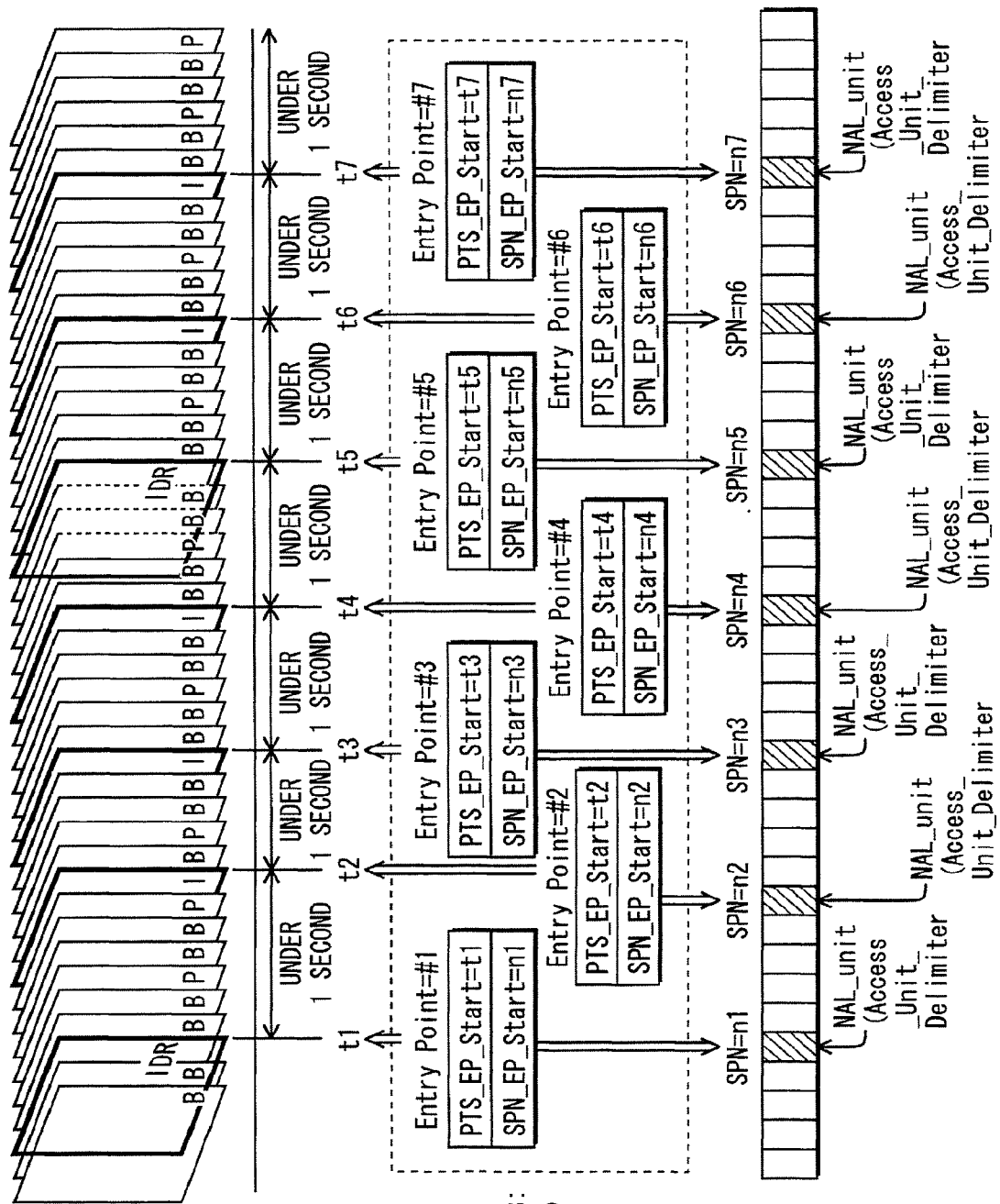
FIG. 11 shows EP_map settings for a video stream of a movie.

Here, the EP_map is explained using a specific example. FIG. 11 shows EP_map settings for a video stream of a movie. Level 1 shows a plurality of pictures (IDR picture, I-Picture, B-Picture, and P-Picture defined in MPEG4-AVC) arranged in the order of display. Level 2 shows the time axis for the pictures. Level 4 indicates a TS packet sequence on the BD-ROM, and Level 3 indicates settings of the EP_map.

Assume here that, in the time axis of Level 2, an IDR picture or an I picture is present at each time point t1 to t7. The interval between adjacent ones of the time points t1 to t7 is approximately one second. The EP_map used for the movie is set to indicate t1 to t7 with the entry times (PTS_EP_start), and indicate entry positions (SPN_EP_start) in association with the entry times.

<PlayList Information>

Next is described the PlayList information. A file (00001.mpls) to which extension "mpls" is attached is a file storing therein the PlayList (PL) information.

Figure 12:
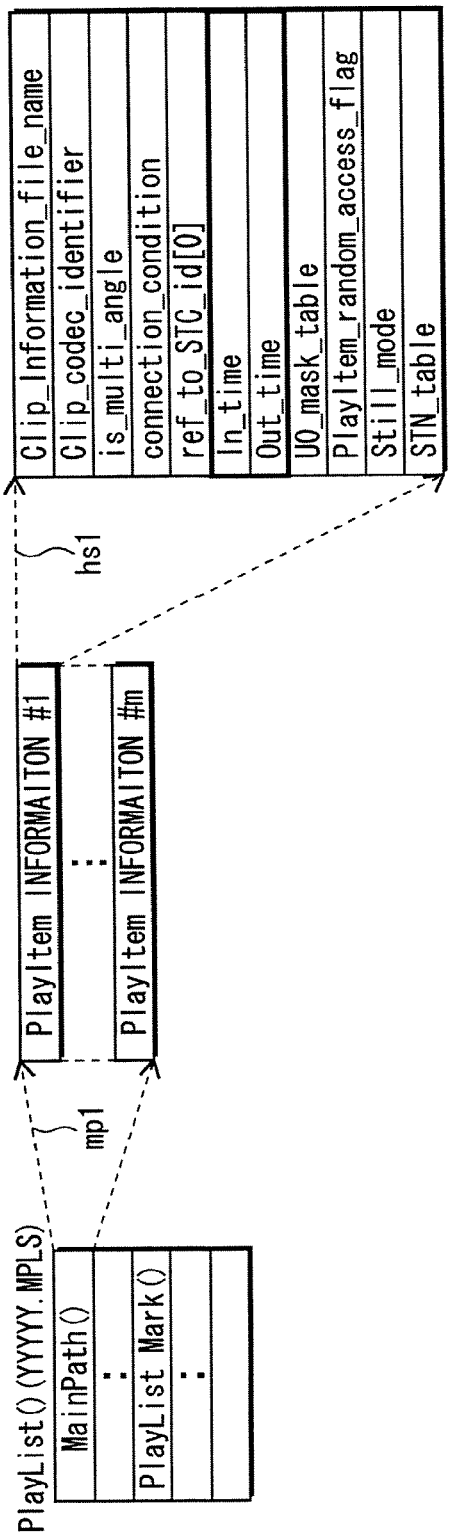
FIG. 12 shows a data structure of PlayList information.

FIG. 12 shows the data structure of the PlayList information. As indicated by the lead line mp1 in the figure, the PlayList information includes: MainPath information (MainPath( )) that defines MainPath; PlayListMark information (PlayListMark( )) that defines chapter; and other extension data (Extension Data).

<PlayList Information Explanation 1: MainPath Information>

First is described the MainPath. The MainPath is a playback path that is defined in terms of a video stream, such as the main video, and an audio stream.

As indicated by the arrow mp1, the MainPath is defined by a plurality of pieces of PlayItem information: PlayItem information #1 to PlayItem information #m. PlayItem information defines one or more logical playback sections that constitute the MainPath. The lead line hs1 in the figure indicates a close-up of the structure of PlayItem information. As indicated by the lead line hs1, PlayItem information is composed of: "Clip_Information_file_name" that indicates the file name of the playback section information of the AVClip to which the IN point and the OUT point of the playback section belong; "Clip_codec_identifier" that indicates the AVClip encoding method; "is multi angle" that indicates whether or not PlayItem is multi angle; "connection_condition" that indicates whether or not to seamlessly connect the current PlayItem and the preceding PlayItem; "ref_to_STC_id[0]" that indicates uniquely the STC_Sequence targeted by PlayItem; "In_time" that is time information indicating the start point of the playback section; "Out_time" that is time information indicating the end point of the playback section; "UO_mask_table" that indicates which user operation should be masked by PlayItem; "PlayItem_random_access_flag" that indicates whether to permit a random access to a mid-point in PlayItem; "Still_mode" that indicates whether to continue a still display of the last picture after the playback of PlayItem ends; and "STN_table". Among these, the time information "In_time" indicating the start point of the playback section and the time information "Out_time" indicating the end point of the playback section constitute a playback path. The playback path information is composed of "In_time" and "Out_time".

Figure 13:
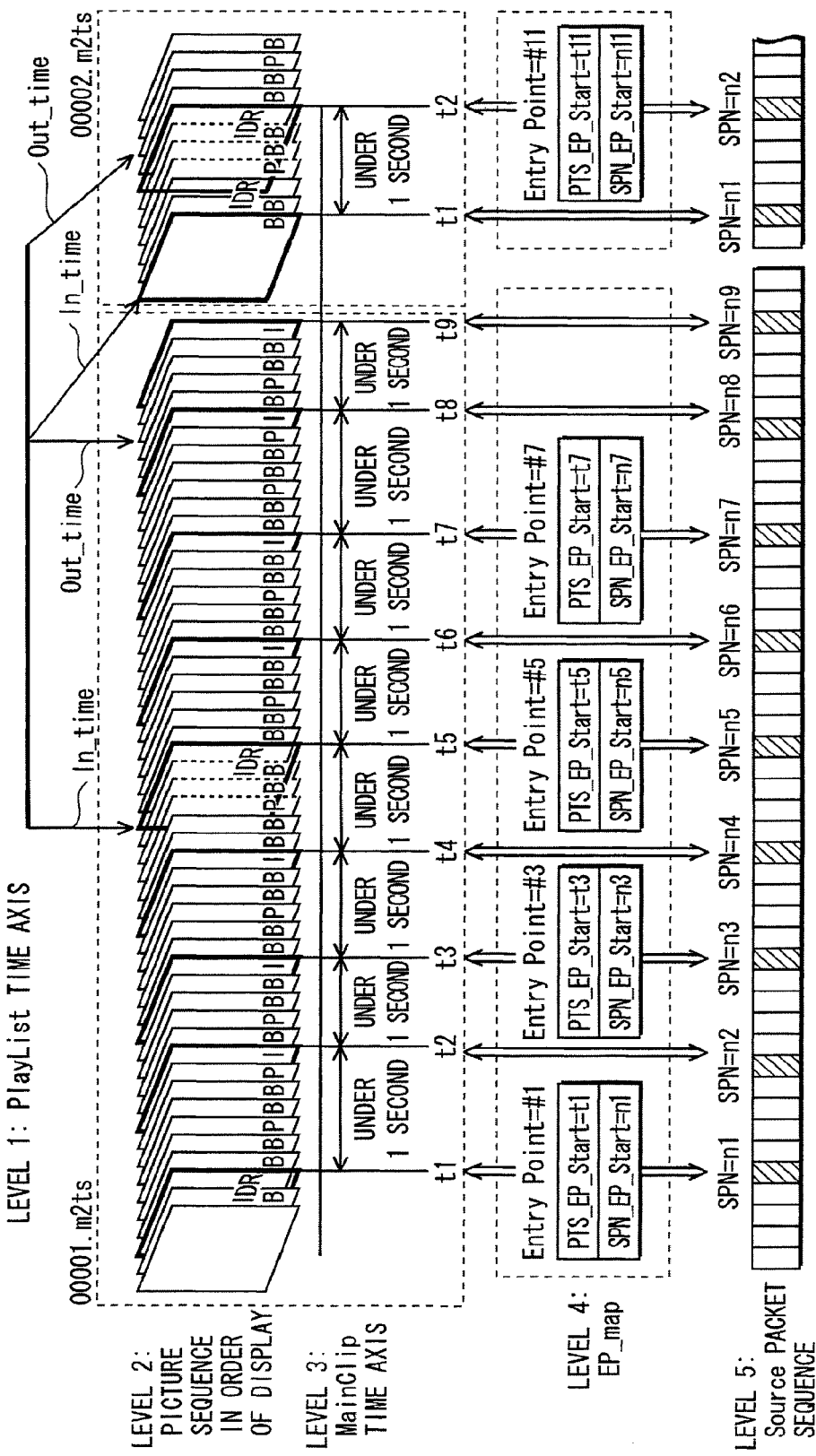
FIG. 13 shows relationships between AVClip and PlayList information.

FIG. 13 shows the relationships between the AVClip and the PlayList information. Level 1 shows the time axis of the PlayList information (PlayList time axis). Levels 2 to 5 show the video stream that is referenced by the EP_map.

The PlayList information includes two pieces of PlayItem information: PlayItem information #1; and PlayItem information #2. Two playback sections are defined by "In_time" and "Out_time" included in PlayItem information #1 and PlayItem information #2, respectively. When these playback sections are arranged, a time axis that is different from the AVClip time axis is defined. This is the PlayList time axis shown in Level 1. Thus, it is possible to define a playback path that is different from the AVClip by defining PlayItem information.

Thus concludes the description of the BD-ROM 100.

<Local Storage 200>

Figure 14:
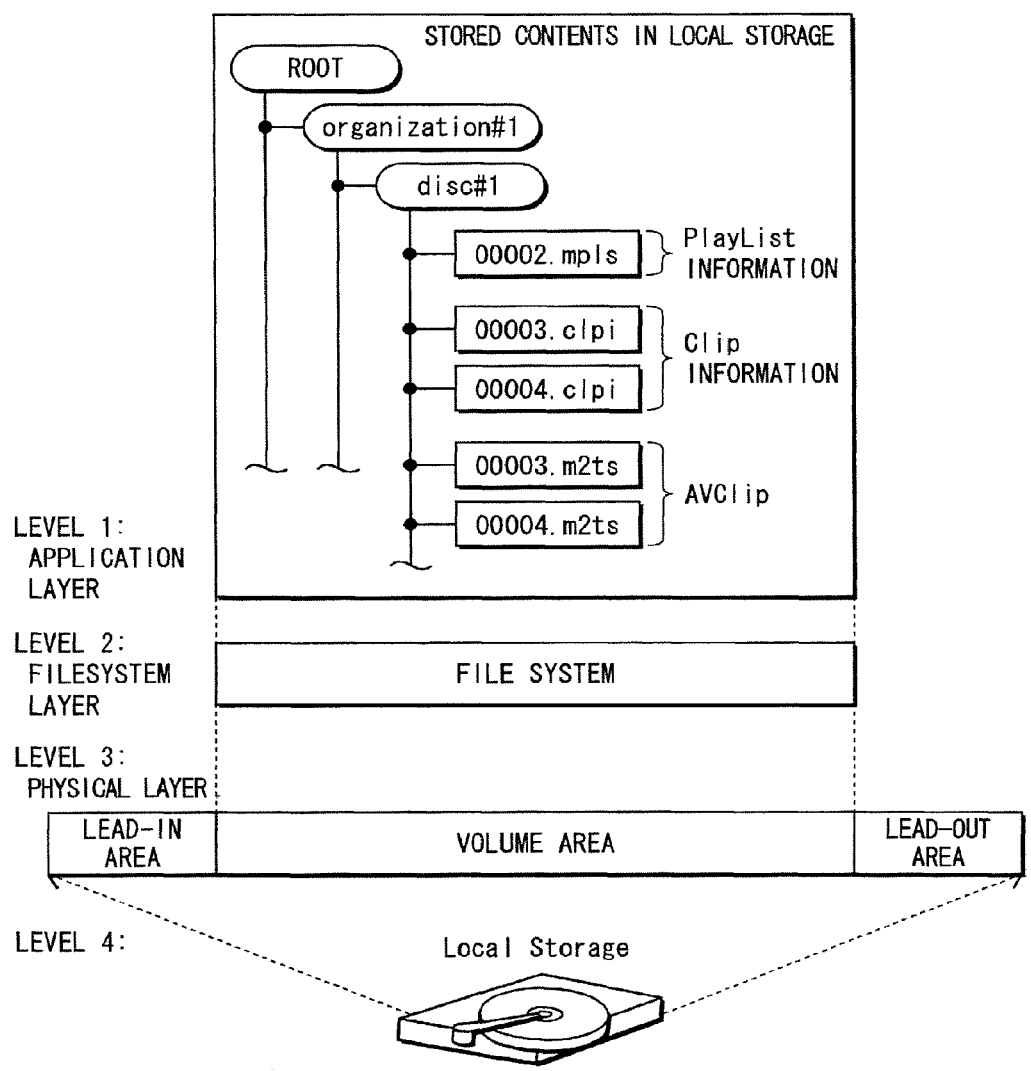
FIG. 14 shows an internal structure of a local storage 200.

The following describes the local storage 200 that is a recording medium of the present invention. FIG. 14 shows an internal structure of the local storage 200. As shown in the figure, the recording medium of the present invention can be produced by improving the application layer.

Level 4 of the figure shows the local storage 200 and Level 3 shows a track on the local storage 200. The figure depicts the track in a laterally drawn-out form, although the track is, in fact, formed in a spiral, winding from the inside toward the outside of the local storage 200. The track is composed of a lead-in area, a volume area, and a lead-out area. The volume area in the figure has a layer model made up of a physical layer, a filesystem layer, and an application layer. Level 1 in the figure shows a format of the application layer of the local storage 200 by using a directory structure.

In the directory structure shown in FIG. 13, there is a subdirectory "organization#1" under a root directory. Also, there is a subdirectory "disk#1" under the directory "organization#1". The directory "organization#1" is assigned to a specific provider of a movie. The directory "disk#1" is assigned to each BD-ROM provided from the provider.

With this construction in which the directory assigned to a specific provider includes directories that corresponds to BD-ROMs, download data for each BD-ROM is stored separately. Similarly to the information stored in the BD-ROM, under the subdirectory "disk#1", the following information is stored: PlayList information ("00002.mpls"); Clip information ("00003.clpi" and "00004.clpi"); and AVClips ("00003.m2ts" and "00004.m2ts".

The following describes components of the local storage 200: the PlayList information, Clip information and AVClips.

<Local Storage 200 Structure 1: AVClip>

The AVClips (00003.m2ts and 00004.m2ts) in the local storage 200 make up SubClips. A partial transport stream is obtained by demultiplexing a SubClip. A partial transport stream obtained by demultiplexing a SubClip is called the "Secondary TS". Such a Secondary TS is a constituent of the Out_of_MUX application. The following describes the Out_of_MUX application.

(Out_of_MUx Application)

The Out_of_MUX application is an application that, for example, selects two TSs—a Primary TS in the BD-ROM and a Secondary TS, which is obtained via a network or the like and recorded in the local storage—and plays them back simultaneously, whereby allowing various combinations of elementary streams between these two TSs.

Figure 15:
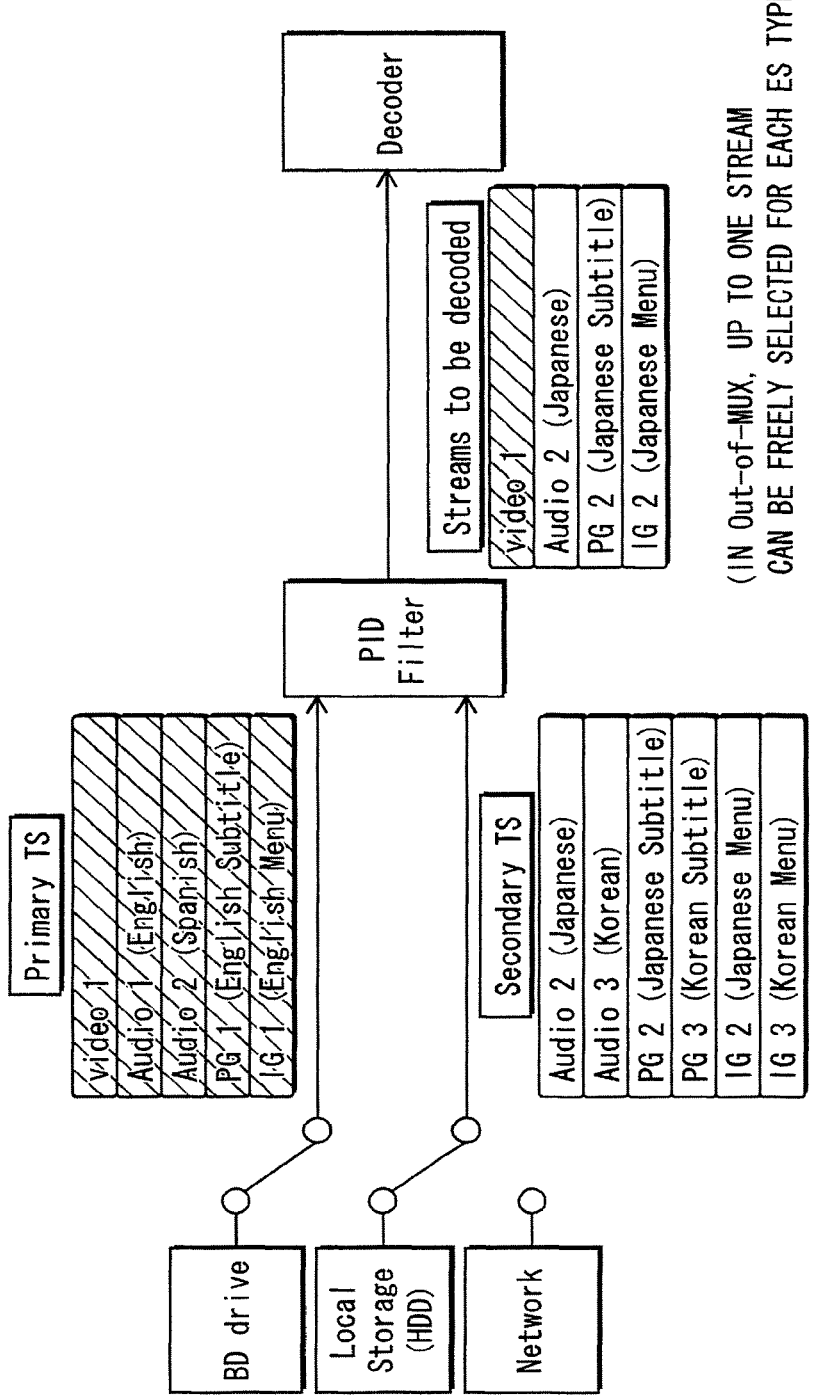
FIG. 15 shows the way a Primary TS and a Secondary TS making up an Out_of_MUX application are supplied to a decoder within a BD-ROM playback apparatus.

FIG. 15 shows the way a Primary TS and a Secondary TS making up the Out_of_MUX application are supplied to the decoder within the BD-ROM playback apparatus. In the figure, among the internal structural components of the BD-ROM playback apparatus, a BD-ROM drive, a local storage and a network are shown on the left side while the decoder is shown on the right side. A PID Filter that performs stream demultiplexing is shown in the center. Primary TS (Video 1, Audio 1 (English), Audio 2 (Spanish), PG 1 (English Subtitle), IG 1 (English Menu)) and the Secondary TS (Audio 2 (Japanese), Audio 3 (Korean), PG 2 (Japanese Subtitle), PG 3 (Korean Subtitle), IG 2 (Japanese Menu), IG 3 (Korean Menu)) in the figure are transport streams supplied from the BD-ROM and the local storage, respectively. Since only English (Audio 1) and Spanish (Audio 2) are recorded on the disk, a Japanese-dubbed version, for example, cannot be selected on the disk. However, by downloading, to the local storage, the Secondary TS which includes the Japanese-dubbed version (Audio 2) provided by the content provider, the Japanese-dubbed audio (Audio 2), Japanese subtitle (PG 2), and Japanese menu screen (IG 2) can be sent to the decoder. Herewith, the user is able to select any of the Japanese-dubbed audio (Audio 2), Japanese subtitle (PG 2), and Japanese menu screen (IG 2), and play it back with the video (Video 1).

The Out_of_MUX application allows the user to freely make a selection on an audio and a subtitle under the condition that the selection can be made for up to one for each type of the elementary streams that are stored in the two TSs to be played back simultaneously (in other words, up to one video, one audio, one subtitle and one menu stored in the primary and Secondary TSs).

Any BD-ROM playback apparatus is able to decode a Primary TS, however, cannot decode two TSs simultaneously. Accordingly, the introduction of the Out_of_MUX application without restriction would cause an increase in the size of the hardware and/or a large addition of software, which results in an increase in the cost of BD-ROM playback apparatuses. Therefore, when it comes to the realization of the Out_of_MUX application, whether the Out_of_MUX application can be realized on resources capable of decoding only a Primary TS is a key issue.

The limitation of allowing for playback of up to one for each type of the elementary streams can be assumed as "replacing" the elementary streams of Primary TS with those of the Secondary TS. Herewith, the Out_of_MUX application can be realized on resources capable of decoding only a single TS, avoiding an increase in costs of the decoders. According to the example of the figure, the audio stream, subtitle stream (PG), and menu stream (IG) of the Primary TS are replaced with those of the Secondary TS.

The Secondary TS may be input not only from a built-in HDD, such as the above-mentioned local storage, but also from a flush memory, a primary storage memory, and an HDD via a network, or by streaming via a direct network. For ease of explanation, assume that the Secondary TS is supplied from a built-in HDD like one shown in FIG. 1.

<Local Storage 200 Structure 2: Clip Information>

Clip information (00003.clpi, 00004.clpi) in the local storage has the same data structure as Clip information recorded in the BD-ROM. Here, TS_Recording_Rate of Clip information in the local storage is set to be the same as the bit rate for reading the AVClip from the BD-ROM. That is, TS_Recording_Rate written in Clip information of a SubClip is the same as TS_Recording_Rate written in Clip information of a MainClip. If TS_Recording_Rate of a MainClip is different from TS_Recording_Rate of a SubClip, the data rate for transmission from each source depacketizer to the buffer changes according to which TS is transmitted. This fails to establish the assumption that the Out_of_MUX application can be regarded as one input TS.

In addition, since the elementary streams to be played back are freely selected from two TSs, all the source depacketizer and the buffer in the decoder are set for a Primary TS bit rate when an audio of the Primary TS is selected, and all the source depacketizer and the buffer in the decoder are set for a Secondary TS bit rate when an audio of the Secondary TS is selected. This makes processes and verification of the playback apparatus cumbersome and complicated.

<Local Storage 200 Structure 2: PlayList Information>

Figure 16:
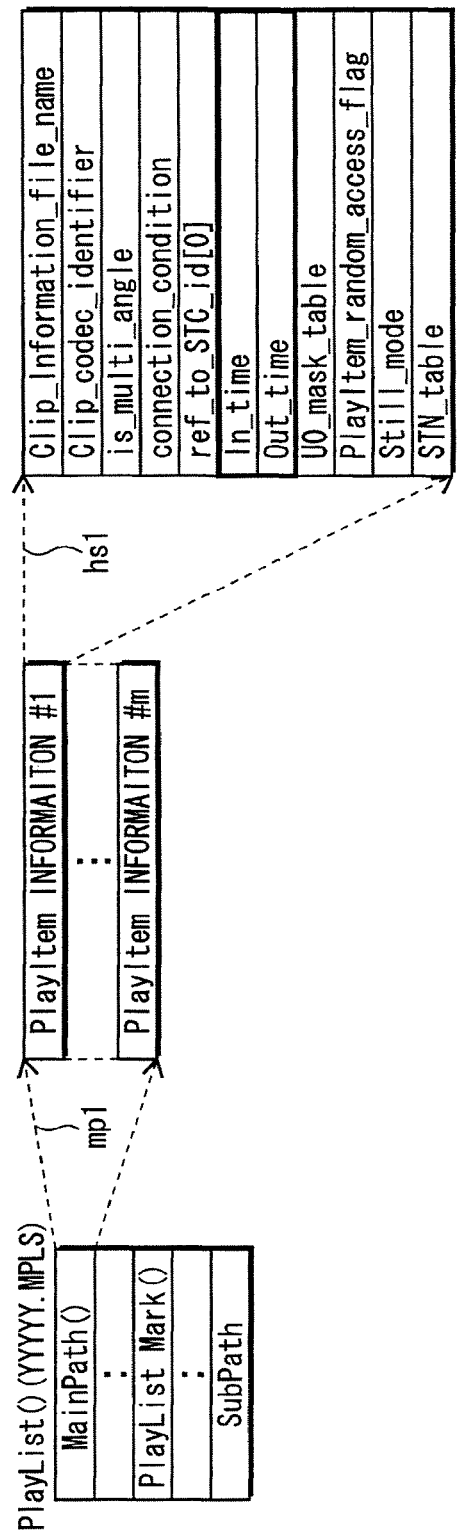
FIG. 16 shows a data structure of PlayList information.

Next is described PlayList information in the local storage 200. A file (00002.mpls) to which extension "mpls" is attached is information that defines a group made by binding up two types of playback paths called MainPath and Subpath as Playlist (PL). FIG. 16 shows the data structure of the PlayList information. As shown in the figure, the PlayList information includes: MainPath information (MainPath( ))

that defines MainPath; PlayListMark information (PlayList-Mark( )) that defines a chapter; and Subpath information (Subpath( )) that defines Subpath. The internal structures of the PlayList information and PlayItem information are the same as those in the BD-ROM, and therefore their descriptions are omitted here. The following describes the Subpath information.

<PlayList Information Explanation 1: Subpath Information>

Whereas the MainPath is a playback path defined for the MainClip which is a main video, the Subpath is a playback path defined for the SubClip which synchronizes with the MainPath.

Figure 17:
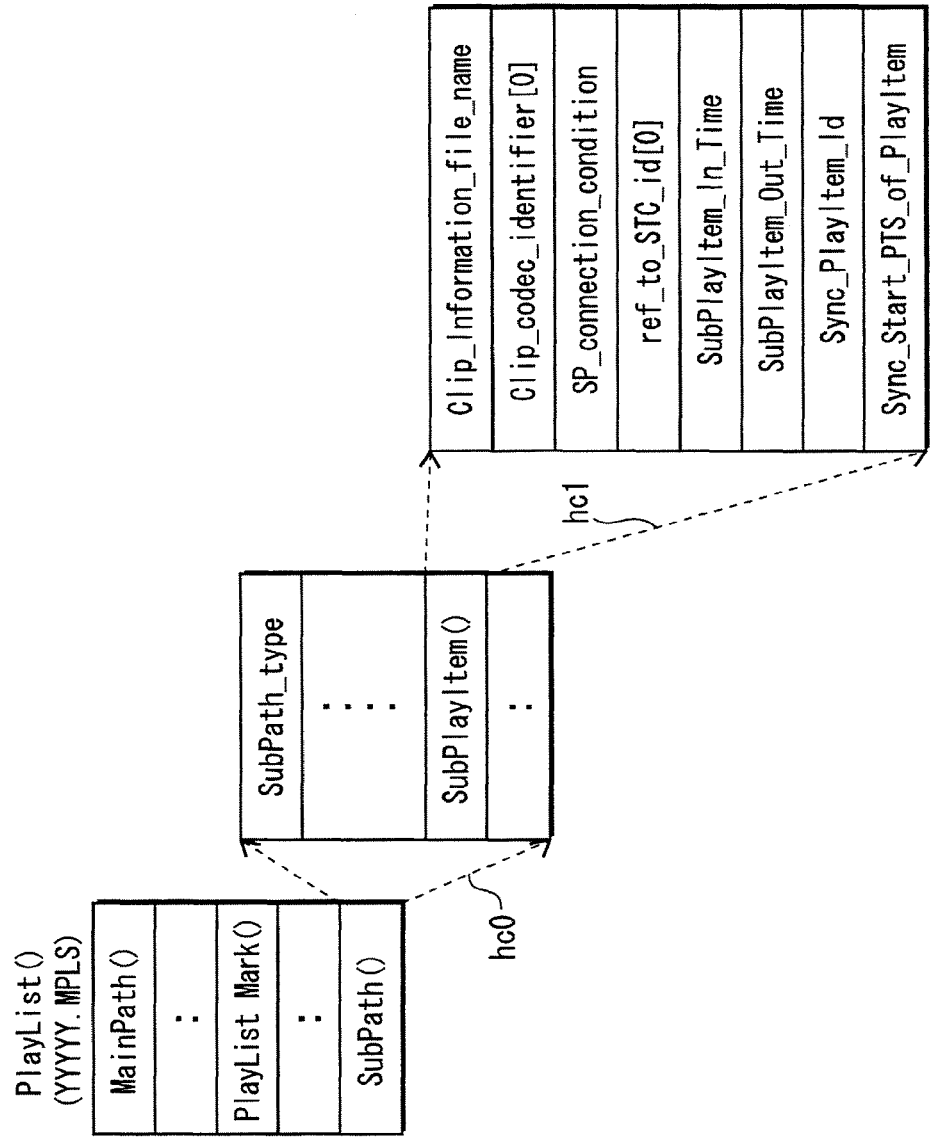
FIG. 17 shows a close-up of an internal structure of Subpath information.

FIG. 17 shows a close-up of the internal structure of the Subpath information. As indicated by the arrow hc0 in the figure, each Subpath includes "SubPath_type" indicating a type of the SubClip and one or more pieces of SubPlayItem information ( . . . SubPlayItem( ) . . . ).

The lead line hc1 in the figure indicates a close-up of the structure of SubPathItem information. As indicated by the arrow hc1 in the figure, SubPlayItem information includes:

"Clip_information_file_name"; "Clip_codec_identifier";
"SP_connection_condition"; "ref_to_STC_id[0]";
"SubPlayItem_In_time"; "SubPlayItem_Out_time";
"sync_PlayItem_id"; and "sync_start_PTS_of_PlayItem".

The "Clip_information_file_name" is information that uniquely specifies a SubClip corresponding to SubPlayItem by describing a file name of the Clip information.

The "Clip_codec_identifier" indicates an encoding system of the AVClip.

The "SP_connection_condition" indicates a state of connection between SubPlayItem(current SubPlayItem) and SubPlayItem(previousSubPlayItem) immediately preceding SubPlayItem(current SubPlayItem).

The "ref_to_STC_id[0]" uniquely indicates an STC_Sequence at which PlayItem aims.

The "SubPlayItem_In_time" is information indicating a start point of SubPlayItem on the playback time axis of the SubClip.

The "SubPlayItem_Out_time" is information indicating an end point of SubPlayItem on the Playback time axis of the SubClip.

The "sync_PlayItem_id" is information uniquely specifying, from among PlayItems making up the MainPath, PlayItem with which SubPlayItem synchronizes. The "SubPlayItem_In_time" is present on the playback time axis of PlayItem specified with the sync_PlayItem_id.

The "sync_start_PTS_of_PlayItem" indicates, with a time accuracy of 45 KHz, where the start point of SubPlayItem specified by SubPlayItem_In_time is present on the playback time axis of PlayItem specified with the sync_PlayItem_id.

<Details of Subpath Information 2. Relationship of Three Objects>

Here, the three objects mean SubClips in the local storage 200, PlayList information in the local storage 200 and the MainClip in the BD-ROM.

Figure 18:
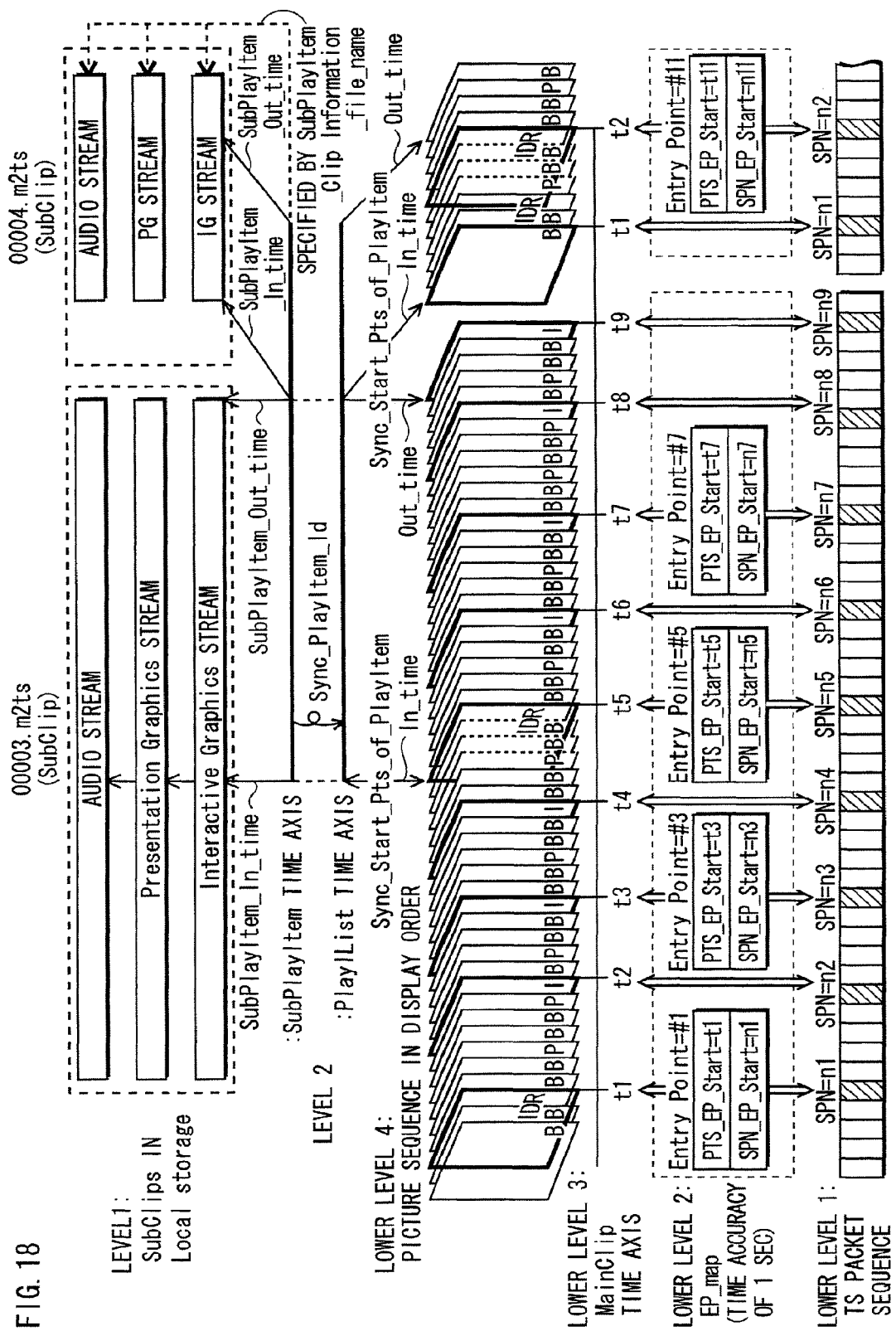
FIG. 18 shows relationship of SubClips in the local storage 200, PlayList information in the local storage 200 and MainClip in the BD-ROM.

FIG. 18 shows relationship of SubClips in the local storage 200, PlayList information in the local storage 200 and the MainClip on the BD-ROM. Level 1 of the figure indicates SubClips present in the local storage 200. As shown in Level 1, there are different types of Secondary TS in SubClips of the local storage 200: an audio stream, a PG stream and an IG stream. Any one of them is used as a SubPath for the synchronous playback.

Level 2 indicates two time axes defined by PlayList information. The lower time axis in Level 2 is a PlayList time axis defined by PlayItem information and the upper time axis is SubPlayItem time axis defined by SubPlayItem.

As shown in the figure, it can be seen that SubPlayItem_Clip_information_file_name of SubPlayItem information plays a role of selecting, from among .m2ts files storing SubClips, a .m2ts file as a target for the playback section.

SubPlayItem.Out_time play roles in defining the start point and end point of the playback section.

The arrow Sync_PlayItem_Id plays a role in specifying which PlayItem is synchronized with SubPlayItem. The sync_start_PTS_of_PlayItem plays a role in determining a time point of SubPlayItem_In_time on the PlayList time axis.

Thus concludes the description of the SubPath information.

<STN_Table>

A feature of the PlayList information in the local storage 200 is an STN_Table. The following describes PlayLIst information in the local storage 200.

The STN_table is a table showing at least one combination of elementary streams that are allowed to be played back simultaneously. The combination of elementary streams have been selected from multiple elementary streams multiplexed into a MainClip specified by Clip_Information_file_name of PlayItem information as well as multiple elementary streams multiplexed into a SubClip specified by Clip_Information_file_name of SubPlayItem information. Such multiple elementary streams allowed to be played back simultaneously in the STN_table in the PlayList information form the so-called "system stream".

Specifically speaking, the STN_table is formed by associating a Stream_entry of each of the multiple elementary streams multiplexed into the MainClip and those multiplexed into the SubClip with a Stream_attribute.

FIG. 19A shows an internal structure of the STN_table. As shown in the figure, the STN_table includes multiple pairs of an entry and an attribute (entry-attribute), and has a data structure showing the count of these entry-attribute pairs (number_of_video_stream_entries, number_of_audio_stream_entries, number_of_PG_stream_entries, number_of_IG_stream_entries).

The entry-attribute pairs respectively correspond to each of the video streams, audio streams, PG streams and IG streams that can be played back in PlayItem, as shown by the symbol of "{" in the figure.

The following describes the details of the entry-attribute.

FIG. 19B shows a Stream_attribute corresponding to a video stream.

The Stream_attribute of the video stream includes "Video format" indicating a display format of the video stream and "frame rate" indicating a frequency for displaying the video stream.

FIG. 19C shows a Stream_attribute corresponding to an audio stream.

The Stream_attribute of the audio stream is composed of: "stream_coding_type" indicating an encoding method of the audio stream; "audio_presentation_type" indicating a channel structure of the corresponding audio stream; "Sampling_frequency" indicating a sampling frequency of the corresponding audio stream; and "audio_language code" indicating a language attribute of the audio stream.

FIG. 19D shows a Stream_entry of the audio stream. As shown in the figure, the Stream_entry of the video stream includes "ref_to_Stream_PID_of_Main_Clip" indicating a PID used for demultiplexing the video stream.

Stream_attribute of an audio stream, an IG stream and a PG stream multiplexed into a MainClip has a format shown in FIG. 19D.

<Restriction on Data Amount of Elementary Streams Allowed to Be Played Back>

The STN_table shows, among elementary streams read from the BD-ROM and the local storage, ones allowed to be played back. However, if such a STN_table allows elementary streams to be played back with no restriction, the decoder system may be broken down.

The reason for this is as follows. According to the MPEG2 decoder system standard, an overlap between TS packets on the ATC time axis in one transport stream is not allowed. This is a basic principle in order to cause the decoder system to perform a proper decoding process. On the other hand, in the case where both playback of a stream read from the BD-ROM and playback of a stream read from the local storage are allowed, and then playback of an AVClip read from the BD-ROM and playback of an AVClip read from the local storage are performed simultaneously, an overlap is created between a TS packet from the BD-ROM and a TS packet from the local storage.

Given this factor, the following restriction is imposed on decoding elementary streams.

The decoding elementary streams are a video stream, an audio stream, a PG stream and an IG stream that have been allowed in the STN_table to be played back and have been selected for simultaneous playback. Some decoding elementary streams are read from the local storage and others are read from the BD-ROM.

The restriction imposed on the decoding elementary streams is that the bit amount of TS packets (Decoding TS packets) constituting an AVClip (MainClip, SubClip) that includes elementary streams allowed in the STN_table to be simultaneously played back but does not include elementary streams not allowed to be played back must be 48 Mbits/second or less.

The unit time of one second is called the "Window", and can be located at any point on the time axis of the ATC_Sequence. That is to say, the bit amount of the decoding elementary streams during one second at any point must be 48 Mbits or less.

FIG. 20 shows TS packets read from the BD-ROM and from the local storage, and illustrates, of these TS packets, ones to be supplied to the decoder. Level 1 of the figure shows multiple TS packets read from the BD-ROM; Level 3 shows multiple TS packets read from the local storage. Among the TS packets in Levels 1 and 3, hatched ones in the figure are TS packets constituting a decoding elementary stream (Decoding TS packets). Level 2 in the figure shows, of the Decoding TS packets shown in Levels 1 and 3, ones occurring in a period of one second. As has been described above, according to the MPEG2 decoder system standard, an overlap is not allowed between TS packets on the ATC time axis in one transport stream. However, it can be seen from the figure that overlaps rp1, rp2 and rp3 between TS packets occur on the ATC time axis. Thus, overlaps in the TS packet operations are allowed in the unit time of the Window. However, another requirement, which is not applied to the MPEG2 decoder system standard, is imposed. That is the above-mentioned restriction of 48 Mbits/Window or less. Level 4 presents mathematical expressions of the condition that the Decoding TS packets must satisfy. The mathematical expressions indicate that a value obtained by converting the count of the above-mentioned Decoding TS packets into a bit count (the count of the Decoding TS packets is multiplied by the number of bytes of a TS packet, 188, and the result is expressed in 8 bits) is 48 Mbits or less.

Imposing the above-mentioned condition on the Decoding TS packets in any period of one second is the restriction of the bit amount according to the present embodiment. When the authoring is performed for the Out_of_MUX application, it is checked whether the bit amount of a Decoding TS packet over the period of one second is 48 Mbits or less while keeping the Window shifting on the Source Packet sequence by one packet each time. When the limitation is satisfied, the Window is shifted to the next TS packet. If the limitation is not satisfied, it is determined that there is a violation of the BD-ROM standard. When the Out_Time of the Window reaches the last Source Packet after the repetition of such shifts, it is determined that the Source Packets conform to the BD-ROM standard.

<Window Shifting>

An ATS having a time accuracy of 27 MHz is attached to each TS packet. Coordinates on the ATC time axis have a time accuracy of $1/27,000,000$ second; however, an ATS is not always present at each coordinate on the ATC time axis. On the ATC time axis, periods having no ATS and periods having an ATS appear in an irregular manner. The occurrence of ATSs is varied, and therefore when the Window is shifted, how to adjust the Out_Time of the Window becomes an issue in the case where an ATS is absent 1 second after the In_Time.

The Out_Time of the Window is, in principle, set to be 1 second after the In_Time. Here, if an ATS is present, on the ATC time axis, at a coordinate corresponding to 1 second after the In_Time, the coordinate of the In_Time+1 second is set as the Out_Time. If an ATS is absent at the coordinate corresponding to 1 second after the In_Time, a coordinate at which an ATS appears on the ATC time axis for the first time after the In_Time+1 second is set as the Out_Time. Since the Out_Time of the Window shifting is adjusted by taking into account time periods during which no ATS is present, a different bit value is calculated each time when the Window shifts. The In_Time is shifted by one TS packet each time, and the Out_Time is adjusted in accordance with the shift, and thereby the transition of the bit values in the ATC time axis can be calculated with precision.

Figure 21A:
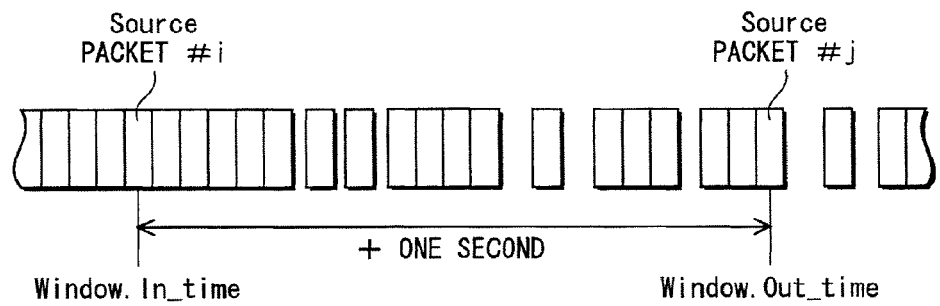
FIGS. 21A-21D show shift of Window.

FIGS. 21A-21D shows the shift of the Window. In each of FIGS. 21A to 21D, the upper part shows a Source Packet sequence which is a target for verification, and the lower part shows the In_Time and Out_Time of the Window. In FIG. 21A, the In_Time of the Window specifies a Source Packet #i. A TS packet #j corresponding to 1 second after the In_Time of the Window is set as the Out_Time of the Window.

Figure 21B:
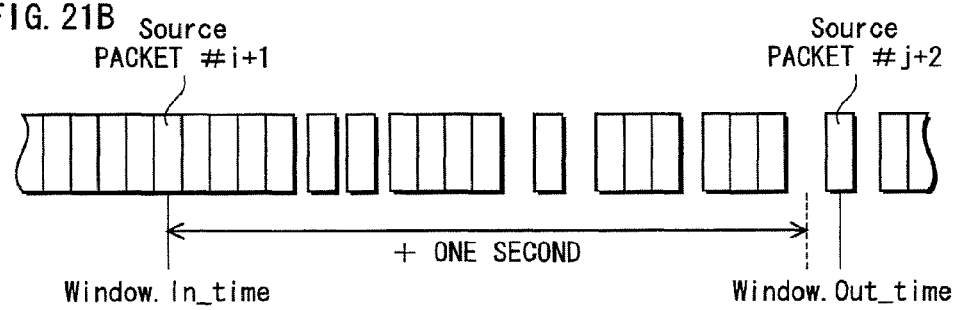

In FIG. 21B, the In_Time of the Window specifies a Source Packet #i+1. On the other hand, no ATS is present at the coordinate corresponding to the Source Packet #j+1, which is 1 second after the In_Time of the Window. The Out_Time of the Window of FIG. 21B should specify one TS packet beyond the TS packet #j; however, since a Source Packet is not present immediately after the TS packet #j, the bit rate of the Window of FIG. 21B becomes smaller than the bit rate of the Window of FIG. 21A. In such a case, there is no point for the Window of FIG. 21B performing the check. Given this factor, by adjusting the Out_Time of the Window, a TS packet #j+2, which appears for the first time after 1 second from the In_Time of the Window, is set as the Out_Time. Setting the Out_Time in this way makes the check of the Window of FIG. 21B worth performing.

Figure 21C:
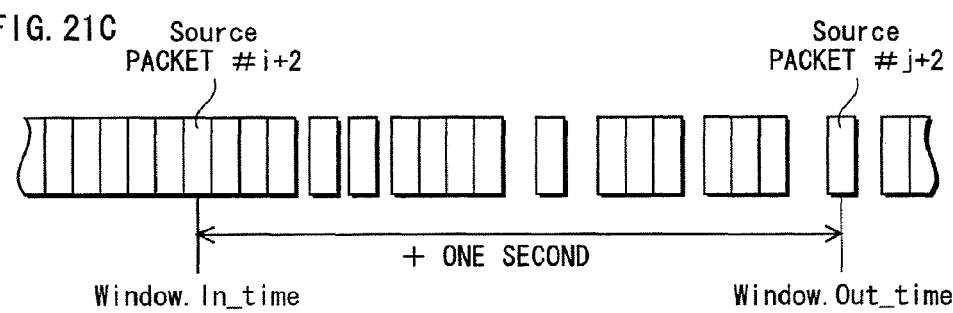

In FIG. 21C, the In_Time of the Window specifies a Source Packet #i+2. On the other hand, the TS packet #j+2 is located at a position corresponding to 1 second after the In_Time of the Window. The count of the TS packets for the Window of FIG. 21C is the same as that for the Window of FIG. 21C, and therefore there is no point for performing the check. Accordingly, no check is performed in FIG. 21C, and the In_Time of the Window is shifted.

Figure 21D:
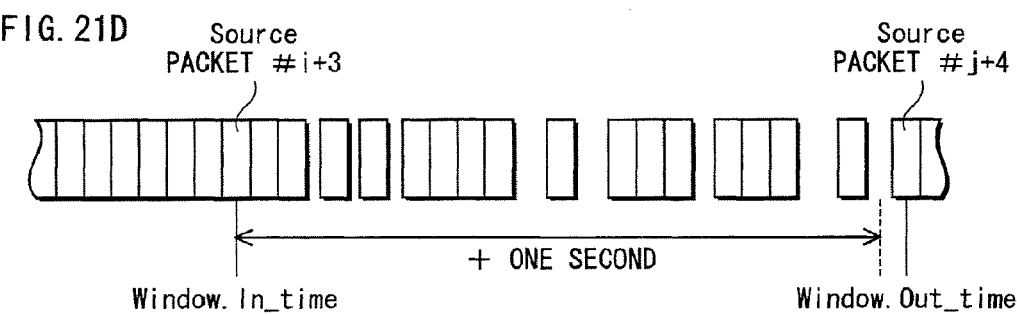

In FIG. 21D, the In_Time of the Window specifies a Source Packet #I+3. On the other hand, no Source Packet is present at a position corresponding for a Source Packet #j+3, which is in 1 second after the In_Time of the Window. Given this factor, by adjusting the Out_Time of the Window in a manner described above, a TS packet #j+4, which appears for the first time after 1 second from the In_Time of the Window is set as the Out_Time. Herewith, the count of the TS packets in the Window becomes different from that for the Window of FIG. 21B, and the check of the Window of FIG. 21D is made to be worth performing.

By performing the bit amount check with the Window shift in the above described manner when the authoring is carried out, it is guaranteed that no underflow or overflow is caused when TS packets are read from the local storage and the BD-ROM and supplied to the decoder.

The assurance of the Window shift is described next with reference to specific examples of FIGS. 22-26.

Level 1 in FIG. 22 is a graph showing temporal transition regarding the data amount of TS packets read from the BD-ROM as well as the data amount of TS packets read from the local storage. The horizontal axis is time and the vertical axis is transmission amounts in relation to each point on the time axis. In the graph, the bit amounts at the time when TS packets are being read from the BD-ROM and the local storage undergo a transition as indicated by the dashed curves.

Level 2 in FIG. 22 shows the total data amount of, from among the TS packets read from the BD-ROM and the local storage, TS packets which are to be supplied to the decoder. The temporal transition of the total transmission amount is as shown by the solid curve. The total data amount is the sum amount of TS packets belonging to streams that have been allowed in the STN_table. In the worst case, the total transmission amount would reach close to 96 Mbits and TS packets having this data amount would be supplied to the decoder. Here, the time axis of the graph is divided into seven Windows, and a comparison is made between the supply amount in each Window and the transmittable amount for each Window.

Level 3 in FIG. 22 is the graph of Level being divided for every 1 second. FIGS. 23A and 23B show the comparison between the transmittable amount and the amount supplied to the decoder for each Window. The transmittable amount for a Window is 48 Mbits per second, and it is 96 Mbits if the amount is converted in bit per 0.5 seconds. A hatching pattern pn1 in the figure indicates the data amount supplied to the decoder. A hatching pattern pn2 in the figure indicates the transmittable amount in each Window. In any Window, the portion with the hatching pattern pn1 has the same or smaller area than the portion with the hatching pattern pn2. This indicates that the data amount supplied from the BD-ROM and the local storage is limited to the transmittable amount or less in any Window.

At any point on the ATC time axis, the transmittable amount to the decoder is 48 Mbits/second or less. Therefore, even if the transmittable amount to the decoder locally reaches close to 96 Mbits, the transmission at 96 Mbits never continues for 0.5 seconds, as evidenced by the calculation of 48 Mbits=96 Mbits×0.5 seconds. Accordingly, if the decoder performs a prior read operation to read in advance Source Packets from the BD-ROM and the local storage before the peak is reached, no underflow or overflow is caused in the buffer of the decoder.

The transmittable amount in each Window, i.e. 48 Mbits/second, has been determined using, as a guide, an amount that a decoder complying with MPEG can read in advance into the buffer. If the amount of data that can be read in advance into the buffer is larger, the data amount per second can be made larger, or the period for the Window can be set longer. Thus, the present invention is not limited to the rate of 48 Mbits/second.

Thus concludes the description of the restriction of the data amount on a Secondary TS that is allowed in the STN_table to be played back.

<Setting of connection_condition Information and sp_connection_condition Information>

The following describes settings of connection_condition information in PlayItem and sp_connection_condition information in SubPlayItem for realizing the Out_of_MUX application. The fields of connection_condition information and sp_connection_condition information can take values of "1", "5", and "6", the meanings of which are as follows.

connection_condition=1 (CC=1): There is no guarantee for a seamless connection between PlayItem (current PlayItem) and the immediate previous PlayItem (previous PlayItem). That is, it is a connection mode that allows a freeze to occur and the playback is interrupted (non-seamless connection).

connection_condition=5 (CC=5): There is a guarantee for a seamless connection between a video stream, a PG stream and an IG stream multiplexed into the MainClip of the current PlayItem and a video stream, a PG stream and an IG stream multiplexed into the MainClip of the previous PlayItem. On the other hand, this is not the case with an audio stream multiplexed into the MainClip.

connection_condition=6 (CC=6): Respective TS streams belonging to the current PlayItem and to the previous PlayItem, respectively, are logically continued (they are continuous on the time axis, and the encoding methods are also the same), and there is a guarantee for a seamless connection of both audio and video streams.

sp_connection_condition information written in SubPlayItem#n can be defined as follows.

sp_connection_condition information (SP_CC=1): There is no guarantee for a seamless connection between SubPlayItem (current SubPlayItem) and the immediate previous SubPlayItem (previous SubPlayItem).

sp_connection_condition information (SP_CC=5): There is a guarantee for a seamless connection between a PG stream and an IG stream multiplexed into the SubClip of the current SubPlayItem and a PG stream and an IG stream multiplexed into the SubClip of the previous SubPlayItem. On the other hand, this is not the case with an audio stream multiplexed into the SubClip.

sp_connection_condition information (SP_CC=6): Respective TS streams belonging to the current SubPlayItem and to the previous SubPlayItem, respectively, are logically continued (they are continuous on the time axis, and the encoding methods are also the same), and there is a guarantee for a seamless connection.

SubPlayItem to be set for PlayItem that realizes the Out_of_MUX application should not cause discordance even if a video stream, an audio stream, a PG stream or an IG stream of SubPlayItem is within PlayItem. Therefore, they have identical connection conditions. That is, if PlayItem#1 and PlayItem#2 are connected by CC=1, SubPlayItem#1 and SubPlayItem#2 corresponding to them are also connected by CC=1. Similarly, if PlayItem#1 and PlayItem #2 are connected by CC=5, the corresponding SubPlayItem#1 and SubPlayItem#2 are connected while satisfying the condition of CC=5.

Figure 24:
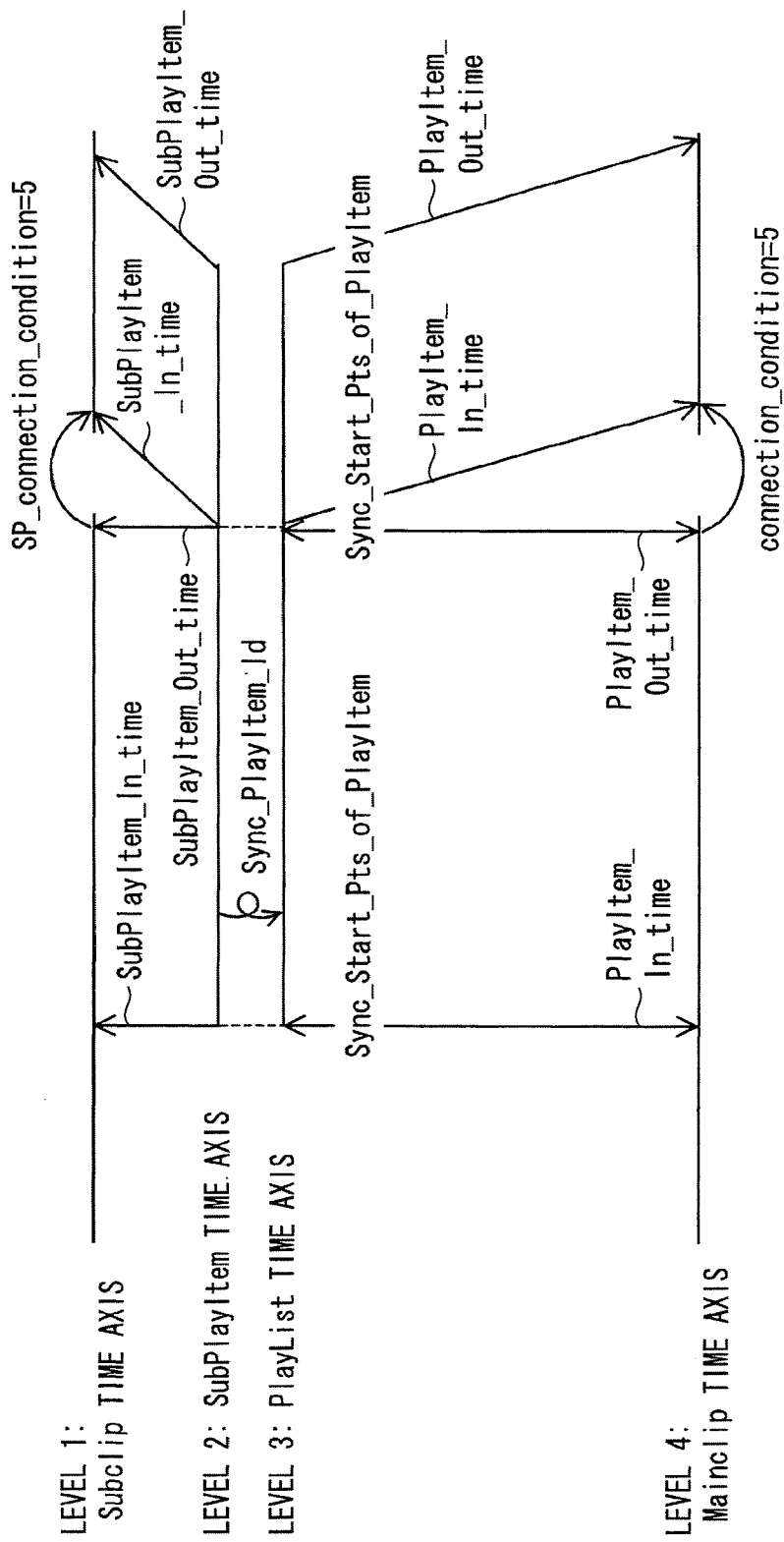
FIG. 24 shows a connection state of PlayItems and SubPlayItems constituting the Out_of_MUX.
Figure 25:
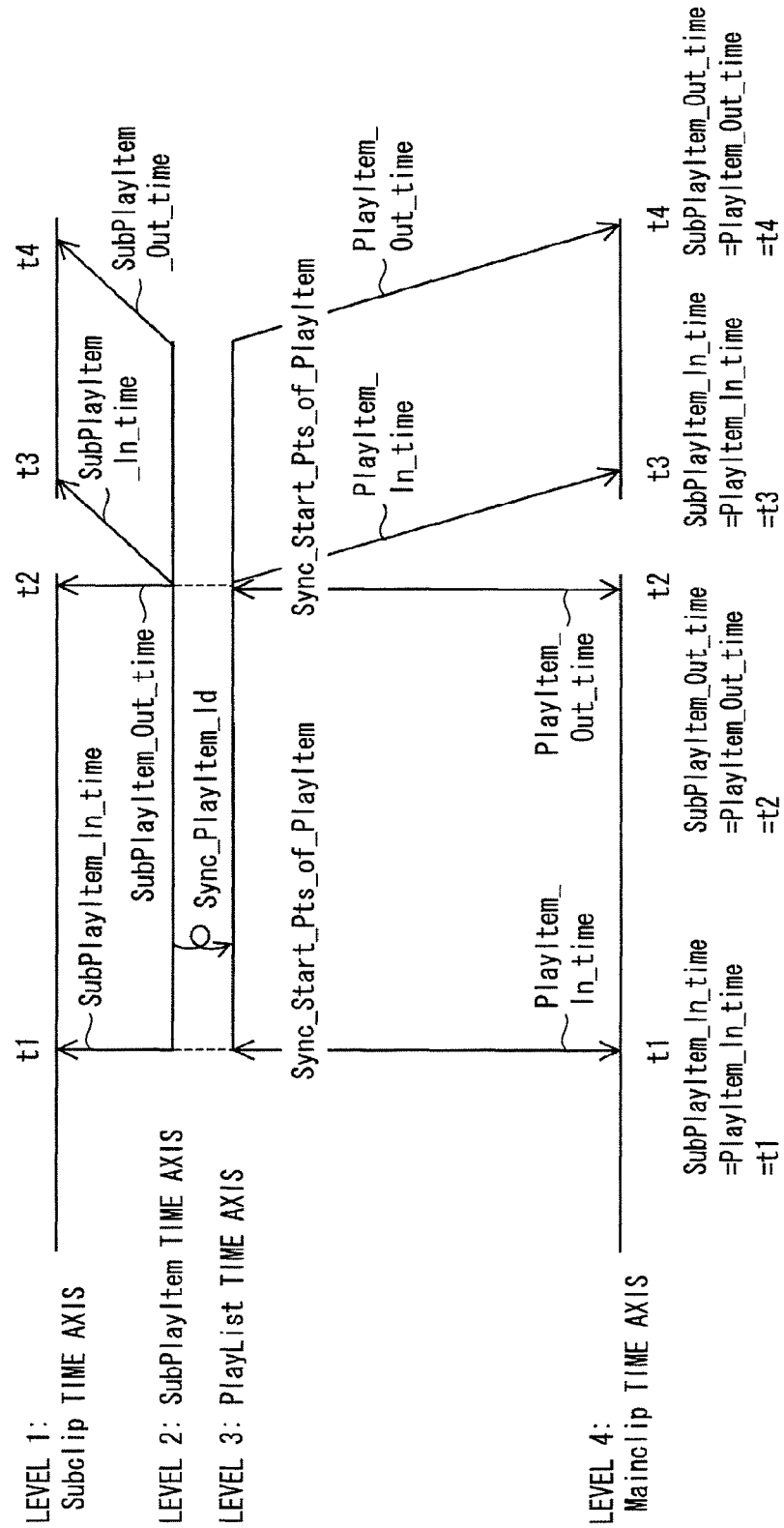
FIG. 25 shows a relationship between In_Times and Out_Times of PlayItems and In_Times and Out_Times of SubPlayItems in the case where connection_condition information of PlayItem and sp_connection_condition information of SubPlayItem shown in FIG. 24 are set to "=5"
Figure 26:
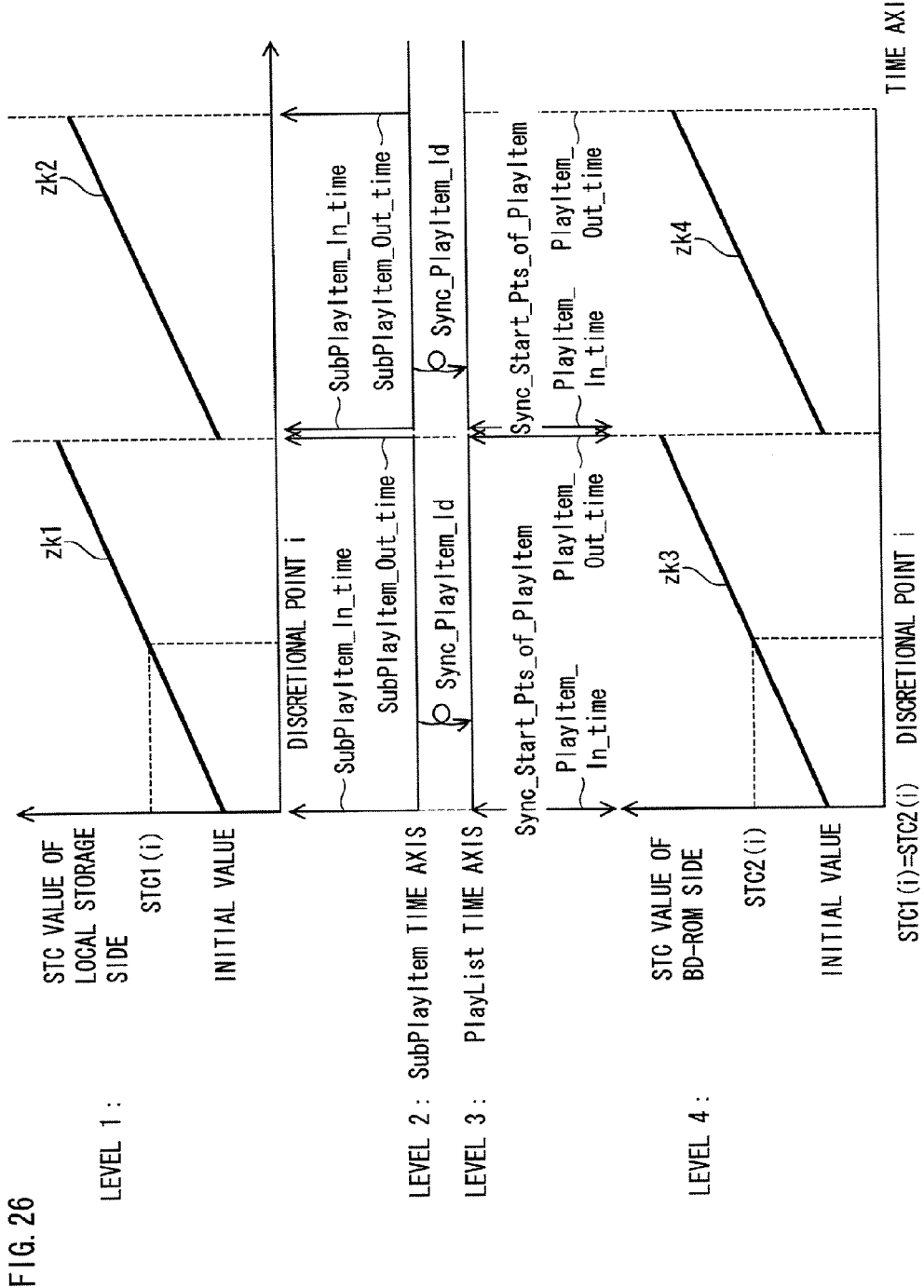
FIG. 26 shows an STC value to be referred to when part existing from In_Time to Out_Time of PlayItem is played back and an STC value to be referred to when part existing from In_Time to Out_Time of SubPlayItem is played back.

The following describes the relationship of In_Times and Out_Times of PlayItems and SubPlayItems constituting the Out_of_MUX application as well as the detail of connection_condition information with reference to FIGS. 24, 25 and 26.

<Relationship of In_Times and Out_Times>

FIG. 24 shows a connection state of PlayItems and SubPlayItems constituting the Out_of_MUX. Level 1 of the figure is a SubClip time axis; and Levels 2 and 3 are a SubPlayItem time axis and a PlayList time axis, respectively. Level 4 is a MainClip time axis. In the figure, in the case where connection_condition information of PlayItem is "=5", connection_condition information of SubPlayItem is also SP_CC=5.

FIG. 25 shows the relationship between In_Times and Out_Times of PlayItems and In_Times and Out_Times of SubPlayItems in the case where connection_condition information of PlayItem and sp_connection_condition information of SubPlayItem shown in FIG. 24 are set to "=5". Levels 1 and 4 are the same as those in FIG. 24. Of two PlayItems (PlayItem information #1 and PlayItem information #2) shown in FIG. 24, PlayItem information #1 has In_Time indicating a time point t1 and has Out_Time indicating a time point t2. In_Time of PlayItem information #2 indicates a time point t3, and Out_Time of PlayItem information #2 indicates a time point t4.

When the connection state of PlayItem is CC=5, Sync_Start_Pts_of_PlayItem of SubPlayItem indicates the same time point as In_Time of PlayItem. In_Time and Out_Time of SubPlayItem show the same time points as In_Time and Out_Time of PlayItem. Thus, in the case where connection_condition information of PlayItem is "=5", sp_connection_condition information of SubPlayItem is also set to "=5", and In_Time and Out_time of PlayItem indicate the same time points as In_Time and Out_Time of SubPlayItem.

In_Time and Out_Time of PlayItem and In_Time and Out_Time of SubPlayItem respectively refer to PTSs of a Video Presentation Unit and an Audio Presentation Unit. In_Time and Out_Time of PlayItem and In_Time and Out_Time of SubPlayItem matching each other means that PTS values of the Video Presentation Unit and Audio Presentation Unit referred to by In_Time and Out_Time of PlayItem are the same as PTS values of the Video Presentation Unit and Audio Presentation Unit referred to by In_Time and Out_Time of SubPlayItem. In this case, it is necessary that Primary TS and Secondary TS should be encoded so as to have the same length of time and to cause PTSs of the Video Presentation Unit and Audio Presentation Unit to be the same when the authoring is performed. Creating Primary TS and Secondary TS in this way is also a condition for realizing CC=5 and SP_CC=5.

<Summary of Relationship with Seamless Connection Point>

The relationship between a seamless connection point, the current PlayItem and the current SubPlayItem clearly shown by these figures are as follows. In the case where connection_condition information of PlayItem information and sp_connection_condition information of SubPlayItem information indicate seamless connections at the same connection point (CC=5 and SP_CC=5), the current PlayItem and the current SubPlayItem are positioned immediately after the seamless connection points. Therefore, PlayItem.In_Time indicating the start point of the current PlayItem positioned immediately after the seamless connection point coincides with SubPlayItem.In_Time indicating the start point of the current SubPlayItem positioned immediately after the seamless connection point.

<SIC Values to be Referred to for Synchronous Playback>

FIG. 26 shows an STC value to be referred to when part existing from In_Time to Out_Time of PlayItem is played back and an STC value to be referred to when part existing from In_Time to Out_Time of SubPlayItem is played back. Levels 2 and 3 are the same as those in the previous figure. Level 1 shows, in graph format, an STC value to be referred to when part existing from In_Time to Out_Time of SubPlayItem is played back. Level 4 shows, in graph format, an STC value to be referred to when part existing from In_Time to Out_Time of PlayItem is played back. The horizontal axis of Level 1 is a time axis, and the vertical axis shows STC values in relation to each time point on the time axis. The STC values of Level 1 include a monotonic increase zk1 from In_Time to Out_Time of SubPlayItem information #1 and a monotonic increase zk2 from In_Time to Out_Time of SubPlayItem information #2. The STC values of Level 4 include a monotonic increase zk3 from In_Time to Out_Time of PlayItem information #1 and a monotonic increase zk4 from In_Time to Out_Time of PlayItem information #2.

As In_Time of PlayItem indicates the same time point of In_Time of SubPlayItem, the initial values of the STCs in the above graph are the same and the STC values in the middle time points are also the same. That is, STC2(i), which is an STC value to be referred to when a Source Packet located at a discretional time point between In_Time and Out_Time of PlayItem is supplied to the decoder, is the same as STC1(i), which is an STC value to be referred to when a Source Packet located at the same time point i between In_Time and Out_Time of SubPlayItem is supplied to the decoder. When the STC values are the same, all the STC counters in the apparatus have to do is to create the same clock values and supply them to the demultiplexing units, thus simplifying controls on the playback apparatus.

Hypothetically speaking, in the case where two or more SubPlayItems are prepared for one PlayItem against the controls illustrated in FIGS. 25 and 26, the video and audio are interrupted at the boundary of these SubPlayItems, and inconveniences—such as playback suspension in the middle of PlayItem—will result. Additionally, when a process of replacing a Primary TS with a Secondary TS is realized in the Out-of-MUX application, the STC time axis have to be changed at the replacement, which leads to complication of the synchronous controls on the playback apparatus. On the other hand, by defining both In_Time and Out_Time of PlayItem or SubPlayItem on a continuous STC time axis, it is possible to prevent the above-mentioned inconveniences, i.e. an interruption of video and audio and replacement of transport streams. Due to these situations, with respect to one PlayItem, one SubPlayItem having the same start and end points as those of the PlayItem is assigned.

<Errors of In_Time and Out_Time>

Here, an exact match between In_Time and Out_Time of PlayItem and those of SubPlayItem is not required, and some degree of errors can be allowed. The errors of In_Time and Out_Time are described next.

STC times of In_Time and Out_Time of PlayItem are set for video frames of PlayItem. On the other hand, STC times of In_Time and Out_Time of SubPlayItem are set for audio frames of SubPlayItem. This is because SubPlayItem is mainly used for commentary and therefore it is often the case that a video stream is not multiplexed thereinto. In this case, due to, in a precise sense, a difference in the length of playback period of respective presentation units, their start and end times do not match each other. Accordingly, it is necessary to allow an error of, at least, less than one frame. The start and end times of PlayItem#n and SubPlayItem#n are also specified on the same STC time axis as follows:

|(PlayItem#n.Out−PlayItem#n.In)−
(SubPlayItem#n.Out_time−SubPlayItem#n.In_time)|≤the playback period of 1 progressive frame or two interlace fields of video having the shortest playback period in PlayItem#n≤1/60 seconds. For the value of the left-hand side, the playback period of 1 progressive frame or two interlace fields of video having the longest playback period in PlayItem#n≤1/25) may be used, or the value can be set to be 1 second or less.

Thus concludes the description of the relationship of In_Times and Out_Times of PlayItem and SubPlayItem.

The following describes connection_condition information and sp_connection_condition information in detail. In order to satisfy CC=5 and SP_CC=5, the following conditions have to be met in all the levels of AV stream, transport stream, Video Presentation Unit and Audio Presentation Unit, and elementary stream.

<Level of AV Stream> connection_condition information of the current PlayItem and sp_connection_condition information being set to "5" means that there is "Clean Break" between the end point of an AV stream played back in the previous PlayItem and the start point of the AV stream played back in the current PlayItem.

In order to realize Clean Break, the AV stream played back in the previous PlayItem and the AV stream played back in the current PlayItem must satisfy the following requirements.

(1) An unnecessary Access Unit is absent at the end point of MainClip specified in the previous PlayItem, and an unnecessary Access Unit having a PTS has been excluded from the period following Out_Time of the previous PlayItem.

Similarly, an unnecessary Access Unit is absent at the end point of SubClip specified in the previous SubPlayItem, and an unnecessary Access Unit having a PTS has been excluded from the period following Out_Time of the previous SubPlayItem.

(2) At the start of the AV stream specified in the current PlayItem, an unnecessary Access Unit having a PTS has been excluded from the period prior to In_Time of the current PlayItem. In addition, the first Audio Presentation Unit of MainClip includes Sample to be played back at In_Time on the STC time axis.

Similarly, at the start of the AV stream specified in the current SubPlayItem, an unnecessary Access Unit having a PTS has been ecluded from the period prior to In_Time of the current SubPlayItem. In addition, the first Audio Presentation Unit of the SubClip includes Sample to be played back at In_Time on the STC time axis.

(3) Source Packets constituting the MainClip specified in the previous PlayItem must be multiplexed in a manner that all of them are taken into the decoder system before the first packet of the MainClip specified in the current PlayItem is sent to the decoder.

Similarly, data of the SubClip specified in the previous SubPlayItem must be multiplexed in a manner that all the data is taken into the decoder system before the first packet of the SubClip specified in the current SubPlayItem is sent to the decoder.

Thus concludes the description of conditions that should be satisfied at the level of the AV stream. Now, conditions that should be satisfied at the level of transport streams are described.

<Level of Transport Streams>

Here, two Primary TSs that are targets of a seamless connection when CC=5 are called Primary TS1 and Primary TS2. Two Primary TSs that are targets of a seamless connection when SP_CC=5 are called Secondary TS1 Secondary TS2.

Figure 27:
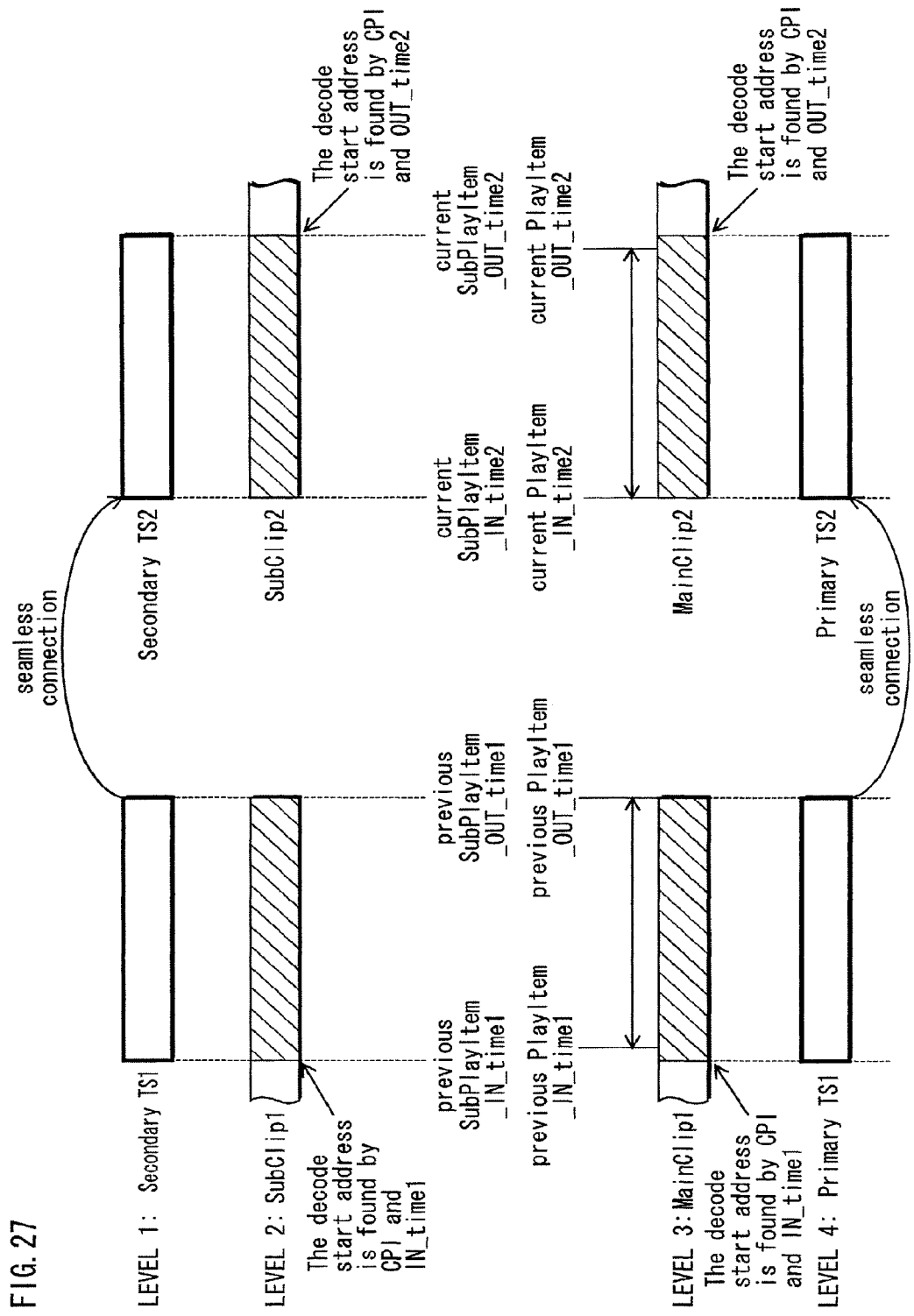
FIG. 27 shows how TS1s and TS2s are identified in a MainClip referred to in the previous PlayItem and a SubClip referred to in the current PlayItem.

FIG. 27 shows how TS1s and TS2s are identified in an AVClip referred to in the previous PlayItem and the previous SubPlayItem and in an AVClip referred to in the current PlayItem and the current SubPlayItem. Level 4 in the figure shows Primary TS1 and Primary TS2; and Level 3 shows MainClip1 of the previous PlayItem and MainClip2 of the current PlayItem. Level 1 shows Secondary TS1 and Secondary TS2; and Level 2 shows SubClip1 of the previous SubPlayItem and SubClip2 of the current SubPlayItem.

Primary TS1 is composed of a portion of data which is hatched in MainClip1 in the figure. This data portion in MainClip1 starts with a Source Packet from which decoding of In_Time in the previous PlayItem can be started. This Source Packet is located at the beginning of a Video Presentation Unit and an Audio Presentation Unit that are referred to by In_Time. Then, the data portion ends with the last packet of MainClip1.

Primary TS2 is composed of a portion of data which is hatched in MainClip2 in the figure. This data portion in MainClip2 starts with the first Source Packet of MainClip2. Then, the data portion in MainClip2 ends with a Source Packet at which decoding of the current PlayItem is finished. This Source Packet is a Source Packet located at the end of a Video Presentation Unit and an Audio Presentation Unit that are referred to by Out_Time of the current PlayItem.

Secondary TS1 is composed of a portion of data which is hatched in SubClip1 in the figure. This data portion in SubClip1 starts with a Source Packet from which decoding of In_Time in the previous SubPlayItem can be started. This Source Packet is located at the beginning of a Video Presentation Unit and an Audio Presentation Unit that are referred to by In_Time. Then, the data portion ends with the last packet of SubClip1.

Secondary TS2 is composed of a portion of data which is hatched in SubClip2 in the figure. This data portion in SubClip2 starts with the first Source Packet of SubClip2. Then, the data portion in SubClip2 ends with a Source Packet at which decoding of the current PlayItem is finished. This Source Packet is located at the end of a Video Presentation Unit and an Audio Presentation Unit that are referred to by Out_Time of the current SubPlayItem.

According to the description above, it can be understood how two transport streams to be connected are arranged in a MainClip and a SubClip when CC=5 and SP_CC=5. The MainClip of the previous PlayItem must end with a Video Presentation Unit and an Audio Presentation Unit that are referred to by Out_Time of the previous PlayItem, and the MainClip of the current PlayItem must start with a Video Presentation Unit and an Audio Presentation Unit which are referred to by In_Time of the current PlayItem. This relationship is also true for the previous SubPlayItem. That is, the SubClip of the previous SubPlayItem must end with an Audio Presentation Unit which is referred to by Out_Time of the previous SubPlayItem, and the SubClip of the current SubPlayItem must start with an Audio Presentation Unit which is referred to by In_Time of the current SubPlayItem. This is because an unnecessary Audio Presentation Unit should not be present at or after a Video Presentation Unit and an Audio Presentation Unit which are referred to by Out_Time of the previous SubPlayItem, as described above. On the other hand, the SubClip of the previous SubPlayItem does not have to start with an Audio Presentation Unit which is referred to by In_Time of the previous SubPlayItem, and SubClip of the current SubPlayItem also does not have to end with an Audio Presentation Unit which is referred to by Out_Time of Current SubPlay Item.

According to FIGS. 24 and 27, Primary TS and Secondary TS must be made to have the same length of time, and PTS values of the Video Presentation Unit and Audio Presentation Unit must be made to have the same value. In addition, the MainClip of the previous PlayItem and the SubClip of the previous PlayItem must be multiplexed in such a manner to end with a Video Presentation Unit and an Audio Presentation Unit corresponding to Out_Time. The MainClip of the current PlayItem and the SubClip of the current PlayItem must be multiplexed in such a manner to start with a Video Presentation Unit and an Audio Presentation Unit corresponding to In_Time.

Additionally, these transport streams must meet the following conditions:
the number of programs in TS1 and TS2 is one;
the number of video streams is one;
the number of audio streams is the same;
the content of STN_table of the previous PlayItem is the same as that of STN_table of the current PlayItem; and
the playback period of the transport stream in each PlayItem is three seconds.

These are the conditions that should be satisfied at the level of transport streams for connecting two streams when CC=5 and SP_CC=5. Now, conditions that should be satisfied at the level of a Video Presentation Unit and an Audio Presentation Unit are described.

<Level of Video Presentation Unit and Audio Presentation Unit>

Although the start time of the last Video Presentation Unit in the video stream of Primary TS1 is originally different from the end time of the first Video Presentation Unit in the video stream of Primary TS 2, CC=5 makes the start time and the end time match each other. When the end time and start time of the Video Presentation Units are made to match each other, how to handle such Video Presentation Units and Audio Presentation Units for synchronous playback becomes an issue. This is because video and audio have different sampling frequencies, and the length of times of a Video Presentation Unit and an Audio Presentation Unit do not match each other.

Figure 28:
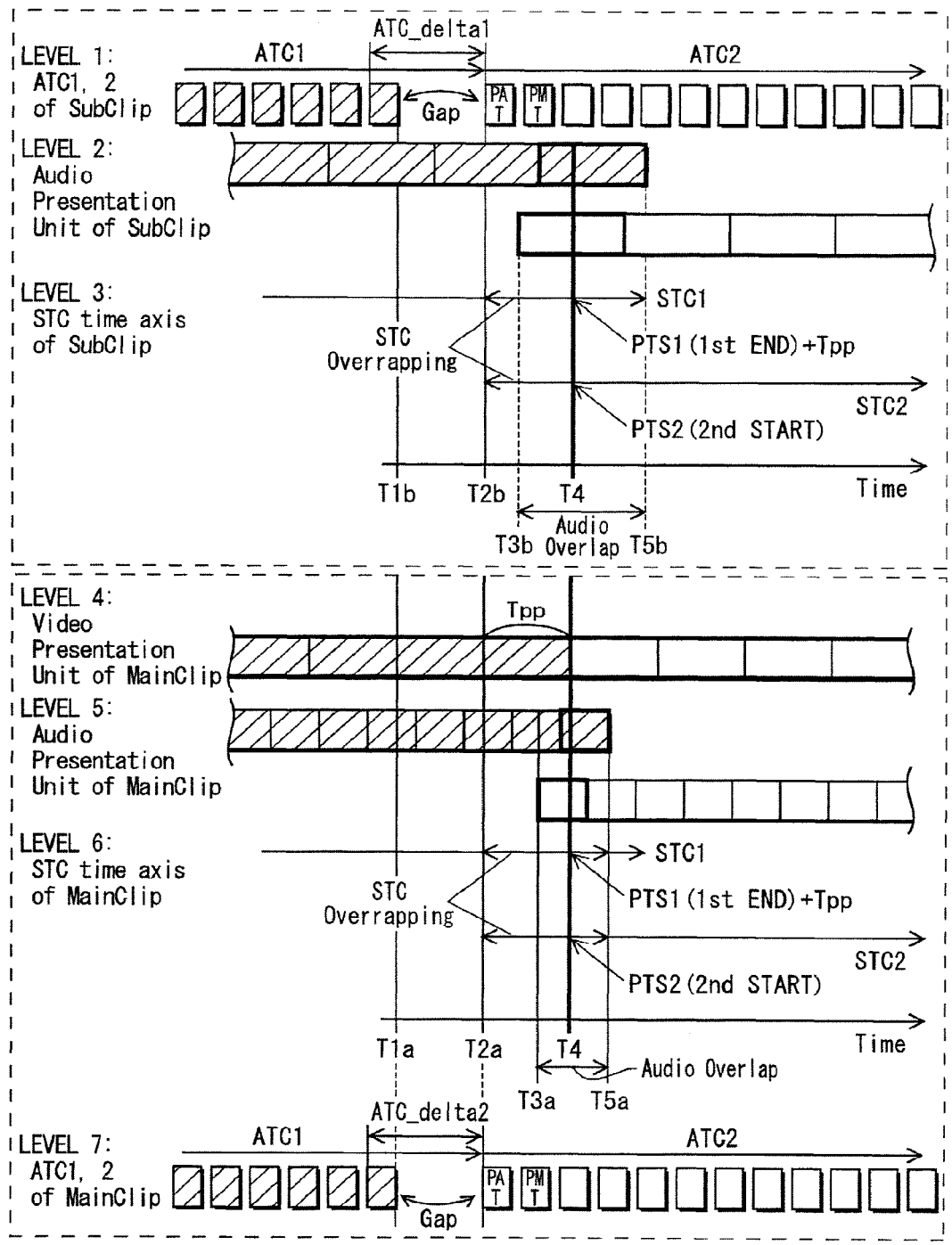
FIG. 28 shows details of CC=5 and SP_CC=5.

FIG. 28 shows details of CC=5 and SP_CC=5. Levels 1 to 3 show connection_condition of SubPlayItem, and Levels 4 to 7 show sp_connection_condition in PlayItem. Level 4 shows multiple Video Presentation Units of TS1 and TS2, and Level 5 shows Audio Presentation Units in TS1 and Audio Presentation Units in TS2. Level 6 shows STC values in the MainClip. Level 7 shows a Source Packet sequence of the MainClip.

Hatched parts in the figure represent Video Presentation Units, Audio Presentation Units, and Source Packets of TS1, while parts with no shade represent Video Presentation Units, Audio Presentation Units, and Source Packets of TS2.

In the figure, CC=5 represents the state in which Video Presentation Units are aligned to have a common boundary (Level 4), there is a gap between ATCs in the MainClip (Level 7), and there is an overlap between Audio Presentation Units in the MainClip (Level 5). SP_CC=5 represents the state in which there is a gap between ATCs in the SubClip (Level 1), and there is an overlap between Audio Presentation Unit in the SubClip (Level 2).

The above-mentioned boundary between Video Presentation Units is located at, from the perspective of TS1, an end point PTS1(1stEnd)+Tpp of the last Video Presentation Unit of Level 4, and is located at, from the perspective of TS2, a start point PTS2(2ndSTART) of the Video Presentation Unit of Level 4.

Assume that in TS1, the end point of an Audio Presentation Unit corresponding to a boundary time point T4 is T5$a$, and in TS2, the start point of Audio Presentation Unit corresponding to the time point T4 is T3$a$. Here, the overlap of Audio Presentation Units in the MainClip extends from T3$a$ to T5$a$.

In the figure, each Audio Presentation Unit of the SubClip is set longer than each Audio Presentation Unit of the MainClip. This is because the audio stream of the SubClip is set to have a low sampling frequency since it is supplied via a network, and accordingly, the period of time for each Audio Presentation Unit becomes longer. In the packet sequence of Level 1, there is a gap similar to the one in Level 7. Also, in Audio Presentation Units of Level 2, there is an overlap similar to the one in Level 4. Assume that, in TS1 of the SubClip, the end point of Audio Presentation Unit corresponding to the boundary time point T4 is T5$b$, and in TS2 of the SubClip, the start point of Audio Presentation Unit corresponding to the time point T4 is T3$b$. Here, the overlap extends from T3$b$ to T5$b$.

From the figure, it can be seen that, in order to realize CC=5 and SP_CC=5, the following four conditions must be met at the levels of Video Presentation Units, Audio Presentation Units, and packets.

(1) The last Audio Presentation Unit of the audio stream in TS1 includes a sample having a playback time which coincides with the end of the display period of the last picture in TS1 specified in the previous PlayItem and the previous SubPlayItem.

(2) The first Audio Presentation Unit of the audio stream in TS2 includes a sample having a playback time which coincides with the start of the display period of pictures of the first picture in TS2 specified in the current PlayItem and the current SubPlayItem.

(3) There is no gap at a connection point in the Audio Presentation Unit sequence. This means that an overlap in the Audio Presentation Unit sequence can occur at a connection point. However, the extent of such an overlap must be shorter than the playback period of two audio frames.

(4) The first packet of TS2 includes a PAT, which can be immediately followed by one or more PMTS. If a PMT is larger than a payload of a TS packet, the PMT may be divided into two packets or more. TS packe storeing therein a PMT may include a PCR and an SIT.

<Relationship of In_Time and Out_Time with Video Presentation Unit>

Figure 29:
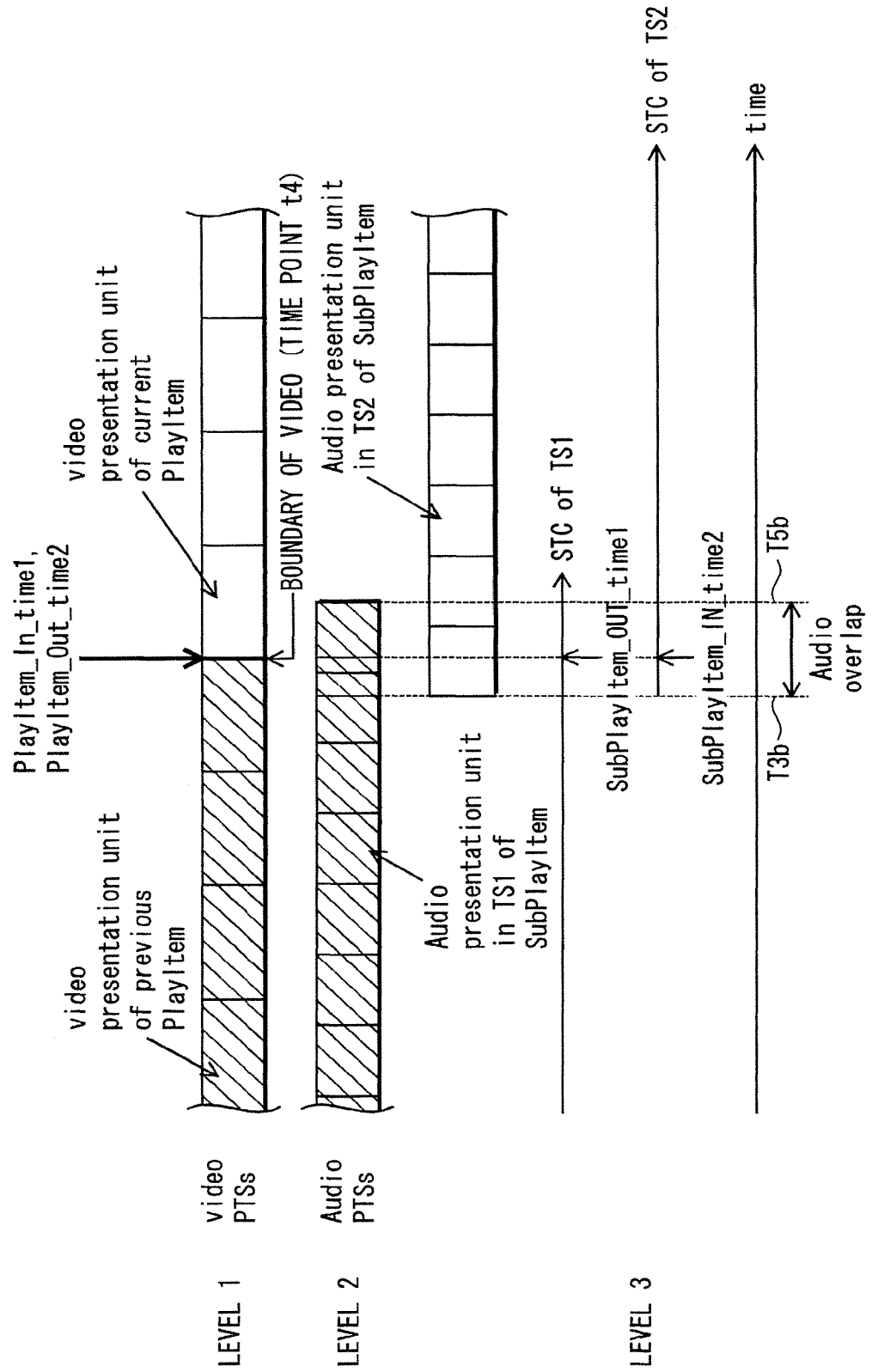
FIG. 29 shows a relationship among multiple Video Presentation Units specified by a previous PlayItem and the current PlayItem, multiple Audio Presentation Units, and STC time axes.

FIG. 29 shows a relationship among multiple Video Presentation Units specified by a previous PlayItem and the current PlayItem, multiple Audio Presentation Units, and STC time axes. Level 1 shows multiple Video Presentation Units belonging to TS1 to which the previous PlayItem refers and multiple Video Presentation Units belonging to TS2 to which the current PlayItem refers. Level 2 shows multiple Audio Presentation Units belonging to a time stamp to which the previous SubPlayItem refers and multiple Audio Presentation Units belonging to TS2 to which the current SubPlayItem refers. Level 3 shows an STC time axis of TS1 in the previous SubPlayItem and an STC time axis of TS2 in the current SubPlayItem. As shown in FIG. 28, within Audio Presentation Units of TS1 and Audio Presentation Units of TS2 at Level 2, the portion from the start point T3$b$ to the end point T5$b$ overlaps. In_Time of the current SubPlayItem and Out_Time of the previous SubPlayItem respectively specify the time point T4, which is a boundary of Video Presentation Units. Since In_Time of the current PlayItem and Out_Time of SubPlayItem also specify the time point T4 of the boundary of Video Presentation Units, In_Time and Out_Time of Play-Item coincide with In_Time and Out_Time of SubPlayItem. Thus, although In_Time of the previous SubPlayItem and Out_Time of the current SubPlayItem are recorded on a recording medium different from the BD-ROM, it can be seen that they correspond to the boundary of Video Presentation Units in the MainClip, and also correspond to Out_Time of the previous PlayItem and In_Time of the current PlayItem, respectively.

Thus concludes the detailed description of conditions that should be satisfied at the level of Video Presentation Units and Audio Presentation units.

<Level of Elementary Streams>

The following describes encoding conditions at the level of elementary streams in order to realize CC=5 and SP_CC=5.

The following encoding conditions must be satisfied at the level of each elementary stream.

(1) Video Stream the video resolution and the frame rate do not change before and after a seamless connection; and a video stream immediately before a seamless connection ends with sequence_end_code (for MPEG-2 Video) and end_of_sequence_rbsp (for MPEG-4 AVC).

(2) Audio Stream the encoding format of audio streams having the same PID do not change; and the sampling frequency, the quantization bit rate and the number of channels do not change.

(3) PG Stream a) The number of PG streams in TS1 and in TS2 is the same.

b) PG stream of TS1 ends with a function segment called "End of Display Set".

c) PTS of a PES packet carrying the last PCS in TS1 indicates a time point before the playback time corresponding to Out_Time of the previous PlayItem and the previous SubPlayItem.

d) PG stream of TS2 must start with Epock Start-type or Epock Continue-type Display Set.

e) PTS of a PES packet carrying the first PCS in TS2 indicates a time point at or after the playback time corresponding to In_Time of the current PlayItem and the current SubPlayItem.

f) Taking out of Source Packets from TS1, which is followed by taking out of Source Packets from TS2, can be defined as STC1 and STC2 on the same system time axis, and there is no overlap in their DTS values/PTS values.

(4) IG Stream a) The number of IG streams in TS1 and in TS2 is the same.

b) IG stream of TS1 ends with the function segment called "End of Display Set".

c) PTS of a PES packet carrying the last ICS in TS1 indicates a time point before the playback time corresponding to Out_Time of the previous PlayItem and the previous SubPlayItem.

d) IG stream of TS2 must start with Epock Start-type or Epock Continue-type Display Set.

e) PTS of a PES packet carrying the first ICS in TS2 indicates a time point at or after the playback time corresponding to In_Time of the current PlayItem and the current SubPlayItem.

f) Taking out of Source Packet from TS1, which is followed by taking out of Source Packet from TS2, can be defined as STC1 and STC2 on the same system time axis, and there is no overlap in their DTS values/PTS values.

In order to connect the previous PlayItem and the current PlayItem with CC=5 and connect the previous SubPlayItem and the current SubPlayItem with SP_CC=5, the above-mentioned all conditions for the levels of AV stream, transport stream, Video Presentation Units and Audio Presentation Units, and elementary stream must be met.

Thus concludes the explanation of PlayList information which is a constituent of the storage content of the local storage 200.

Thus concludes the explanation of the recording medium according to the present invention. Next, the playback apparatus of the present invention is explained.

Figure 30:
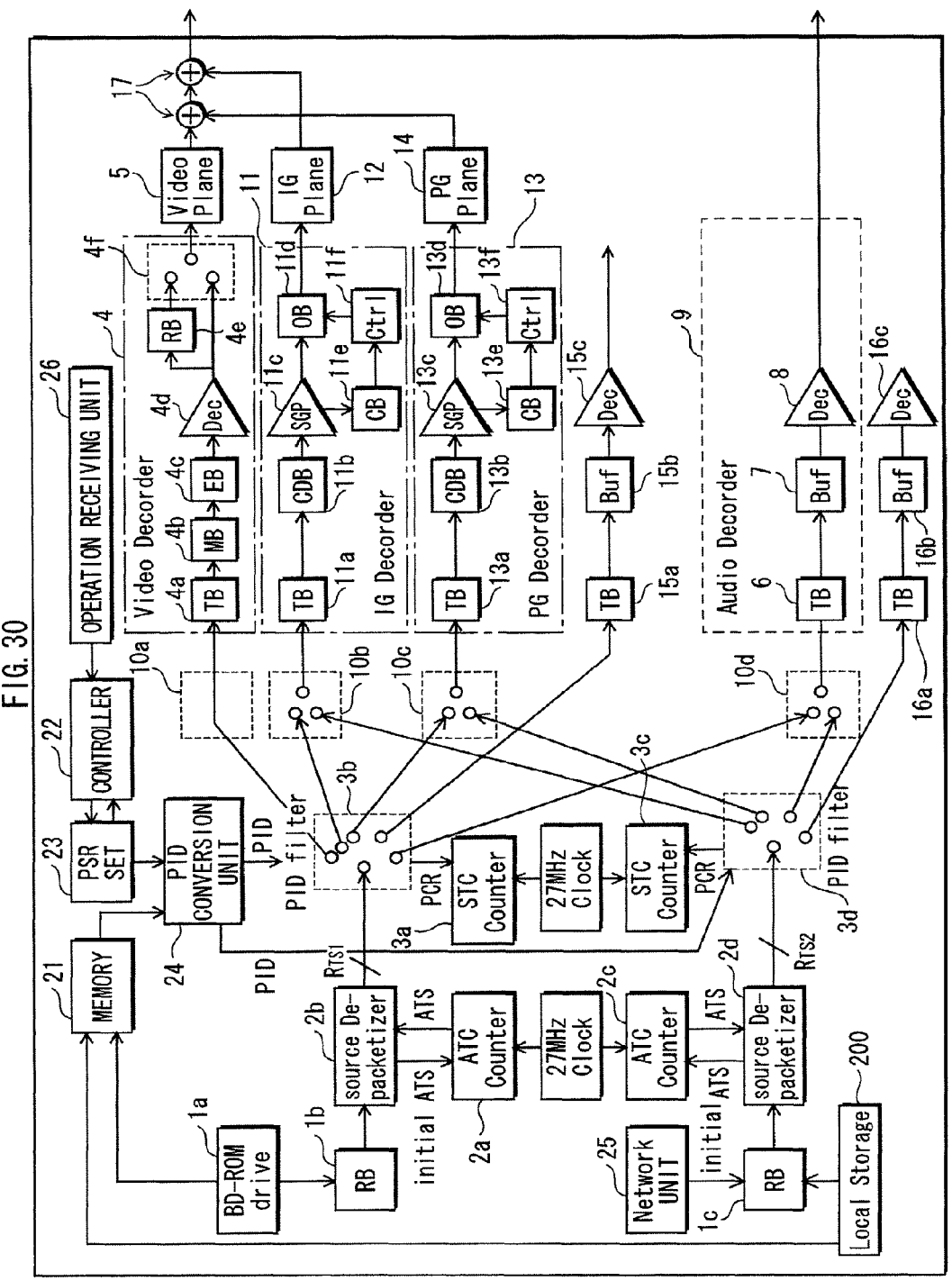
FIG. 30 shows an internal structure of the playback apparatus of the present invention.

FIG. 30 shows an internal structure of the playback apparatus of the present invention. The playback apparatus of the present invention is commercially manufactured based on the internal structure shown in the figure. The playback device is mainly composed of two parts—a system LSI and a drive device, and can be produced commercially by mounting these parts on the cabinet and substrate of the device. The system LSI is an integrated circuit that integrates a variety of processing units for carrying out the functions of the playback device. The playback apparatus manufactured in this way comprises: a BD-ROM drive $1a$; read buffers $1b$ and $1c$; ATC counters $2a$ and $2c$; Source depacketizers $2b$ and $2d$; ATC counters $2c$ and $2d$; STC counters $3a$ and $3c$; PID filters $3b$ and $3d$; a video decoder 4; a transport buffer (TB) $4a$; a multiplexed buffer (MB) $4b$; a coded picture buffer (CPB) $4c$; a video decoder $4d$; a re-order buffer $4e$; a switch $4f$; a video plane 5; an audio decoder 9; a transport buffer 6; an elementary buffer 7; a decoder 8; switches $10a$, $10b$, $10c$ and $10d$; an interactive graphics decoder 11; a transport buffer (TB) $11a$; a coded data buffer (CDB) $11b$; a stream graphics processor (SGP) $11c$; an object buffer $11d$; a composition buffer $11e$; a graphics controller $11f$; an Interactive Graphics plane 12; a presentation graphics decoder 13; a transport buffer (TB) $13a$; a coded data buffer (CDB) $13b$; a stream graphics processor (SGP) $13c$; an object buffer $13d$; a composition buffer $13e$; a graphics controller $13f$; a presentation graphics plane 14; a transport buffer $15a$; an elementary buffer $15b$; a decoder $15c$; a transport buffer $16a$; an elementary buffer $16b$; a decoder $16c$; a synthesis unit 17 a memory 21; a controller 22; a PSR set 23; a PID conversion unit 24; a network unit 25; an operation receiving unit 26; and the local storage 200.

The BD-ROM drive $1a$ loads/ejects a BD-ROM, and executes access to the BD-ROM.

The read buffer (RB) $1b$ accumulates Source Packet sequences read from the BD-ROM.

The read buffer (RB) $1c$ accumulates Source Packet sequences read from LastPlay title.

The ATC counter $2a$ is reset by using an ATS of the Source Packet located at the beginning of the playback section within Source Packets constituting Primary TS, and subsequently outputs ATCs to the source depacketizer $2b$.

The source depacketizer $2b$ takes out TS packets from source packets constituting Primary TS and sends out the TS packets. At the sending, the source depacketizer $2b$ adjusts the time of an input to the decoder according to an ATS of each TS packet. To be more specific, at the moment when the value of the ATC generated by the ATC counter $2a$ becomes the same as the ATS value of a Source Packet, the source depacketizer $2b$ transfers only the TS packet to the PID filter $3b$ at TS_Recording_Rate.

The ATC counter $2c$ is reset by using an ATS of the Source Packet located at the beginning of the playback section within Source Packets constituting Secondary TS, and subsequently outputs ATCs to the source depacketizer $2d$.

The source depacketizer 2*d* takes out TS packets from source packets constituting Secondary TS and sends out the TS packets. At the sending, the source depacketizer 2*d* adjusts the time of an input to the decoder according to an ATS of each TS packet. To be more specific, at the moment when the value of the ATC generated by the ATC counter 2*c* becomes the same as the ATS value of a Source Packet, the source depacketizer 2*d* transfers only the TS packet to the PID filter 3*d* at TS_Recording_Rate.

The STC counter 3*a* is reset by a PCR of Primary TS and outputs an STC.

The PID filter 3*b* is a demultiplexing unit for Primary TS and outputs, among Source Packets output from the source depacketizer 2*b*, ones having PID reference values informed by the PID conversion unit 24 to the video decoder 4, the audio decoder 9, the interactive graphics decoder 11 and the presentation graphics decoder 13. Each of the decoders receives elementary streams passed through the PID filter 3*b* and performs from decoding processing to playback processing according to the PCR of Primary TS (STC1 time axis). Thus, the elementary streams input to each decoder after being passed through the PID filter 3*b* are subjected to decoding and playback based on the PCR of Primary TS.

The STC counter 3*c* is reset by a PCR of Secondary TS and outputs an STC. The PID filter 3*d* performs demultiplexing with reference to this STC.

The PID filter 3*d* is a demultiplexing unit for the SubClip and outputs, among Source Packets output from the source depacketizer 2*d*, ones having PID reference values informed by the PID conversion unit 24 to the audio decoder 9, the interactive graphics decoder 11 and the presentation graphics decoder 13. Thus, the elementary streams input to each decoder after being passed through the PID filter 3*d* are subjected to decoding and playback based on the PCR of Secondary TS.

As described in the explanation of the recording medium above, In_Time and Out_Time of PlayItem correspond to In_Time and Out_Time of SubPlayItem. Therefore, if the ATC counters 2*a* and 2*c* have the same value (time) and tick at the same speed, time axes of Primary TS and Secondary TS become aligned together. As a result, Primary TS and Secondary TS constituting the Out-of-MUX application can be handled as a single stream. In addition, the ATC time axes showing times for data input to the decoder can be synchronized, and also the STC time axes showing decoder base time can be synchronized.

According to the synchronization of ATC time axes, the above-mentioned two source depacketizers can respectively process Source Packets read from the BD-ROM and Source Packets read from the local storage.

The STC counters 3*a* and 3*c* have the same time and tick at the same speed according to the synchronization of STC time axes, and therefore two TSs can be processed as a single TS. Since the decoder of the playback apparatus operates on a single STC time axis, the management of STC time can be standardized in the same manner as when usual Primary TS-only playback is performed. Being able to cause all the video decoder 4, IG decoder 11, PG decoder 13, system decoders 15*c* and 16*c*, and audio decoder 9 to operate on the same STC time axis is desirable from the perspective of the development of playback apparatuses since the control is exact the same as one used on usual playback apparatuses that perform BD-ROM playback only. Furthermore, when the authoring is performed, the buffer state can be observed by controlling the input timing of one TS, whereby facilitating verification at the authoring stage.

The video decoder 4 decodes multiple PES packets output from the PID filter 3*b*, obtains uncompressed pictures and writes the pictures to the video plane 5. The video decoder 4 is composed of the transport buffer 4*a*, multiplexed buffer 4*b*, elementary buffer 4*c*, decoder 4*d*, re-order buffer 4*e* and switch 4*f*.

The transport buffer (TB) 4*a* is a buffer in which TS packets belonging to a video stream are temporarily accumulated after being output from the PID filter 3*b*.

The multiplexed buffer (MB) 4*b* is a buffer in which PES packets are temporarily accumulated when a video stream is output from the transport buffer 4*a* to the elementary buffer 4*c*.

The elementary buffer (EB) 4*c* is a buffer in which pictures in an encoded state (I pictures, B pictures, P pictures) are stored.

The decoder (DEC.) 4*d* obtains multiple frame images by decoding individual frame images of a video elementary stream for each predetermined encoding time (DTS) and writes the frame images to the video plane 5.

The re-order buffer 4*e* is a buffer used for changing the order of the decoded pictures so that they are arranged in the order of display.

The switch 4*f* realizes the order change of the decoded pictures so that they are arranged in the display order.

The video plane 5 is a plane for storing therein uncompressed pictures. The plane is a memory area of the playback apparatus for storing pixel data of a single screen capacity. The resolution of the video plane 5 is 1920×1080, and the picture data stored in the video plane 5 is composed of pixel data represented by a 16-bit YUV.

The audio decoder 9 is composed of the transport buffer 6, elementary buffer 7 and decoder 8, and decodes an audio stream.

The transport buffer 6 stores therein TS packets output from the PID filter 3*b* in a first-in first-out manner, and sends the TS packets to the audio decoder 8.

The elementary buffer 7 stores therein, among TS packets output from the PID filter 3*b*, only those having PID of an audio stream to be played back in a first-in first-out manner, and sends them to the audio decoder 8.

The decoder 8 converts TS packets stored in the transport buffer 6 into PES packets, decodes the PES packets to obtain noncompressed audio data in the LPCM state, and outputs the obtained audio data.

The switch 10*a* selectively provides TS packets read from the BD-ROM or TS packets read from the local storage 200 to the video decoder 4.

The switch 10*b* selectively provides TS packets read from the BD-ROM or TS packets read from the local storage 200 to the interactive graphics decoder 11.

The switch 10*c* selectively provides TS packets read from the BD-ROM or TS packets read from the local storage 200 to the presentation graphics decoder 13.

The interactive graphics (IG) decoder 11 decodes an IG stream read from the BD-ROM 100 or the local storage 200 and writes the noncompressed graphics to the IG plane 12. The IG decoder 11 is composed of the transport buffer (TB) 11*a*, coded data buffer (CDB) 11*b*, stream graphics processor (SGP) 11*c*, object buffer 11*d*, composition buffer 11*e* and graphics controller (Ctrl) 11*f*.

The transport buffer (TB) 11*a* is a buffer in which TS packets belonging to an IG stream are temporarily accumulated.

The coded data buffer (CDB) 11*b* is a buffer in which PES packets constituting an IG stream.

The stream graphics processor (SGP) 11*c* decodes PES packets storing therein graphics data and writes noncompressed bitmap composed of index colors obtained by the decode processing to the object buffer 11*d* as a graphics object.

In the object buffer 11*d*, a graphics object obtained by decode processing performed by the stream graphics processor 11*c* is positioned.

The composition buffer 11*e* is a memory in which control information for drawing graphics data is positioned.

The graphics controller (Ctrl) 11*f* decodes control information positioned in the composition buffer 11*e* and performs control based on the result of the decode processing.

To the Interactive Graphics (IG) plane 12, uncompressed graphics obtained by decode processing of the IG decoder 11 are written.

The presentation graphics (PG) decoder 13 decodes a PG stream read from a BD-ROM or the local storage 200 and writes the uncompressed graphics to the presentation graphics plane 14. The PG decoder 13 is composed of the transport buffer (TB) 13*a*, coded data buffer (CDB) 13*b*, stream graphics processor (SGP) 13*c*, object buffer (OB) 13*d*, composition buffer (CB) 13*e* and graphics controller (Ctrl) 13*f*.

The transport buffer (TB) 13*a* is a buffer in which TS packets belonging to a PG stream are temporarily accumulated after being output from the PID filter 4.

The coded data buffer (CDB) 13*b* is a buffer in which PES packets constituting a PG stream.

The stream graphics processor (SGP) 13*c* decodes PES packets (ODS) storeing therein graphics data and writes noncompressed bitmap composed of index colors obtained by the decode processing to the object buffer 13*d* as a graphics object.

In the object buffer 13*d*, a graphics object obtained by decode processing performed by the stream graphics processor 13*c* is positioned.

The composition buffer (CB) 13*e* is a memory in which control information (PCS) for drawing graphics data is positioned.

The graphics controller (Ctrl) 13*f* decodes PCS positioned in the composition buffer 13*e* and performs control based on the result of the decode processing.

The Presentation Graphics (PG) plane 14 is a memory having a single screen capacity area, and is able to store therein uncompressed graphics of a single screen capacity.

The system decoder 15 processes system control packets (PAT and PMT) of Secondary TS and controls the entire decoders.

The transport buffer 15*a* stores therein system control packets (PAT and PMT) present in Primary TS.

The elementary buffer 15*b* sends system control packets to the decoder 15*c*.

The decoder 15*c* decodes system control packets stored in the elementary buffer 15*b*.

The transport buffer 16*a* stores therein system control packets present in Secondary TS.

The elementary buffer 16*b* sends system control packets of Secondary TS to the decoder 16*c*.

The decoder 16*c* decodes system control packets stored in the elementary buffer 16*b*.

The memory 21 is a memory for storing therein current PlayList information and current Clip information. The current PlayList information is PlayList information that is currently processed, among a plurality of pieces of PlayList information stored in the BD-ROM. The current Clip information is Clip information that is currently processed, among a plurality of pieces of Clip information stored in the BD-ROM/local storage.

The controller 22 achieves a playback control of the BD-ROM by performing PlayList playback (i.e. playback control in accordance with the current PlayList information). The controller 22 also performs the above-mentioned control on the ATS and STC. In this control, the controller 22 performs a prior read operation to read, in the period of 1 second, in advance Source Packets from the BD-ROM or the local storage to the buffer of the decoder. By performing this prior read operation, prevention of underflow and overflow can be ensured due to the above-mentioned control of the Window.

The PSR set 23 is a register built in the playback apparatus, and is composed of 64 pieces of Player Setting/Status Registers (PSR) and 4096 pieces of General Purpose Registers (GPR). Among the values (PSR) set in the Player Setting/Status Registers, PSR4 to PSR8 are used to represent the current playback point.

The PID conversion unit 24 converts audio streams and stream numbers of the audio streams stored in the PSR set 23 into PID reference values based on the STN_table, and notifies the PID reference values of the conversion results to the PID filters 3*b* and 3*d*.

The network unit 25 achieves a communication function of the playback apparatus. When a URL is specified, the communication unit 25 establishes a TCP connection or an FTP connection with a web site of the specified URL. The establishment of such a connection allows for downloading from web sites.

The operation receiving unit 26 receives specification of an operation made by a user on the remote controller, and notifies User Operation information, which indicates the operation specified by the user, to the controller 22.

Thus concludes the description of the internal structure of the playback apparatus. The following describes implementation of the controller 22 on the playback apparatus. The controller 22 can be implemented on the playback apparatus by creating a program which causes the CPU to perform the process procedure of the flowcharts shown in FIGS. 31 and 32, writing the program to an instruction ROM and sending it to the CPU.

Figure 31:
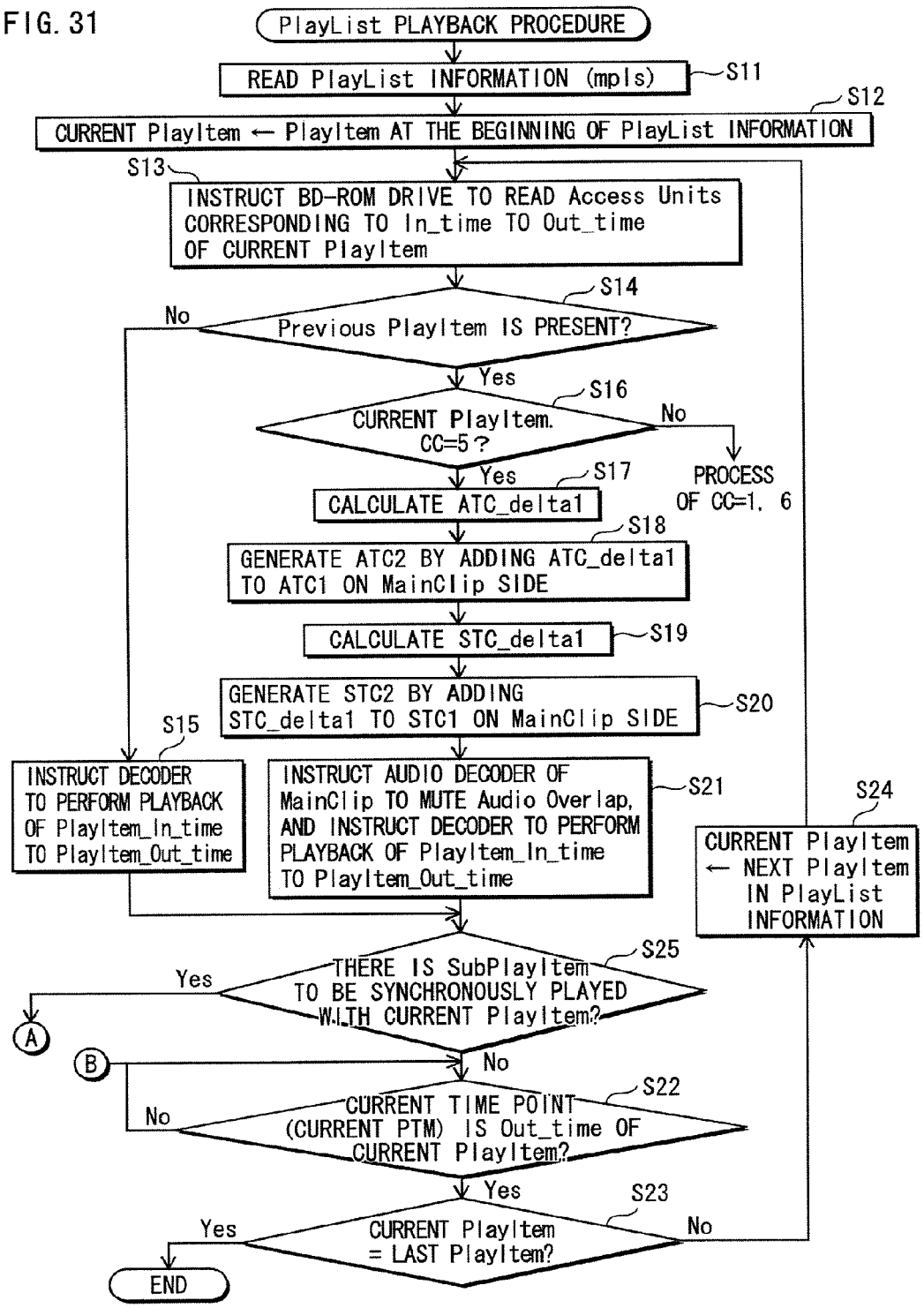
FIG. 31 is a flowchart showing a playback procedure based on PlayList information.

FIG. 31 is a flowchart showing a playback procedure based on PlayList information. The flowchart shows a loop structure in which a .mpls file structuring the PlayList information is read in (Step S11), a PlayItem at the beginning of the PlayList information is set as the current PlayItem (Step S12), and Steps S13 to S25 are repeated for the current PlayItem. This loop structure has Step S23 as an ending condition. The BD-ROM drive is instructed to read Access Units starting with one corresponding to In_Time and ending with one corresponding to Out_Time of the current PlayItem (Step S13). A judgment is made whether the previous PlayItem is present in the current PlayItem (Step S14). Step S15 or Steps S16 to S21 is selectively executed according to the judgment result. To be more specific, if the current PlayItem does not have the previous PlayItem (Step S14: NO), the decoder is instructed to perform playback of the PlayItem_In_Time to the PlayItem_Out_Time (Step S15).

If the current PlayItem has the previous PlayItem (Step S14: YES), a judgment is made whether the current PlayItem is CC=5 (Step S16). When CC=5 (Step S16: YES), the processing of Steps S17 to S20 is carried out.

When the previous PlayItem above is present, an ATC_Sequence in the MainClip is switched. For the switch of the ATC_Sequence, an offset value for Primary TS, called ATC_delta1, is calculated (Step S17). An ATC value (ATC2)

for a new ATC_Sequence is obtained by adding the ATC_delta1 to an ATC value (ATC1) of the original ATC_Sequence (Step S18).

In addition, when the previous PlayItem above is present, an STC_Sequence in Primary TS is switched. For the switch of the STC_Sequence, an offset value called STC_delta1 is calculated (Step S19). An STC value (STC2) of a new STC Sequence is obtained by adding the STC_delta1 to an STC value of the original STC_Sequence (Step S20).

After the audio decoder 9 is instructed to mute the Audio Overlap, and the decoder is instructed to perform playback from the PlayItem_In_Time to the PlayItem_Out_Time (Step S21). When the current PlayItem is not CC=5, the processing of CC=1 and CC=6 is performed.

After either one of the processing of Step S15 and the processing of Steps S16 to S21 is carried out, the processing of Step S25 is executed. Step S25 is a process of checking whether there is SubPlayItem to be synchronously played back with the current PlayItem. Here, each SubPlayItem constituting the SubPath information has information called Sync_PlayItem_Id, and Sync_PlayItem_Id of a SubPlayItem to be synchronously played back with the current PlayItem is set to this current PlayItem. Therefore, in Step S25, a check is made whether a SubPlayItem whose Sync_PlayItem_Id has been set to the current PlayItem is present in multiple SubPlayItems constituting the SubPath information.

If no such a SubPlayItem is present, the process moves to Step S22. In Step 22, a judgment is made whether the current playback time (Current PTM (Presentation TiMe)) on the AVClip time axis reaches Out_Time of the current PlayItem (Step S22). If it has reached, the process moves to Step S23. In Step S23, a judgment is made whether the current PlayItem is the last PlayItem of the PlayList information. If it is not the last PlayItem, the next PlayItem in the PlayList Information is set as the current PlayItem (Step S24), and the process moves to Step S13. In this way, the processing of Steps S13-S24 is performed on all PlayItems in the PlayList information.

Figure 32:
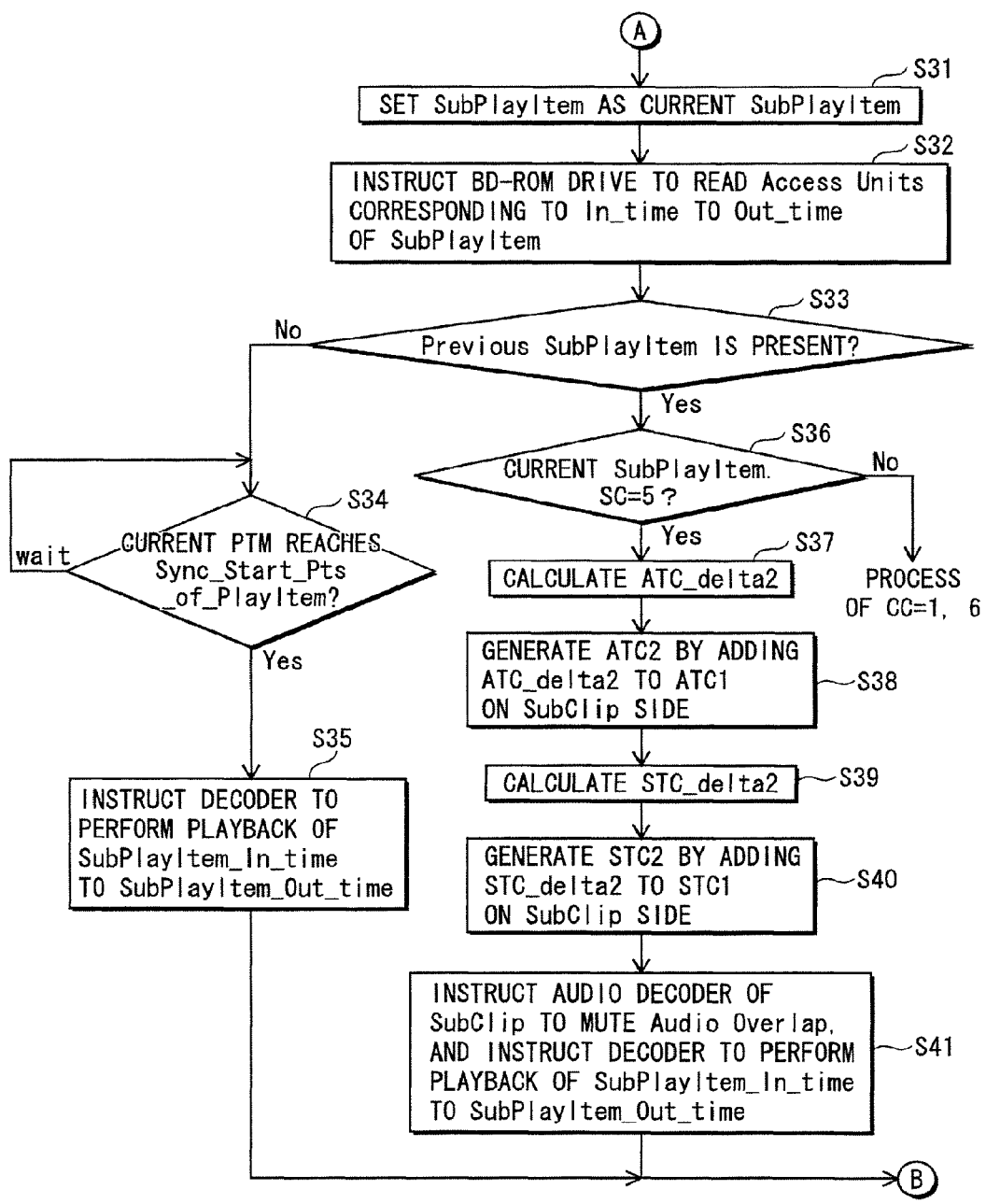
FIG. 32 is a flowchart showing a processing procedure of a seamless connection of SubPlayItems.

FIG. 32 is a flowchart showing a processing procedure of a seamless connection of SubPlayItems.

When it is determined in Step S25 that a SubPlayItem whose Sync_PlayItem_Id has been set to the current PlayItem is present, the SubPlayItem is set as the current SubPlayItem (Step S31). Then, the local storage 200 is instructed to output Access Units starting with one corresponding to In_Time of the SubPlayItem and ending with one corresponding to Out_Time (Step S32). Then, a judgment is made whether the previous SubPlayItem is present in the current PlayItem (Step S33), and one of Step S34, Step S35, and Steps S36-S41 is selectively executed according to the judgment result. To be more specific, if the previous SubPlayItem is not present in the current PlayItem (Step S33: No), it is waited until the current PIM reaches Sync_Start_Pts_of_PlayItem (Step S34). When the current PTM has reached it, the decoder is instructed to play back from SubPlayItem_In_Time to SubPlayItem_Out_Time (Step S35).

When the previous SubPlayItem is present in the current PlayItem (Step S33: Yes), a judgment is made whether the current PlayItem is SP_CC=5 (Step S36). When it is SP_CC=5 (Step S36: Yes), the processing of Steps S37-S41 is carried out.

When the current PlayItem has a previous SubPlayItem, the ATC_Sequence is switched. For the switch of the ATC_Sequence, an offset value for Secondary TS, called ATC_delta2, is calculated (Step S37), and obtains an ATC value (ATC2) for a new ATC_Sequence by adding the ATC_delta 1 to an ATC value (ATC1) of the original ATC_Sequence (Step S38).

The ATC_delta means an offset value representing an offset from the input time point T1 of the last TS packet of a transport stream (TS1) that has been originally read out to the input time point T2 of the last TS packet of a transport stream (TS2) that has been newly read out. The ATC_delta satisfies "ATC_delta≥N1/TS_recording_rate", where N1 is the count of TS packets following the last video PES packet of the TS1.

In addition, when the previous PlayItem above is present, an STC_Sequence is switched. For the switch of the STC_Sequence, STC_delta2 is calculated (Step S39), and an STC value (STC2) of a new STC_Sequence is obtained by adding the STC_delta2 to an STC value of the original STC_Sequence (Step S40).

Assume that the display start time of a picture lastly played in the preceding STC_Sequence is PTS1(1stEND), the display time period of the picture is TPP, and the start time of a picture initially displayed in the following STC_Sequence is PTS2 (2ndSTART). Here, for CC=5, since it is necessary to match the time of PTS1(1stEND)+TPP with the time of PTS2 (2ndSTART), the STC_delta2 can be calculated from the following equation:

$$STC\_delta2 = PTS1(1stEND) + TPP - PTS2(2ndSTART).$$

After the audio decoder 9 is instructed to mute the Audio Overlap, the decoder is instructed to play back from PlayItem_ In_Time to PlayItem_Out_Time (Step S41).

The controller 22 performs the STC switch process as described above, and this process is performed in a playback apparatus with general implementation when the decoder is in a free-run state. The free-run state means the state where the decoder is not performing synchronous control. Subsequently, when the STC returns to the condition where the STC time axis can be set, the decoder makes the transition from the free-run state to synchronous control with the STC. On the other hand, when the current PlayItem is judged not being CC=5 in Step S36 (Step S36: NO), the processing of CC=1 and CC=6 is performed.

Thus, according to the present embodiment, the transmittable amount called Window is limited to 48 Mbits/second or less. Therefore, if TS packets with a size of 96 Mbits×0.5 seconds are read to the decoder in advance, the buffer of the decoder will not cause underflow or overflow even when the transmittable amount locally reaches 96 Mbits within a period of 1 second. Since the data amount is "96 Mbits×0.5 seconds" or less at any period of time in a digital stream and TS packets can be supplied without underflow or overflow, loss of video and audio can be prevented. This eliminates the risk that simultaneous readout to realize the Out-of-MUX framework has an influence on the quality of the digital stream.

In addition, if In_Time and Out_Time of a PlayItem and In_Time and Out_Time of a SubPlayItem match each other and the connection state of PlayItems is CC=5, the connection state of SubPlayItems becomes SP_CC=5. Therefore, when a PlayItem is switched, the switch from the PlayItem to another PlayItem and a switch from a SubPlayItem to another SubPlayItem can be performed simultaneously without reset of the demultiplexing units. Thus, while STC time axes to which the demultiplexing units refer are made to synchronize to each other, the playback process based on PlayList information can be proceeded.

Embodiment 2

In the present embodiment, the production of the BD-ROM of the previous embodiment is described in detail. The BD-ROM of the previous embodiment can be produced by sequentially performing the following processes.

<Recording Process of BD-ROM>

First, an outline with which the BD-ROM is played back is planned (Planning Process), materials such as moving image records and audio records are created (Material Production Process), and volume configuration information is created based on the outline created in the planning process (Senario Production Process).

The volume configuration information is information indicating a format of the application layer on the optical disk using an abstract description.

Subsequently, each of video materials, audio materials, subtitle materials, and menu materials is encoded to thereby create elementary streams (Material Encoding Process). Then, multiple elementary streams are multiplexed (Multiplexing Process).

Then, an operation is carried out to fit the multiplexed streams and the volume configuration information into the format of the application layer of the BD-ROM, and the entire data (generally called the "volume data") to be recorded in the volume area of the BD-ROM is obtained (Formatting Process).

Instances of a class structure described in a programming language are the format of the application layer of the recording medium according to the present invention. Clip information, PlayList information and the like can be created by describing instances of the class structure based on syntaxes specified in the BD-ROM standard. In this case, data in a table format can be defined using "for" statements of a programming language, and data required under specific conditions can be defined using "if" statements.

When the volume data is obtained after such a fitting process, the volume data is played back to see whether the result of the scenario production process is correct (Emulation Process). In the emulation process, it is desirable to conduct a simulation of the buffer state of the BD-ROM player model.

Lastly, a press process is carried out. In this press process, volume images are converted into physical data sequences, and master disk cutting is conducted by using the physical data sequences to create a master disk. Then, BD-ROMs are produced from a master created by a press apparatus. The production is composed of various processes, mainly including substrate molding, reflective film coating, protective film coating, laminating and printing a label.

By completing these processes, the recording medium (BD-ROM) described in the embodiment above can be created.

<Additional Content Creating Process>

When a motion picture is composed of BD-ROM contents and additional contents, the above-mentioned planning process to formatting process are carried out. Then, AVClips, Clip information and PlayList information making up one piece of volume data are obtained. Ones which will be provided by the BD-ROM are removed from the obtained AVClips, Clip information and PlayList information, and the remaining information is assembled into one file as additional contents by an archiver program or the like. When such additional contents are obtained after these processes, the additional contents are provided to a www server and sent to playback apparatuses upon request.

The verification described in the above embodiment is conducted when AVClips, Clip information and PlayList information are completed and elementary streams to be played back are determined by the STN_table in the PlayList information—i.e. in the formatting process. The following explains an authoring system that creates such application format.

<Authoring System>

Figure 33:
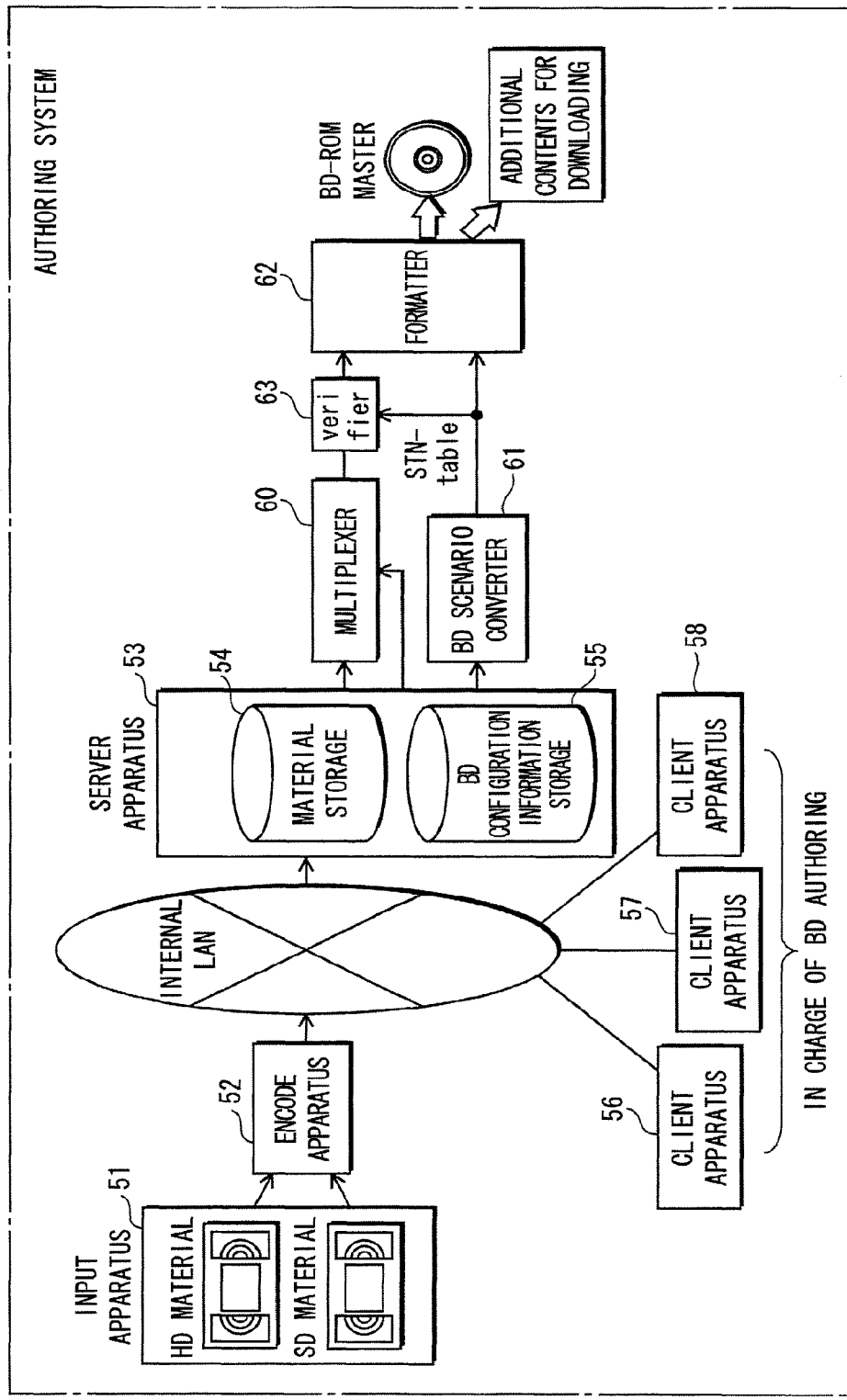
FIG. 33 shows an internal structure of an authoring system of Embodiment 2.

FIG. 33 shows an internal structure of an authoring system of Embodiment 2. As shown in the figure, the authoring system is composed of: an input apparatus 51; an encode apparatus 52; a sever apparatus 53; a material storage 54; a BD configuration information storage 55; client apparatuses 56-58; a multiplexer 60; a BD scenario converter 61; a formatter 62; and a verifier 63.

On the input apparatus 51, a videocassette on which HD images and SD images are recorded is mounted, and then the input apparatus 51 plays the videocassette back and outputs playback signals to the encode apparatus 52.

The encode apparatus 52 encodes the playback signals output from the input apparatus 51 to thereby obtain elementary streams such as video streams and audio streams. The elementary streams obtained in this way are output to the server apparatus 53 via a LAN and written to the material storage 54 in the server apparatus 53.

The server apparatus 53 is composed of two drive devices, the material storage 54 and the BD configuration information storage 55.

The material storage 54 is a built-in disk apparatus of the server apparatus 53, and sequentially stores therein elementary streams obtained by the encoding operations by the encode apparatus 52. The material storage 54 has two directories, an HD stream directory and an SD stream directory. Elementary streams obtained by encoding HD images are written to the HD stream directory.

The BD configuration information storage 55 is a drive device in which the BD volume configuration information is sorted.

The multiplexer 60 reads, among elementary streams stored in the HD stream directory and the SD stream directory in the material storage 54, ones specified in the BD volume configuration information, and then multiplexes the read elementary streams according to the BD volume configuration information to thereby obtain a multiplexed stream, i.e. an AVClip.

The BD scenario converter 61 obtains a BD scenario by converting the BD volume configuration information sorted in the BD configuration information storage 55 into the BD-ROM application format.

The formatter 62 adapts the Clip obtained by the multiplexer 60 and the BD scenario obtained by the BD scenario converter 61 to the format of the application layer on the BD-ROM. Herewith, a master of the BD-ROM and contents for downloading which are to be stored in the local storage can be obtained from the adapted BD scenario.

The verification unit 63 judges, by referring to the STN_table in the PlayList information generated by the scenario converter 61, whether Primary TSs for the BD-ROM and Secondary TSs for the local storage obtained by the multiplexer 60 satisfy the restrictions for realizing the Out_of_MUX application.

Thus concludes the internal structure of the authoring system. The following explains the implementation of the verification unit 63 of the authoring system.

<Process Procedure for Implementing Verification Unit 63>

Figure 34:
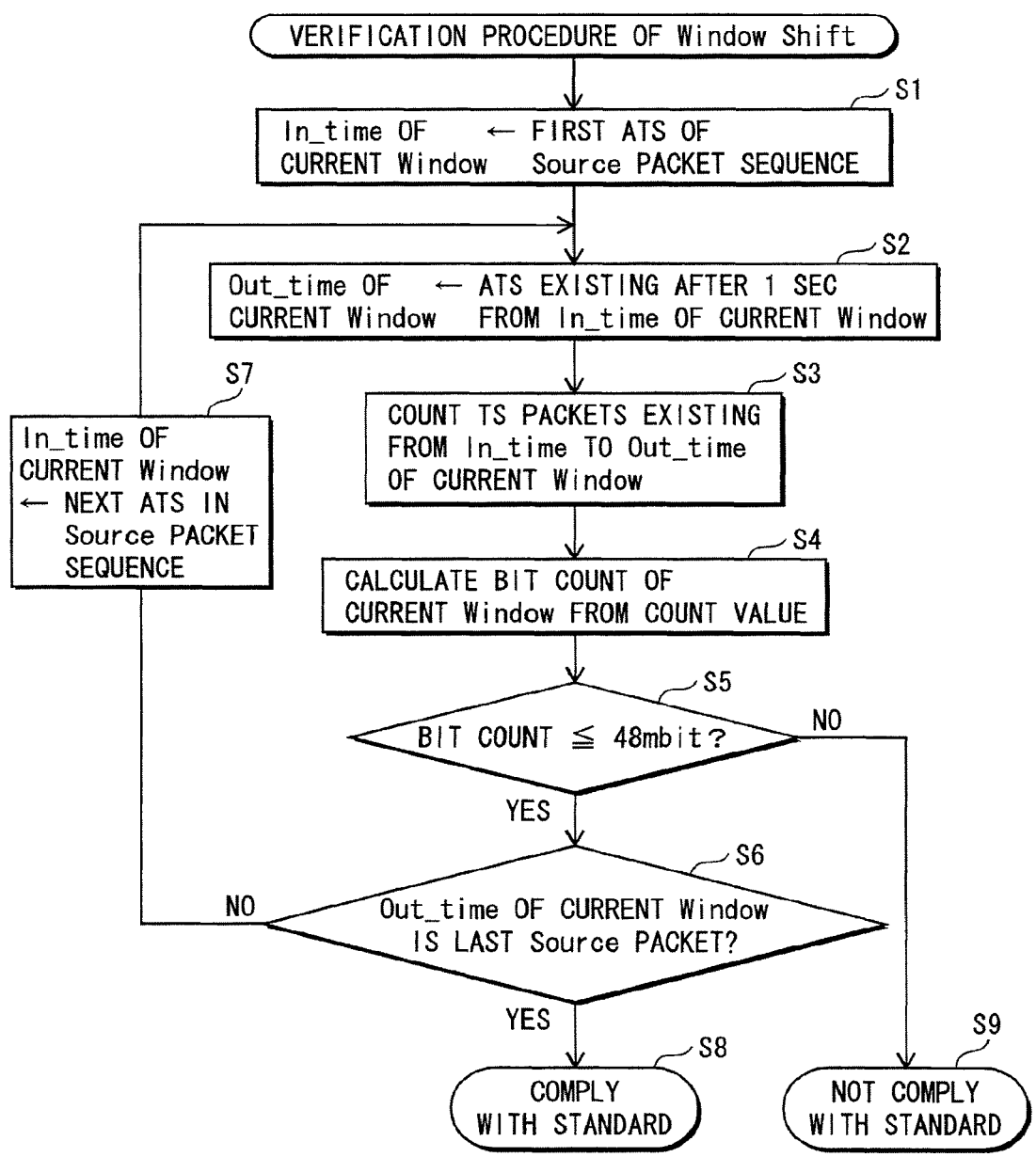
FIG. 34 is a flowchart showing the verification procedure on Primary TSs and Secondary TSs.
Figure 35:
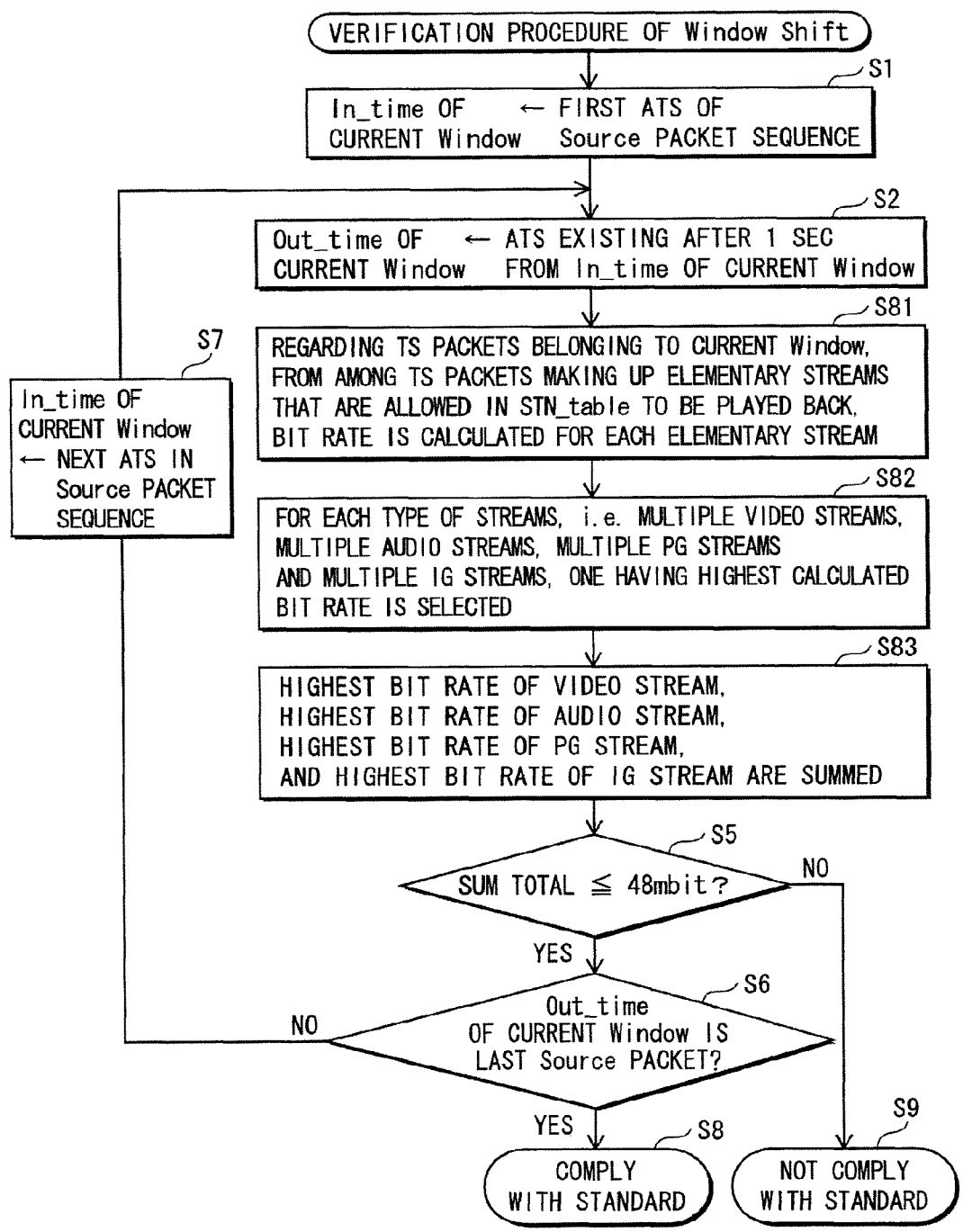
FIG. 35 is a flowchart showing a procedure of verification on a Primary TS and a Secondary TS when there are multiple elementary streams of the same type.

The verification unit 63 can be implemented in the authoring system by creating a program which causes the CPU to perform the process procedures of the flowcharts shown in FIGS. 34 and 35, writing the program to an instruction ROM and sending it to the CPU.

FIG. 34 is a flowchart showing the verification procedure on Primary TSs and Secondary TSs. The flowchart shows that an ATS of the first Source Packet in the Source Packet sequence is set as In_Time of the current Window in Step S1 and the processes of Steps S2 to S7 are repeated. The loop structure repeats the following Steps S2 to S5 until the judgment in Step S6 becomes Yes: an ATS appearing after 1 second from the In_Time of the current Window is set as the Out_Time of the current Window (Step S2); TS packets present between the In_Time and the Out_Time of the current window are counted (Step S3); a bit count of the current Window is calculated from the In_Time (Step S4); and a judgment is made whether the bit value is 48 Mbits or less (Step S5). Step S6 is a judgment whether the Out_Time of the current Window has reached the last Source Packet on the ATC time axis. If Step S6 is No, the next ATS in the Source Packet sequence is set to the In_Time of the current Window (Step S7), and Steps S2-S6 are repeated. If, with any Window, Step S5 is No, it is determined that there is a violation of the BD-ROM standardization (Step S9). When Step S5 is Yes for all Windows, and then Step S6 is Yes, it is determined that the Primary TSs and Secondary TSs comply with the BD-ROM standard (Step S8).

Since Primary TSs and Secondary TSs have been subject to the verification process, the above-mentioned restrictions are always satisfied even when Primary TSs and Secondary TSs are supplied from the BD-ROM and the local storage, respectively.

As to the video streams, audio streams, PG streams and IG streams, if there are multiple elementary streams of the same type, it is desirable to conduct the verification according to the procedure shown in FIG. 35. In the verification procedure of FIG. 35, Steps S3 and S4 of FIG. 34 are replaced with Steps S81-S83.

Steps S81-S83 are that: regarding TS packets belonging to the current Window, from among TS packets making up elementary streams that are allowed in the STN_table to be played back, the bit rate is calculated for each elementary stream each time one current Window is determined (Step S81); for each type of streams—i.e. multiple video streams, multiple audio streams, multiple PG streams and multiple IG streams, one having the highest calculated bit rate is selected (Step S82); the highest bit rate of the video stream, the highest bit rate of the audio stream, the highest bit rate of the PG stream, and the highest bit rate of the IG stream are summed (Step S83); and a judgment is made whether the sum total is 48 Mbits or less (Step S5).

In the Out_of_MUX application, an elementary stream is always solely and exclusively selected among the same type of elementary streams, and therefore it is more reasonable that the verification is conducted in the above-mentioned procedure.

Regarding the verification, it is effective to check locations with locally high bit rates, i.e. bit values of locations at which local peaks appear. The locations where local peaks appear are as follows.

(1) the beginning of TS packet indicated by In_Time of the Window;

(2) the end of TS packet indicated by In_Time of the Window;

(3) the beginning of TS packet indicated by Out_Time of the Window; and (4) the end of TS packet indicated by Out_Time of the Window.

The verification process in the authoring can be more simplified by specifically focusing on the bit amounts of these locations.

Thus, according to the present embodiment, when an STN_table which allows playback of Secondary TSs is created, it can be verified in advance when the authoring is performed whether underflow or overflow would be caused in the playback process based on the STN_table.

Embodiment 3

In the present embodiment, a new type of CC=6 is provided as to the connection between PlayItems and between SubPlayItems.

CC=6 specifies a connection state among multiple pieces of PlayItem information constituting Progressive PlayList information. The Progressive PlayList information is PlayList information used for specifying, as one playback path, multiple AVClips for streaming playback.

<Progressive PlayList Information>

The Progressive PlayList information has an advantage of making the cache size smaller or being able to start playback without waiting for all files to be downloaded, by dividing Secondary TSs for downloading/streaming into piecemeal files.

Since contents allowing for streaming transfer are specified by many short AVClips, the Progressive PlayList information is composed of many pieces of PlayItem information, each of which corresponds to a different one of the multiple AVClips. On the other hand, the AVClips divided into small units have been divided for streaming transfer, and therefore discontinuity is not present in STC and ATC. Accordingly, such a connection state between AVClips must be specified as a different state from CC=5. This type of connection state is specified as CC=6.

<Conditions to be Satisfied When CC=6>

When CC=6, TS1 and TS2 specified by two PlayItems and TS1 and TS2 specified by two SubPlayItems must satisfy the following conditions.

1) A video stream of TS2 has to start with a GOP.

2) There is no gap, in an Audio Presentation Unit sequence, at the connection point between the audio stream of TS2 and the audio stream of TS1 having the same PID as that of the audio stream of TS2.

The audio stream of TS1 may finish as an incomplete audio stream. Then, the audio stream of TS2 having the same PID as TS1 may start with an incomplete Audio Presentation Unit. By playing back these TS1 and TS2 based on multiple PlayItems and multiple SubPlayItems, one complete Audio Presentation Unit can be obtained from two Audio Presentation Units.

In the case of CC=6, the stream is actually continuous. Therefore, all elementary streams are connected seamlessly unlike the case of CC=5 where the video is only semelessly connected while the audio is connected in a discontinuous manner or set to mute.

Thus, CC=6 means a divisional boundary created when a logically continuous stream is divided into multiple parts according to the purpose of streaming transfer. Note that, since a stream to be recorded on the BD-ROM has to be composed of 32 Source Packets, one stream file forming one SubPlayItem needs to be multiples of 6 Kbytes.

<Details of CC=6>

Figure 36:
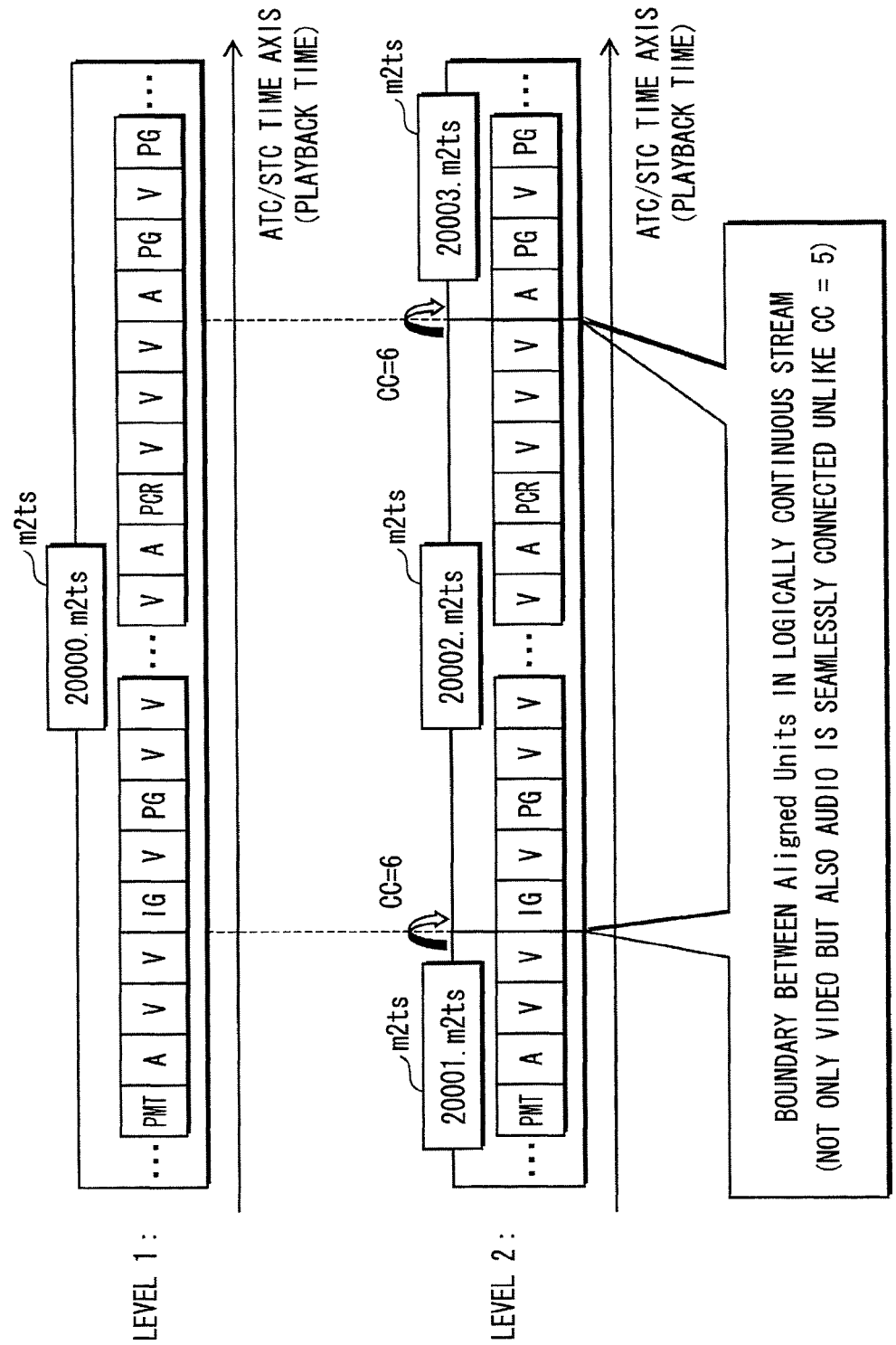
FIG. 36 shows a detailed explanation of CC=6.

FIG. 36 shows a detailed explanation of CC=6. Level 1 shows a file (20000.m2ts) having a single continuous ATC/STC time series and the encoding method does not change. Level 2 shows three files (20001.m2ts, 20002.m2t and 20003.m2ts) storing therein three streams. These three files store therein three Primary TSs that have been obtained by dividing the single stream of Level 1 in units of Aligned Units (6 Kbytes).

Figure 37:
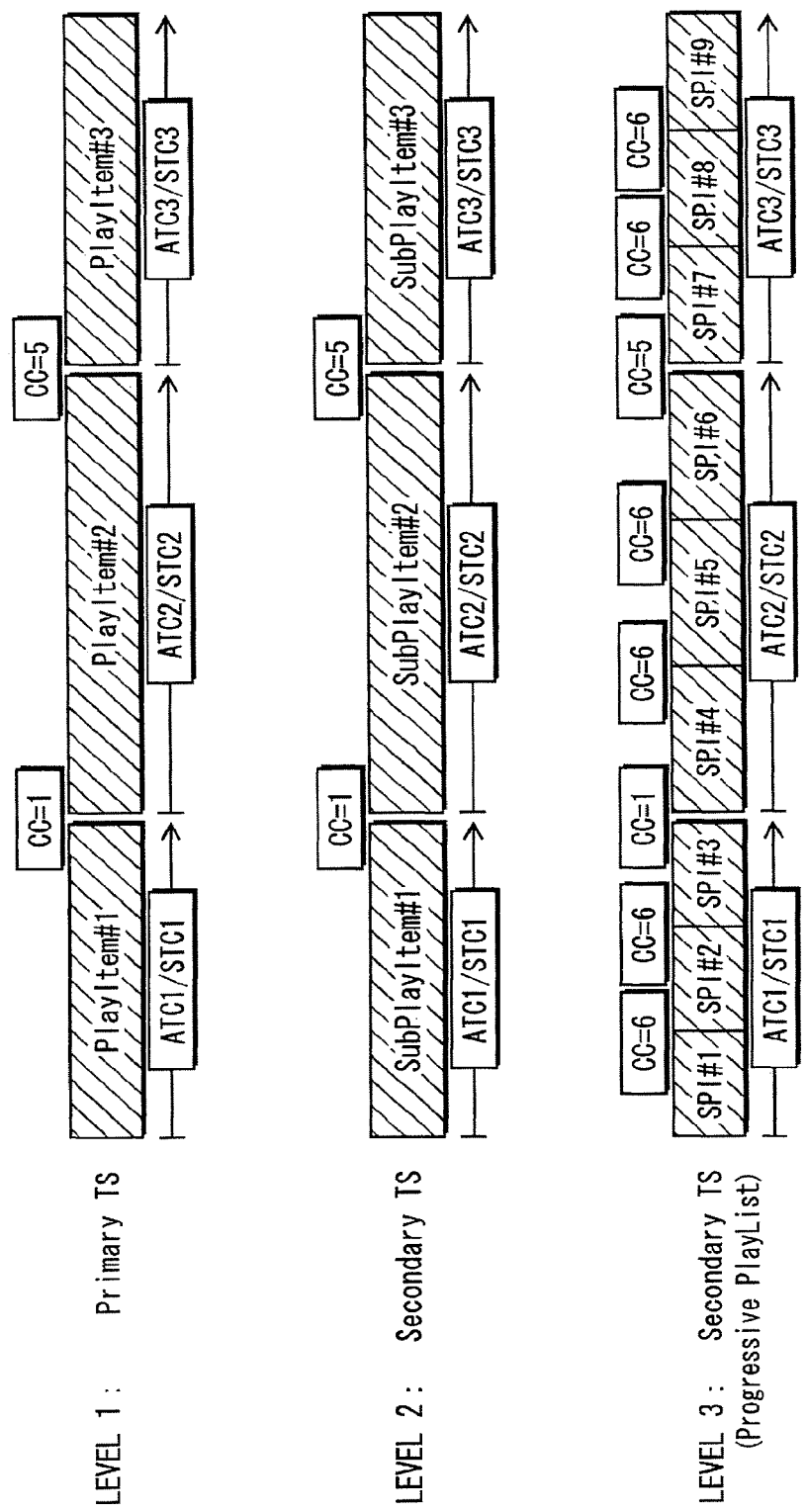
FIG. 37 shows a correlation between PlayItems and SubPlayItems.

FIG. 37 shows a correlation between PlayItems and SubPlayItems. Level 1 shows three PlayItems (PlayItem information #1, PlayItem information #2 and PlayItem information #3) in PlayList information. These three PlayItems specify a Primary TS, and the connection between PlayItem information #1 and #2 is set to CC=1 while the connection between PlayItem information #2 and #3 is set to CC=5. Level 2 shows three SubPlayItems (SubPlayItem #1, SubPlayItem #2 and SubPlayItem #3) in PlayList information. These three SubPlayItems specify a Secondary TS, and the connection between SubPlayItems #1 and #2 is set to CC=1 while the connection between SubPlayItems #2 and #3 is set to CC=5. Level 3 shows nine SubPlayItems (SubPlayItem #1, SubPlayItem #2, SubPlayItem #3 to SubPlayItem #9) in the Progressive PlayList information. These nine SubPlayItems specify a Secondary TS. Here, the connection between SubPlayItems #3 and #4 is set to CC=1, the connection between SubPlayItems #6 and #7 is set to CC=5, and the remaining connections are set to CC=6. SubPlayItems in the Progressive PlayList are generally connected with CC=6; however, when PlayItems are connected with CC=1 and CC=5, SubPlayItems are also connected satisfying the condition of CC=1 and CC=5, respectively, like the PlayItems.

Thus, the present embodiment introduces the new connection state of CC=6 for PlayItems and SubPlayItems, whereby realizing a process of dividing AVClips constituting the Progressive PlayList information into small sections and providing them by means of a streaming transfer.

Embodiment 4

In Embodiment 1, how to limit the bit amount for each Window is explained; the present embodiment presents how to perform multiplexing to satisfy such restrictions.

<Multiplexing of Video and Audio>

Figure 38:
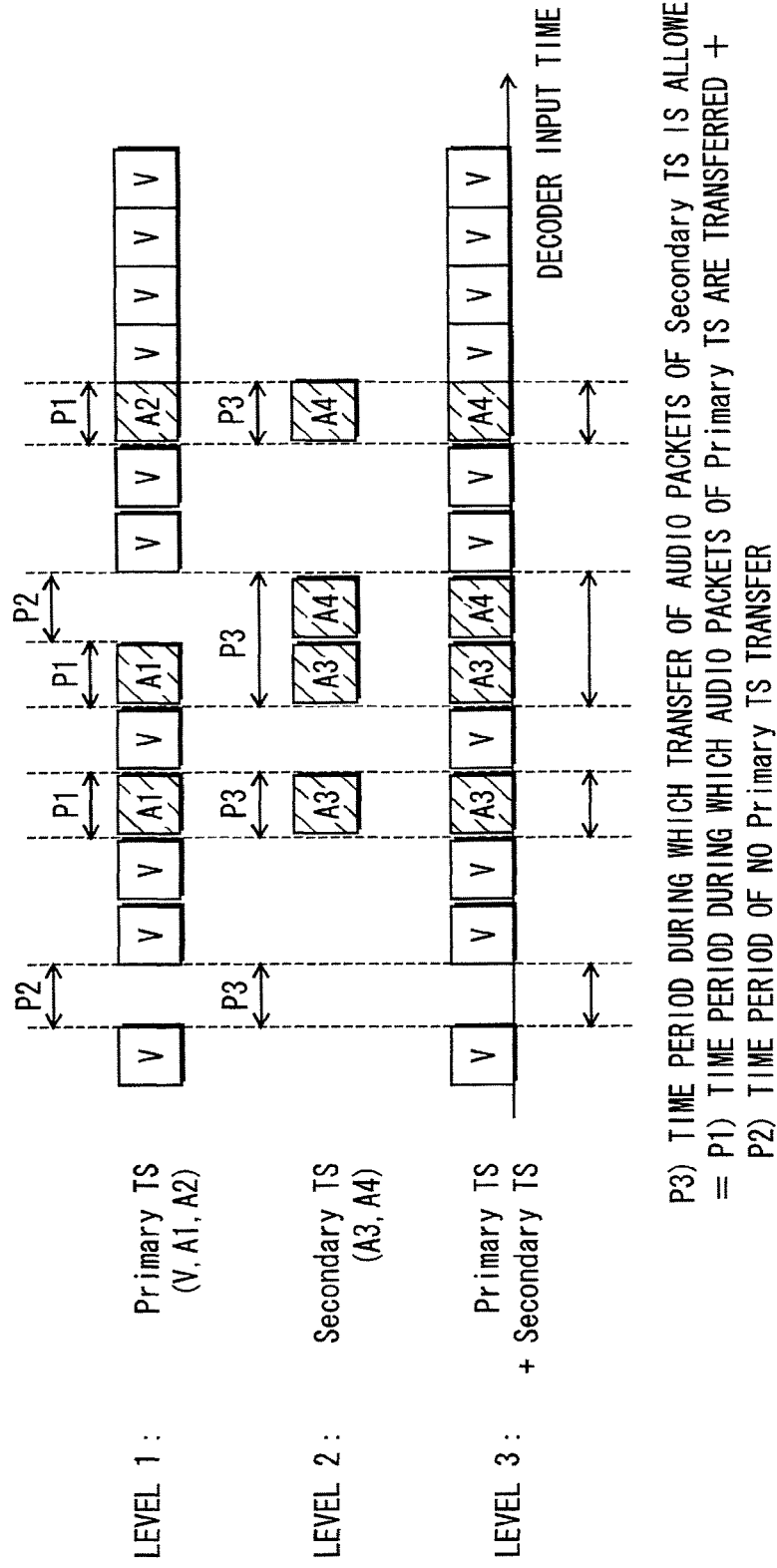
FIG. 38 schematically shows the way multiple TS packets present on an ATC time axis are multiplexed.

FIG. 38 schematically shows, in the case where audio constituting a Primary TS is replaced with audio constituting a Secondary TS, how multiple TS packets constituting the Primary TS and multiple TS packets constituting the Secondary TS are multiplexed together.

FIG. 38 schematically shows the way multiple TS packets present on the ATC time axis are multiplexed together. Level 1 shows a Primary TS. The Primary TS is composed of TS packets storeing therein V, A1 and A2 (one set of video and two sets of audio). These TS packets are obtained by multiplexing these three elementary streams of two types together.

Level 2 shows a Secondary TS. The secondary TS is composed of TS packets storing therein two sets of audio A3 and A4. A time period p3 during which these TS packets of the Secondary TS are multiplexed is, on the ATC time axis indicating input timings to the decoder, made up of a time period p1 during which audio packets of the Primary TS are multiplexed and a time period p2 during which TS packets constituting the Primary TS are not being transferred.

By multiplexing the streams in this way, it can be make sure that the sum total of the bit rate of elementary streams to be decoded does not exceed the allowable maximum bit rate of Primary TS (48 Mbps) no matter which elementary stream is selected for each type of the elementary streams. The example shown in FIG. 38 is a simplest case in which the Secondary TS includes only audio.

<Multiplexing of Video, Audio, PG and IG Streams>

Figure 39:
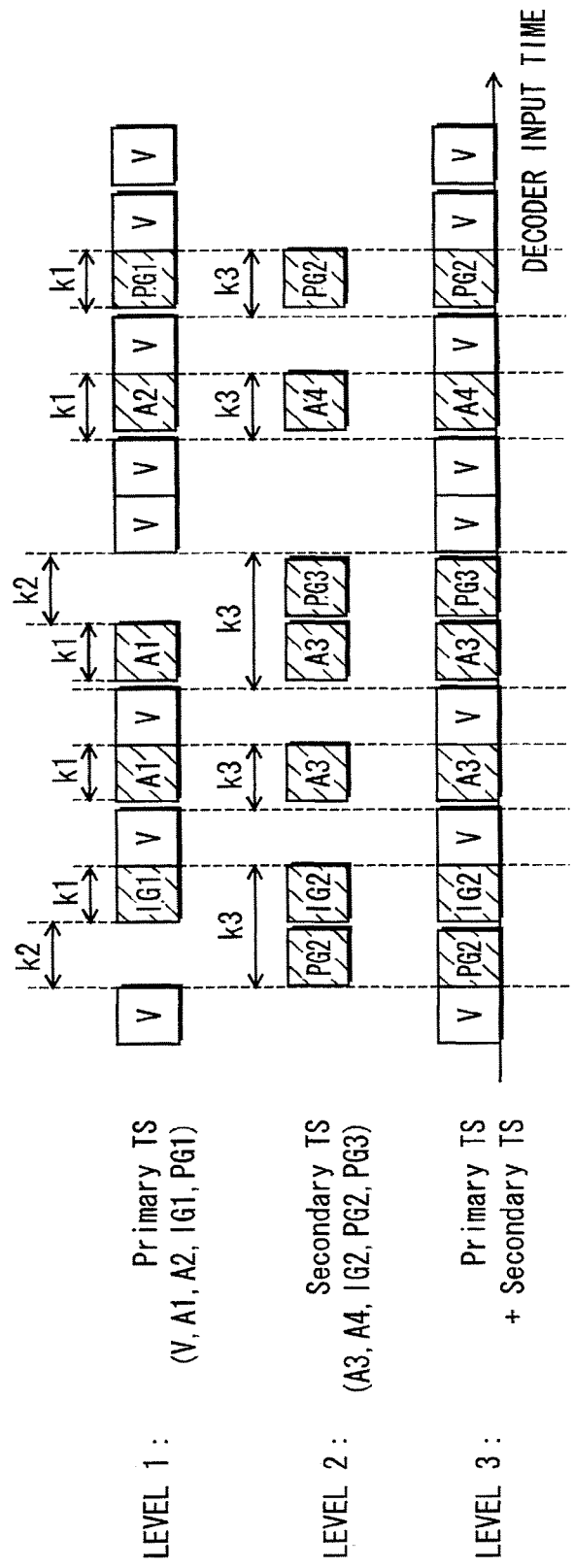
FIG. 39 schematically shows, in the case where a subtitle (PG) and a menu (IG) are also replaced in addition to audio, the way multiple TS packets constituting the Primary TS and multiple TS packets constituting the Secondary TS are multiplexed together.

FIG. 39 schematically shows, in the case where a subtitle (PG stream) and a menu (IG stream) are also replaced in addition to the audio, the way multiple TS packets constituting the Primary TS and multiple TS packets constituting the Secondary TS are multiplexed together.

In the figure, a time period k3 during which packets of the Secondary TS are transferred is the sum total of:

1) a time period k1 during which a packet whose type is the same as in the Primary TS is transferred; and 2) a time period during which the Primary TS is not being transferred.

The above rules 1) and 2) are applied in the same manner to other types of streams (Video, IG, PG and the like) stored in the Secondary TS. Therefore, it is efficient if, for each stream, a judgment is first made whether the stream can be multiplexed into the Secondary TS during the time period when a packet whose type is the same as in the Primary TS is transferred, and when the judgment is negative, multiplexing is performed in the time period during which no Primary TS is being transferred.

<Process of Multiplexer 60>

The following specifically describes the process of the multiplexer 60 of the present embodiment.

To realize the multiplexing described above, the multiplexer 60 simulates, according to a decoder model, the state of the buffer entered when a Primary TS is played back, and finds a time period for transferring each packet of the Primary TS and a time period for no Primary TS being transferred. After finding these time periods, the multiplexer 60 converts each PES packet constituting the Secondary TS into TS packets so that each of the PES packets is transferred during the time period when a packet whose type is the same as in the Primary TS is transferred or during the time period when the Primary TS is not being transferred, and attaches an ATS to each TS packet. Since an ATS attached in this way indicates the time period when a packet whose type is the same as in the Primary TS is transferred or the time period when the Primary TS is not being transferred, each PES packet constituting the Secondary TS is sent to the decoder during the time period when a packet whose type is the same as in the Primary TS is transferred or the time period when the Primary TS is not being transferred, as shown in FIG. 39.

<Supply by DVD>

In the case when elementary streams supplied from the local storage are made not in the transport stream format but in the program stream format, the multiplexer 60 converts PES packets constituting the elementary streams into packs, and an SCR (System Clock Reference) is attached to the TS header of each pack. An SCR attached in this way also indicates, like an ATS, the time period when a packet whose type is the same as in the Primary TS is transferred or the time period when the Primary TS is not being transferred. Therefore, each PES packet constituting a Secondary PS (a program stream supplied from the local storage) is sent to the decoder during the time period when a packet whose type is the same as in the Primary PS (a program stream supplied from the BD-ROM) or the time period when the Primary TS is not being transferred, as shown in FIG. 39. In the case when elementary streams supplied from the local storage are made in the program stream format, the time period when a packet whose type is the same as in the Primary TS is transferred or the time period when the Primary TS is not being transferred are expressed in large units of time, pack (PES packet). Therefore, burden when the authoring is performed is significantly less, which facilitates the Out_of_MUX application to be realized. This is an advantage when the Out_of_MUX application is realized on a DVD playback apparatus.

Thus, the present embodiment performs multiplexing by selecting, as input periods for packets constituting the Secondary TS, the time period when a packet whose type is the same as in the Primary TS is transferred or the time period when the Primary TS is not being transferred. This facilitates the restriction of the bit amount shown in Embodiment 1 to be satisfied. Realizing such multiplexing on the authoring system of Embodiment 2 makes it easier to produce a movie performing the Out_of_MUX application. Herewith, a guarantee of no occurrence of an overflow during the playback can be easily realized when the authoring is performed.

Embodiment 5

In the present embodiment, an audio mixing application is explained in detail. This application includes an exception to the Out_of_MUX rule of selecting only one elementary stream for each type. That is, the audio mixing application simultaneously selects an audio stream for the Primary TS and an audio stream for the Secondary TS at the same time, and decodes two audios, an audio of the Primary TS and an audio of the Secondary TS, at the same time.

Figure 40:
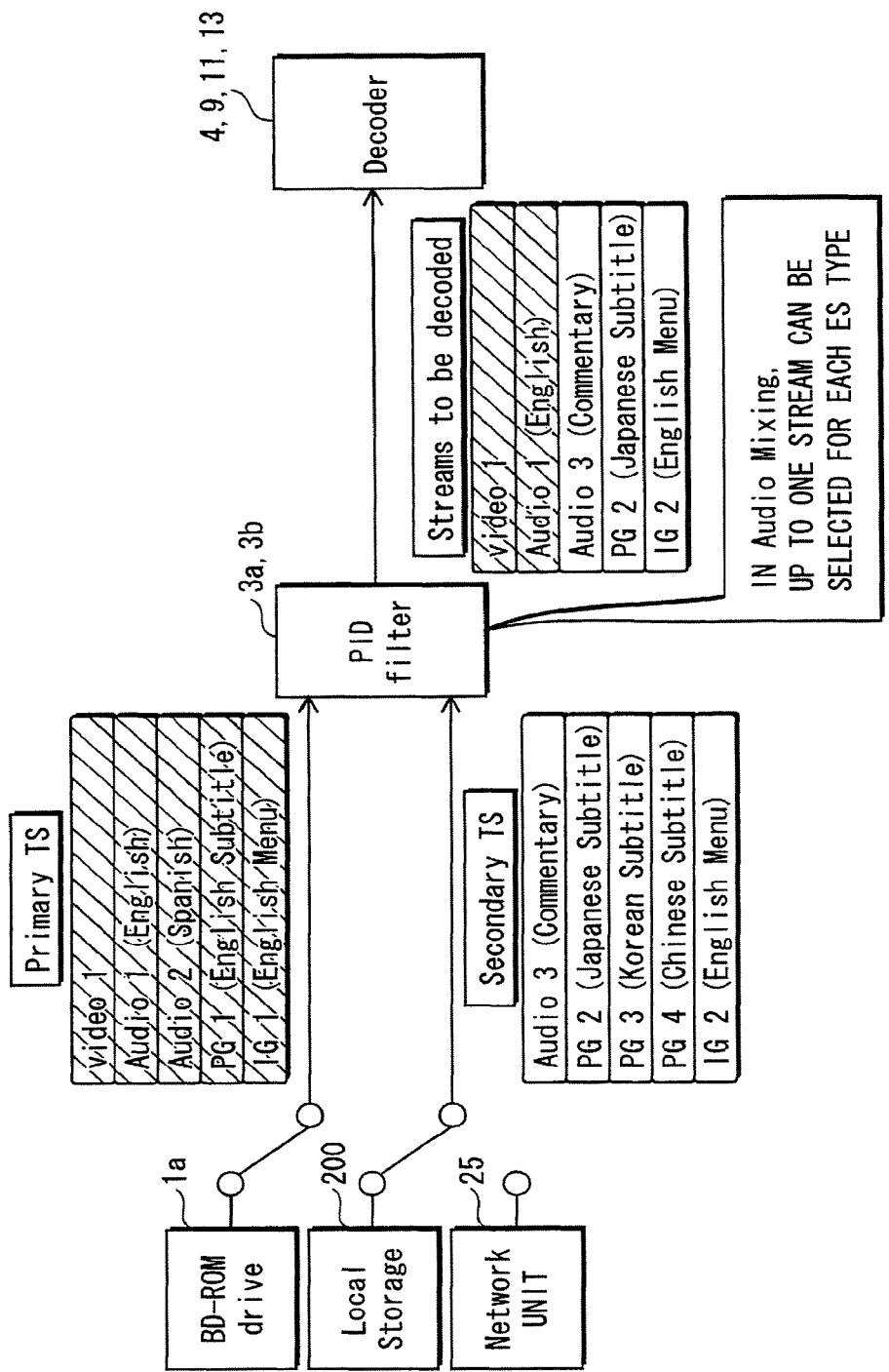
FIG. 40 shows the way a Primary TS and a Secondary TS constituting an audio mixing application are supplied to a decoder within the BD-ROM playback apparatus.

FIG. 40 shows the way a Primary TS and a Secondary TS constituting the audio mixing application are supplied to the decoder in the BD-ROM playback apparatus. In the figure, among the internal structural components of the BD-ROM playback apparatus, a BD-ROM drive 1a, the local storage 200 and a network unit 25 are shown on the left side while the respective decoders are shown on the right side. A PID Filter that performs stream demultiplexing is shown in the center. Primary TS (Video 1, Audio 1 (English), Audio 2 (Spanish), PG 1 (English Subtitle), IG 1 (English Menu)) and the Secondary TS (Audio 3 (Commentary), PG 2 (Japanese Subtitle), PG 3 (Korean Subtitle), PG 4 (Chinese Subtitle), IG 2 (English Menu)) in the figure are transport streams supplied from the BD-ROM and the local storage, respectively. Since only English (Audio 1) and Spanish (Audio 2) are recorded on the disk, the commentary of the movie director cannot be selected on the disk. However, by downloading, to the local storage, the Secondary TS which includes Audio 3 provided by the content provider, the English audio (Audio 1) and Audio 3 (Commentary) can be sent to the decoder. Then, the decoder mixes the English audio (Audio 1) and Audio 3 (Commentary) and outputs the result, which allows the user to play back, together with the video (Video 1), the English audio to which the commentary is attached.

Here, the only difference from the Out_of_MUX application is decoding two audio streams at the same time. With any Primary TS, the case may occure where a directory's commentary audio, for example, is desired to be added after the release of the disk. Accordingly, a restriction on the bit rate of the Primary TS is not preferable, and therefore a restriction on the Secondary TS is introduced as in the case of the Out_of_MUX application. Since the audio mixing needs to decode an audio in addition to each elementary stream (a video, an audio, a subtitle and a menu), two recources to the audio decoder are necessary.

<Structures of Primary and Secondary Audio Streams>

In the realization of the audio mixing application, an audio stream that will belong to a Primary TS is referred to as a primary audio stream while an audio stream that will belong to a Secondary TS is referred to as a secondary audio stream. The following describes such primary and secondary audio streams.

There are 32 primary audio streams, each of which has a different PID from among 0x1100 to 0x111F. On the other hand, similar to the primary streams, there are 32 secondary audio streams, each of which has a different PID from among 0x1A00 to 0x1A1F.

The difference of the secondary audio streams from the primary audio streams is that audio frames of the secondary audio streams include metadata made up of "downmixing information" and "gain control information".

The "downmixing information" is information for downmixing. Downmixing is a conversion that reduces the number of the audio playback channels less than the number of the encoded channels. The downmixing information specifies a conversion factor matrix for downmixing, and thereby causes the playback apparatus to perform downmixing. Playing back a 5.1 ch audio stream after converting it into a 2 ch audio stream is one example of downmixing.

The "gain control information" is information for increasing or decreasing a gain of the audio output of a primary audio stream; however, the gain control information here only has to decrease the gain. Thus, the metadata of a secondary audio stream is able to decrease, in real time, the output of a primary audio stream which is played back with the secondary audio stream at the same time. In the case of superimposing a Secondary audio onto a Primary audio, since a pair of a Primary audio and a Secondary audio to be mixed is known in advance, there is no need to control the gain of the two audios in real time. In this case, mixing (superposition) can be realized well by only reducing the gain of the Primary audio while keeping the gain of the Secondary audio unchanged. By providing such metadata, it is possible to avoid occurrence of adding up the output sound volume of the primary audio stream playback and the output sound volume of the secondary audio stream playback and, in this way, damaging the speakers. Thus concludes the audio streams of the present embodiment. Improvements of the PlayList information of the present embodiment are described next.

<STN_table for Realizing Audio Mixing Application>

Elementary streams of the same type are to be decoded by the decoder at the same time, and therefore regarding the PlayList information of the present embodiment, multiple primary audio streams and multiple secondary audio streams allowed to be played back are shown in the STN_table of each PlayItem.

The following describes the STN_table of the present embodiment. To realize the audio mixing application, pairs of Stream_entry and Stream_attribute in the secondary audio streams are present in STN_table in addition to pairs of Stream_entry and Stream_attribute in the primary audio streams. Each pair of Stream_entry and Stream_attribute in the secondary audio streams is associated with Comb_info_Secondary_audio_Primary_audio.

(Comb_info_Secondary_audio_Primary_audio)

Comb_info_Secondary_audio_Primary_audio uniquely specifies one or more primary audio streams with which the playback output of the secondary audio stream can be mixed. This allows for, when the authoring is performed, making a setting of the necessity of mixing according to the audio attribute so that, for example, a secondary audio stream is not mixed when a primary audio stream having a predetermined attribute is to be played back while a secondary audio stream is mixed when a primary audio stream having an attribute other than the predetermined attribute is to be played back.

(sp_connection_condition Information)

In PlayList information, the same value as connection_condition information of the PlayItem information is set for sp_connection_condition information of a SubPlayItem. Therefore, when connection_condition information of PlayItem information is "=5", sp_connection_condition information of SubPlayItem information is also set as "SP_CC=5". In addition, In_Time and Out_Time of SubPlayItem information shows the same points of time as In_Time and Out_Time of PlayItem information.

Thus concludes the improvement of the recording medium of the present embodiment. The internal structure of the playback apparatus of the present embodiment is described next.

<Internal Structure of Playback Apparatus>

Figure 41:
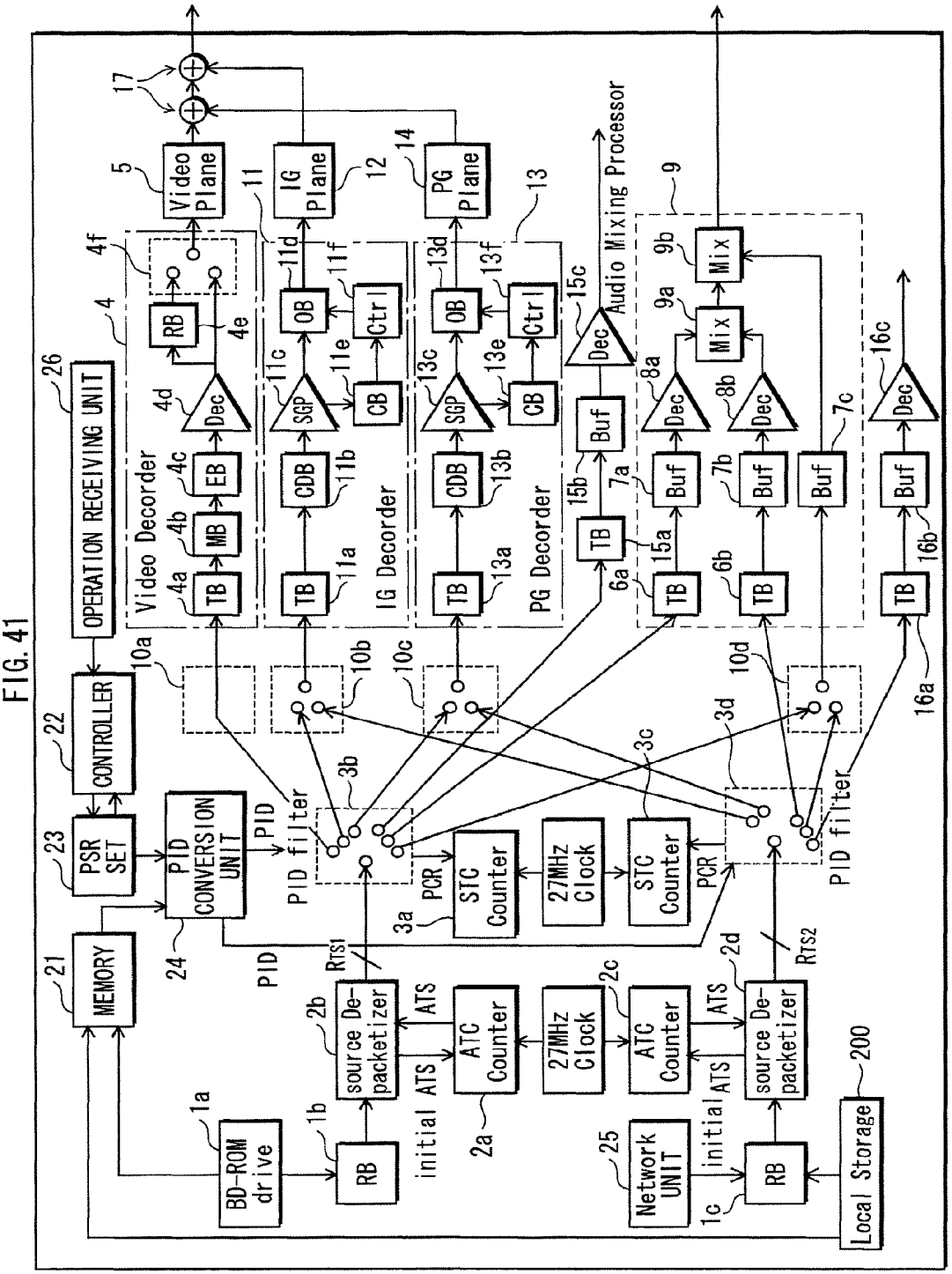
FIG. 41 shows an internal structure of the playback apparatus according to Embodiment 5.

FIG. 41 shows an internal structure of the playback apparatus according to Embodiment 5. The TB 6, EB 7 and audio decoder 8 are replaced with an audio mixing processor (enclosed by the dotted lines), as shown in the figure. The audio mixing processor inputs two audio streams from a Primary TS and a Secondary TS, decodes them at the same time, and mixes them. The rest of the internal structure is the same as that for realizing the Out_of_MUX application. The audio mixing processor is described next. The audio mixing processor is composed of: transport buffers 6a and 6b; EBs 7a and 7b; a preload buffer 7c; audio decoders 8a and 8b; and mixers 9a and 9b.

The transport buffer 6a stores therein TS packets having PIDs of audio streams and output from the PID filter 3b in a first-in first-out manner, and sends the TS packets to the audio decoder 8a.

The transport buffer 6b stores therein TS packets having PIDs of audio streams and output from the PID filter 3d in a first-in first-out manner, and sends the TS packets to the audio decoder 8b.

The EB 7a is a buffer that stores therein PES packets obtained by converting the TS packets stored in the buffer 6a.

The EB 7b is a buffer that stores therein PES packets obtained by converting the TS packets stored in the buffer 6a.

The preload buffer 7c is a memory for preloading sound.b-dmv file read from the BD-ROM/local storage. The sound.b-dmv file is a file that stores therein audio data to be output in response to an operation made on the menu.

The audio decoder 8a decodes PES packets constituting a Primary TS to thereby obtain noncompressed audio data in the LPCM state, and outputs the obtained audio data. This achieves a digital output of an audio stream.

The audio decoder 8b decodes PES packets constituting a Secondary TS to thereby obtain noncompressed audio data in the LPCM state, and outputs the obtained audio data. This achieves a digital output of an audio stream.

The mixer 9a mixes digital audio in the LPCM state output from the audio decoder 8a and digital audio in the LPCM state output from the audio decoder 8b.

The mixer 9b mixes digital audio in the LPCM state output from the mixer 9a and sound data stored in the buffer 7c. This mixing operation by the sound mixer 9b is realized by that the controller 22 decodes a navigation command intending to emit a clicking sound.

Thus concludes the description of the playback apparatus of the present embodiment.

<Verification on Audio Mixing Application>

Since the audio mixing application is composed of primary audio streams and secondary audio streams, as described above, the verification as shown in Embodiment 2 is conducted assuming that a primary audio stream and a secondary audio stream have been read at the same time. Specifically speaking, the Window is shifted by one packet each time on the ATC time axis to which the MainClip and SubClip refer. This shifting procedure is the same as one shown in the flowchart of FIG. 35. On each coordinate of the ATC time axis indicated by an ATS, a stream having the highest calculated bit rate is selected with respect to each type of a video stream, multiple primary audio streams, multiple secondary audio streams, multiple PG streams and multiple IG streams. The highest bit rate of the video stream, the highest bit rate of the primary audio stream, the highest bit rate of the secondary audio stream, the highest bit rate of the PG stream and the highest bit rate of the IG stream are summed, and a judgment is made whether the sum total is 48 Mbits or less. If the sum total exceeds 48 Mbits, it is determined that there is a violation of the BD-ROM standardization.

Thus, according to the present embodiment, it is guaranteed that the bit amount per second does not exceed a predetermined upper limit even when primary and secondary audio streams are read both from the BD-ROM and local storage at the same time and supplied to the decoders for primary and secondary audio streams. With such a guarantee, the audio mixing application can be created efficiently. This enables a supply system that downloads, to the local storage, additional contents that realize the audio mixing application and supplies them to the decoder from the local storage. Therefore, a supply arrangement for, for example, adding a commentary after shipment of the BD-ROM can be readily realized.

Embodiment 6

In Embodiment 1, connection points between PlayItems and between SubPlayItems are matched by matching In_Times and Out_Times of PlayItems and In_Times and Out_Times of SubPlayItems. On the other hand, the present embodiment does not require the connection points to be matched and allows some degree of time difference in order to realize audio mixing.

In the case of allowing the time difference, another restriction is required. The above-mentioned process of changing STCs is performed at seamless connections between PlayItems and between SubPlayItems, and this changing process is performed when the decoder is in the free-run state. Here, in the seamless connection, the decoder cannot move to synchronous control until an STC returns, and therefore a seamless connection involving an STC change cannot be accepted frequently due to implementation issues. Accordingly, the connection points of CC=5 continuing both in PlayItems and SubPlayItems should controlled to occure at a predetermined interval (e.g. three seconds or so) from each other.

Figure 42:
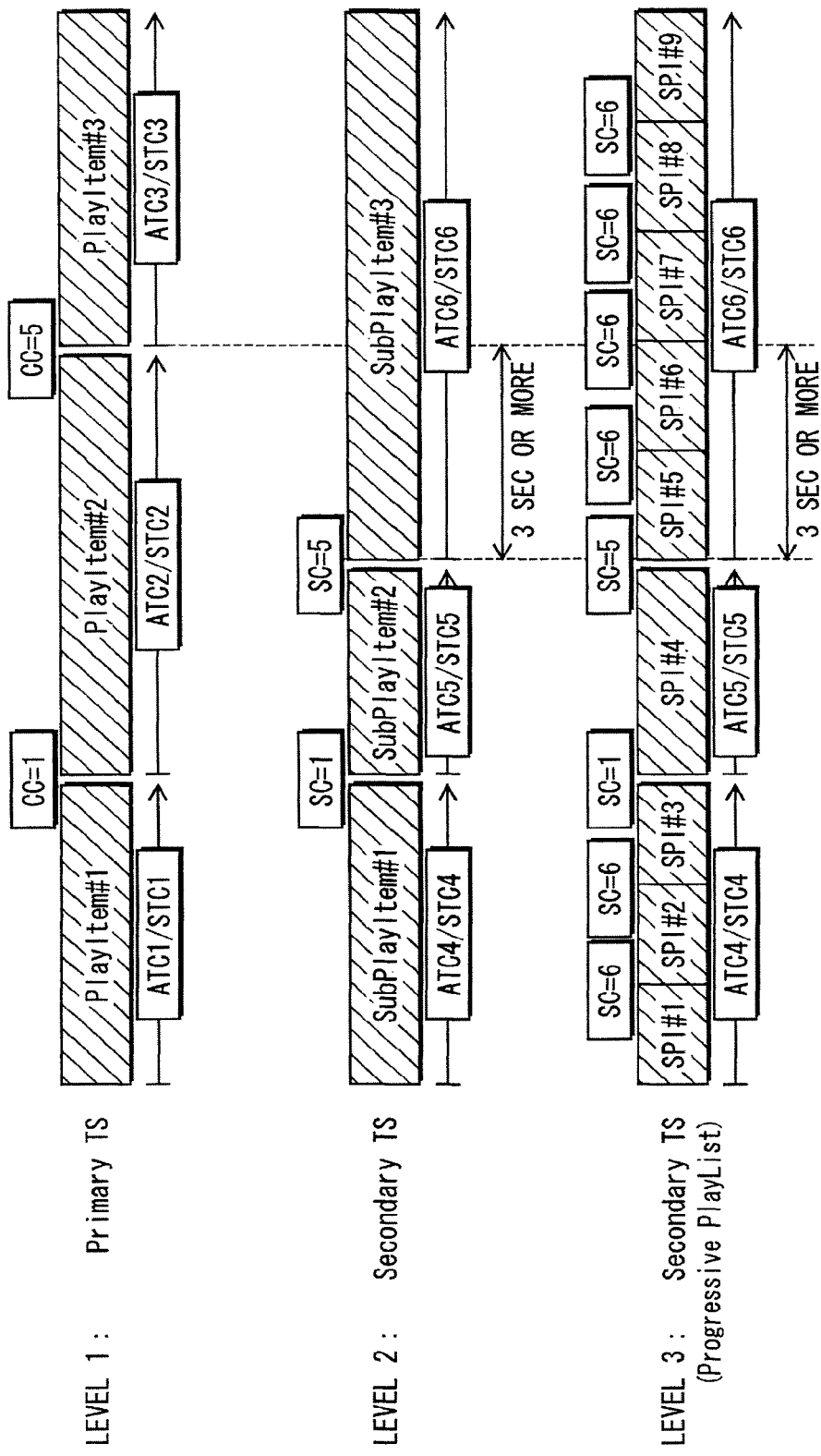
FIG. 42 shows a correlation between PlayItems and SubPlayItems specified by a PlayList indicating audio mixing.

FIG. 42 shows a correlation between PlayItems and SubPlayItems specified by a PlayList indicating audio mixing. Level 1 of FIG. 42 shows three PlayItems (PlayItem information #1, PlayItem information #2 and PlayItem information #3) in PlayList information. These three PlayItems specify a Primary TS, and the connection between PlayItem information #1 and #2 is set to CC=1 while the connection between PlayItem information #2 and #3 is set to CC=5. Level 2 of FIG. 42 shows three SubPlayItems (SubPlayItem #1, SubPlayItem #2 and SubPlayItem #3) in PlayList information. These three SubPlayItems specify a Secondary TS, and the connection between SubPlayItems #1 and #2 is set to CC=1 while the connection between SubPlayItems #2 and #3 is set to CC=5. Level 3 of FIG. 42 shows nine SubPlayItems (SubPlayItem #1, SubPlayItem #2, SubPlayItem #3 to SubPlayItem #9) in the Progressive PlayList information. These nine SubPlayItems specify a Secondary TS. Here, the connection between SubPlayItems #3 and #4 is set to CC=1, the connection between SubPlayItems #4 and #5 is set to CC=5, and the remaining connections are set to CC=6.

In the figure, the start of SubPlayItem #3 of Level 2 is 3 seconds before the start point of PlayItem #3 of Level 1. Similarly, the start point of SubPlayItem #5 of Level 3 is 3 seconds before the start point of PlayItem #3 of Level 1.

The time interval for changing the STC time axes of the PlayItems and SubPlayItems is 3 seconds, and therefore the change of the STC time axes does not occur too often.

The timing of CC=1 for PlayItems is set in accordance with SP_CC=1. This is for preventing the playback of PlayItems and SubPlayItems from getting out of synchronization in the case where only playback of the SubPlayItems is continued when the connection is nonseamless with CC=1.

The connection mode of connecting SubPlayItems with SP_CC=5 in the middle of PlayItems becomes useful when both a theatrical version and a director's cut are stored on a single disk.

Level 1 of FIG. 43 shows one example of PlayList information constituting both a theatrical version and a director's cut. Within the PlayList information, the director's cut is composed of PlayItem #1, PlayItem #2 and PlayItem #4 while the theatrical version is composed of PlayItem #1, PlayItem #3 and PlayItem #4. Thus, since PlayItem #1 and PlayItem #4 are shared by the two versions, titles can be created effectively. Because the part of video in each version different from the other is shorter than the entire length of the video, the data volume recorded on the disk can be reduced effectively. Level 2 of FIG. 43 shows an example in which commentaries corresponding to PlayItem #1, PlayItem #2 and PlayItem #4 of Level 1 are defined as one SubPlayItem and commentaries corresponding to PlayItem #1, PlayItem #3 and PlayItem #4 are defined as another SubPlayItem. In this case, the commentaries corresponding to PlayItem #1 and PlayItem #4 have to be prepared for each of the two SubPlayItems, which is unfavorable in terms of the volume of data.

Level 3 of FIG. 43 shows an example in which SubPlayItems (SubPlayItem #1, SubPlayItem #2, SubPlayItem #3 and SubPlayItem #4) each corresponding to PlayItem #1, PlayItem #2, PlayItem #3 and PlayItem #4 are defined. Assume that the connections of SubPlayItem #1 with SubPlayItem #2 and with SubPlayItem #3 as well as the connections of SubPlayItem #2 with SubPlayItem #3 and with SubPlayItem #4 are CC=5. These connection points occur at points of time apart from the connection points of PlayItems. That is, on the commentary side, branching to SubPlayItem #2 or SubPlayItem #3 is caused 3 seconds before PlayItem #1 ends, using CC=5 (or CC=6).

In addition, branching to SubPlayItem #4 is caused 3 seconds after PlayItem #2 and PlayItem #3 end, using CC=5 (or CC=6). The starts of SubPlayItem #2 and SubPlayItem #3 and the start of SubPlayItem #4 are respectively 3 seconds apart from the starts of PlayItem #2 and PlayItem #3 and the start of PlayItem #4. By providing such time intervals, the change of the STC time axes does not occur too often.

In a precise sense, CC=5 is required only to cause a return from SubPlayItem #3 to SubPlayItem #4 (seamless connection at which the ATC/STC time axes are reset), and CC=6 can be used instead of CC=5 for the remaining branchings.

Thus, according to the present embodiment, since In_Time and Out_Time of PlayItems do not match In_Time and Out_Time of SubPlayItems, the synchronization of the ATC counters $2a$ and $2c$ as well as the STC counters $3a$ and $3c$ is not necessary, which increases the freedom of design of playback apparatuses.

Embodiment 7

In Embodiment 6, the primary and secondary audio streams are targets of the restriction of the bit amount when they are read from the BD-ROM and the local storage at the same time and supplied to the decoder. The present embodiment explains the restriction of the bit amount imposed when Picture in Picture (PiP) playback application is realized.

PiP playback is, when MainClips constituting moving images are specified by MainPath information of PlayList information and SubClips constituting another set of moving images are specified by SubPlayItem information of PlayList information, technology for displaying the former moving images (Primary Video) and the latter moving images (Secondary Video) on the same screen. Here, the Primary Video is composed of HD images while the Secondary Video is composed of SD images. The HD images have a resolution of 1920×1080 with a frame clock cycle of 3750 (alternatively 3753 or 3754), like a film material. The SD images have a resolution of 720×480 with a display clock cycle of 1501 like an NTSC material or with a frame clock cycle of 1800 like a PAL material.

The SD images have about ¼ the resolution of the HD images, and therefore if the Primary Video, which is HD images, and the Secondary Video are displayed on the same screen, the size of the Secondary Video is about ¼ in relation to the Primary Video.

Here, assume that the Secondary Video is moving images in which only the director and/or the cast appear and give a performance of, for example, pointing at the video content of the Primary Video. In this case, by combining the video content of the Secondary Video with the video content of the Primary Video, it is possible to realize an amusing screen effect where the movie director and/or cast is giving commentary while pointing at the contents in the playback video of the movie.

<PlayList Information of Present Embodiment>

A video stream for the Secondary Video (secondary video stream) is specified by multiple pieces of SubPlayItem information in SubPath information of PlayList information. To such SubPlayItem information, information elements of PiP_Position and PiP_Size are newly added.

"PiP_Position" indicates, using X and Y coordinates on the screen plane used for the playback of the Primary Video, a position at which the playback video of the Secondary Video is to be located.

"PiP_Size" indicates the height and width of the playback video of the Secondary Video.

Additionally, sp_connection_condition information of SubPlayItems in the present embodiment is set to "=5". This means a guarantee of a seamless connection between a secondary video stream multiplexed into SubClips of the current SubPlayItem and a secondary video stream multiplexed into SubClip of the previous SubPlayItem. sp_connection_condition information of such SubPlayItems is set to the same value as connection_condition information of PlayItem information. Therefore, if connection_condition information of PlayItem information is "=5", sp_connection_condition information of SubPlayItem information must also be set to "=5". That is, if the primary video stream on the PlayItem side is seamlessly connected, the secondary video stream on the SubPlayItem side must be seamlessly connected. In addition, In_Time and Out_Time of SubPlayItem information must indicate the same points of time as In_Time and Out_Time of PlayItem information.

Thus concludes the description of the recording medium of the present embodiment.

<Improvement of Playback Apparatus of Present Embodiment>

The following explains improvements of the playback apparatus. In order to perform decode processing of secondary video streams, the hardware of the playback apparatus of the present embodiment includes another set of structural elements used to decode the video streams. Here, the structural elements used to decode the video streams are: a transport buffer; a multiplexed buffer; an elementary buffer; a decoder; and a video plane, and decode secondary video streams. In addition, the playback apparatus of the present embodiment includes a scaller and a synthesis unit described hereinafter.

The scaller enlarges or reduces the size of the playback video in the Secondary Video plane based on the height and width indicated by PiP_Size of SubPlayItem information.

The synthesis unit realizes PiP playback by synthesizing playback video, the size of which has been enlarged by the scaller, and playback video obtained by the video decoder. The synthesis of the playback video of the Primary Video and the playback video of the Secondary Video is performed in accordance with PiP_Position specified by SubPlayItem information. Herewith, synthesized video which is created by synthesizing the playback video of the Primary Video and the playback video of the Secondary Video can be played back. The synthesis unit is able to perform Chroma-key synthesis, layer synthesis and the like, and perform a process of, for example, removing the background of the Secondary Video, extracting image of a person, and synthesizing the image of the person with the playback video of the Primary Video. Thus concludes the description of the playback apparatus of the present embodiment.

<Verification on PiP Application>

In the case where a video stream which is a primary TS (primary video stream) and a video stream which is a secondary video stream (secondary video stream) are read at the same time and supplied to the decoder in order to realize PiP playback, the primary and secondary video streams are targets for verification for restricting the bit amount.

Specifically speaking, as the Window is shifted on the ATC time axis, a stream having the highest calculated bit rate is selected, on each coordinate of the ATC time axis indicated by an ATS, with respect to each type of primary video stream, secondary video stream, multiple primary audio streams, multiple secondary audio streams, multiple PG streams and multiple IG streams. The highest bit rate of the primary video stream, the highest bit rate of the secondary video stream, the highest bit rate of the primary audio stream, the highest bit rate of the secondary audio stream, the highest bit rate of the PG stream and the highest bit rate of the IG stream are summed, and a judgment is made whether the sum total is 48 Mbits or less.

Thus, according to the present embodiment, it is guaranteed that the bit amount per second does not exceed a predetermined upper limit even when primary and secondary video streams are read both from the BD-ROM and local storage at the same time and supplied to the respective decoders. With such a guarantee, the PiP application can be created efficiently.

(Supplementary Notes)

The best modes for carrying out the invention, as far as known to the applicant at the time of filing the present application, have been described. However, further improvements or modifications can be made on the present invention in terms of the following technical topics. It should be noted here that whether or not to make such improvements or modifications is optional, and depends on the implementer of the invention.

(In_Time, Out_Time)

In FIG. 27, the last Video Presentation Unit of TS1 is selected for Out_Time of the previous PlayItem while the first Video Presentation Unit of TS2 is selected for In_Times of the previous PlayItem and the previous SubPlayItem. Instead, however, a middle Video Presentation Unit in TS1 may be selected for Out_Time of the previous PlayItem while a middle Video Presentation Unit in TS2 may be selected for In_Times of the current PlayItem and the current SubPlayItem. In this case, seamless connections cannot be realized for the current PlayItem and the current SubplayItem, and they must be connected using CC=1 and SP_CC=1.

(All Playlist Information)

When it is desired to connect two PlayItems with CC=5, all PlayItem information and all SubPlayItem information that belong to one piece of PlayList information must be connected with CC=5.

(Data Amount Supplied to Decoder)

As to the Out_of_MUX, the data amount supplied to the decoder does not always become large. For example, assume the case in which the primary audio stream is a MainClip and is composed of DD (Dolby Digital) of CBR and MLP of VBR, and the MLP is replaced with the DD of the CBR supplied from the local storage. In this case, the data amount supplied to the decoder is in fact decreased. If the occurrence is obvious, the verification process can be omitted.

(Difference in Playback Times)

In order to realize CC=5 and SP_CC=5, it is desirable if a difference in playback time of the video and audio streams in one PlayItem is small. An allowable difference may be: a time period equivalent to one video frame (1/60 to 1/25 seconds); one second or less; a time period corresponding to a certain percentage of the entire playback period (e.g. 1% or less); or a combination of two of these. This is also the case for a difference in playback time of the video and audio streams in one SubPlayItem.

In the case where two elementary streams are stored in one PID, it is desirable that a difference in playback time of the two streams stored in the same PID is the same as or less than the minimum playback unit (1 frame) of a stream having a shorter playback time. This condition can be realized by storing Dolby Digital (AC-3) and MLP (Meridian Lossless Packing) in a single elementary stream and then recording the elementary stream on the BD-ROM.

(Processing of Additional Contents)

It is desirable to make the initial setting of the playback apparatus in a manner that additional contents downloaded to the local storage 200 will be automatically deleted when several months or several years have elapsed after the downloading.

(Substitution of PID)

When the audio mixing application is realized, PIDs are used to distinguish between the primary and secondary audio streams; when MPEG2-PG is used, however, it is desirable to make stream id of PES packet headers different from each other.

In addition, the primary and secondary audio streams only have to be distinguished on a system stream level so that two audio streams can be differentiated by one demultiplexer. Alternatively, before multiplexing two streams, PIDs of one of the streams may be changed to different PIDs.

(Preloading)

It is desirable that preloading of audio data (a file "sound.bdmv") for a clicking sound is performed when the BD-ROM is being loaded or when a title is switched. This is because, if reading of the file sound.bdmv is attempted during the playback of an AVClip, a seek operation of optical pickup for reading a file different from the AVClip is caused. On the other hand, when the BD-ROM is being loaded or when a title is switched, it is rare that the playback of an AVClip is being continued. Therefore, by reading the file sound.bdmv at such a timing, it is possible to enhance the responsivity of the apparatus and make it difficult to cause interruption of the AVClip playback.

(Java™ Platform)

A Java™ platform can be structured by fully mounting, on the playback apparatus of each embodiment, the Java™ 2 Micro_Edition (J2ME) Personal Basis Profile (PBP 1.0) and the Globally Executable MHP specification (GEM1.0.2) for package media targets, and then the playback apparatus may be caused to perform a BD-J application. To perform the application, the playback apparatus may be caused to perform the Out_of_MUX framework.

(Title)

It is preferable to create a "module manager" in the playback apparatus, which selects a title according to the mount of the BD-ROM, a user operation, or a state of the apparatus. The decoder in the BD-ROM playback apparatus performs playback of an AVClip based on the PlayList information according to the title selection by the "module manager".

When the "module manager" selects a title, the application manager executes signaling using an application management table (AMT) corresponding to a previous title and an AMT corresponding to the current title. The signaling takes control that terminates the operation of an application described in the AMT of the previous title but not described in the AMT of the current AMT while commences the operation of an application not described in the AMT of the previous title but described in the AMT of the current title.

(Directory Structure in Local Storage)

Individual areas in the local storage described in each embodiment are preferably created under a directory corresponding to a disk's root certificate of the BD-ROM.

The disk's root certificate is a root certificate that is distributed by the root certificate authority and assigned to the BD-ROM by the creator of the BD-ROM. The disk's root certificate is encoded in, for example, the X.509. The specifications of the X.509 have been issued by the International Telegraph and Telephone Consultative Committee, and described in CCITT Recommendation X.509 (1988), "The Directory—Authentication Framework".

In addition, it is preferable that the contents recorded in the BD-ROM and local storage be encoded using the Advanced Access Content System (APES), a signature information be attached thereto, and a use authorization be specified in a permission file.

(Package to be Mounted)

When the BD-ROM playback apparatus is implemented as the Java™ platform, it is desirable to mount the following BD-J Extention on the playback apparatus. The BD-J Extention includes various packages specialized to provide functions beyond GEM[1.0.2] to the Java™ platform. Packages included in the BD-J Extention are shown below.

org.bluray.media

This package provides special functions to be added to Java™ Media FrameWork. Controls for selecting angle, audio and subtitle are added to the package.

org.bluray.ti

This package includes: API for mapping "services" of GEM[1.0.2] on a "title"; a mechanism to inquire about title information from the BD-ROM; and a mechanism to select a new title.

org.bluray.application

This package includes APIs for managing active periods of an application. In addition, the package includes APIs for inquiring about information required for signaling when an application is performed.

org.bluray.ui

This package includes classes that define constants used for key events specialized for the BD-ROM and realize synchronization with video playback.

org.bluray.vfs

This package provides a mechanism (Binding Scheme) to bind contents recorded on the BD-ROM (on-disc contents) and contents in the local storage (off-disc contents), which are not recorded on the BD-ROM, in order to playback the data seamlessly indifferent to where the data is recorded.

Binding Scheme associates contents on the BD-ROM (AV-Clip, subtitle, and BD-J application) with related contents in the local storage. Binding Scheme realizes seamless playback indifferent to where the contents are recorded.

(Virtual Package)

The BD-ROM playback apparatus may be caused to perform a process of creating Virtual Package. This is realized by that the playback apparatus creates Virtual Package information. Virtual Package information is information obtained by expanding the volume management information on the BD-ROM. Here, the volume management information is information that specifies a directory-file structure existing on a recording medium, and is composed of directory management information related to the directories and file management information related to the files. Virtual Package information is designed to expand the directory-file structure of the BD-ROM by adding new file management information to the volume management information showing the directory-file structure of the BD-ROM.

(Realization of Control Procedure)

Both the control procedures explained in the above-described embodiments using the flowcharts and the control procedures of the functional components explained in the above-described embodiments satisfy the requirements for the "program invention" since the above-mentioned control procedures are realized concretely using the hardware resources and are the creation of a technical idea utilizing natural laws.

Production of Program of Present Invention

The program of the present invention is an object program that can execute on a computer. The object program is composed of one or more program codes that cause the computer to execute each step in the flowchart or each procedure of the functional components. There are various types of program codes such as the native code of the processor, and JAVA™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

The program of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language s/he uses.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way.

The program of the present invention can be used as follows. When the program of the present invention is used as an embedded program, the load module as the program is written into an instruction ROM, together with the Basic Input/Output System (BIOS) program and various pieces of middleware (operation systems). The program of the present invention is used as the control program of the playback apparatus 300 as the instruction ROM is embedded in the control unit and is executed by the CPU.

When the playback apparatus is a bootstrap model, the Basic Input/Output System (BIOS) program is embedded in an instruction ROM, and various pieces of middleware (operation systems) are preinstalled in a hard disk. Also, a boot ROM for activating the system from the hard disk is provided in the playback apparatus. In this case, only the load module is supplied to the playback apparatus via a transportable recording medium and/or a network, and is installed in the hard disk as one application. This enables the playback apparatus to perform the bootstrapping by the boot ROM to activate an operation system, and then causes the CPU to execute the installed load module as one application so that the program of the present application can be used.

As described above, when the playback apparatus is a hard-disk model, the program of the present invention can be used as one application. Accordingly, it is possible to transfer, lend, or supply, via a network, the program of the present invention separately.

(Controller 22)

The controller 22 can be realized as one system LSI.

The system LSI is obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus.

Each of the bare chips packaged in the system LSI is composed of: a front end unit; a back end unit; and a digital processing unit. The front end unit digitizes an analogue signal while the back end unit changes the obtained data into analog form and outputs it.

Each structural element shown in the diagram of the internal structure in the above embodiment is mounted in the digital processing unit.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by packaging the instruction ROM as bare chips, in which the load module as the program is stored, as the bare chip.

It is desirable to employ SoC implementation or SiP implementation for the actual implementation. The SoC (System on chip) implementation is a technique that burns multiple circuits onto one chip. The SiP (System in package) implementation is a technique that puts multiple chips in one package using resin. By the above procedure, the system LSI of the present invention can be produced based on the internal structure diagrams of the playback apparatus described in each embodiment.

It should be noted here that although the term LSI is used here, it may be called IC, LSI, super LSI, ultra LSI or the like, depending on the level of integration.

Further, part or all of the components of each playback apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

Industrial Applicability

The recording medium and playback apparatus of the present invention can be mass-produced based on the internal structures of them shown in the embodiments above. As such, the and playback apparatus of the present invention has the industrial applicability.

The invention claimed is:

1. A non-transitory recording medium on which playlist information is recorded, wherein between a first recording medium on which a primary stream is recorded and a second recording medium on which a secondary stream is recorded, the recording medium is the second recording medium, the playlist information indicates a playback path of the primary stream and a playback path of the secondary stream, the secondary stream includes additional information to be played back in association with main video included in the primary stream, the playlist information includes a plurality of playitem information pieces each defining a primary playback section of the main video, thereby indicating the playback path of the primary stream, and includes a plurality of sub-playitem information pieces each defining a secondary playback section of the additional information, thereby indicating the playback path of the secondary stream, among the playitem information pieces, one of two consecutive playitem information pieces is previous playitem information and the other is current playitem information, and among the sub-playitem information pieces, one of two consecutive sub-playitem information pieces is previous playitem information and the other current sub-playitem information, the current playitem information includes:

in_time that is time information indicating time at which playback of a primary playback section of the main video is started;

out_time that is time information indicating time at which playback of the primary playback section of the main video is ended; and connection information indicating a connection state at a boundary between the previous playitem information and the current playitem information, the current sub-playitem information includes:
in_time that is time information indicating time at which playback of a secondary playback section of the additional information is started;
out_time that is time information indicating time at which playback of the secondary playback section of the additional information is ended;
a playitem ID specifying one of the playitem information pieces with which the current sub-playitem information is played back in association;
playitem synchronization PTS information determining a time point of the current sub-playitem information, on a playback time axis of the playitem information specified by the playitem ID; and
sub-connection information indicating a connection state at a boundary between the previous sub-playitem information and the current sub-playitem information,
in a case where the playitem information specified by the playitem ID is the current playitem information, and the connection information indicates seamless playback, the sub-connection information also indicates seamless playback,
the time point determined by the playitem synchronization PTS information is equal to the in_time in the current playitem information, and the in_time of the current sub-playitem information is equal to the in_time of the current playitem information,
a video stream included in the main video whose playback section is defined by the previous playitem information and a video stream included in the main video whose playback section is defined by the current playitem information have a same resolution and a same frame rate, and
a code indicating an end of a sequence is provided at an end of a primary stream included in the main video whose playback section is defined by the previous playitem information.

2. A playback apparatus for playing back a primary stream and a secondary stream by reading information from a first recording medium on which the primary stream is recorded and a second recording medium according to claim 1, the playback apparatus having loaded therein the first and the second recording media and comprising:
a reading unit operable to read the primary and the secondary streams in accordance with playlist information recorded on the second recording medium; and
a playback unit operable to play back main video included in the primary stream, in association with additional information included in the secondary stream.

3. A recording method for recording playlist information on a recording medium, wherein
between a first recording medium on which a primary stream is recorded and a second recording medium on which a secondary stream is recorded, the recording medium is the second recording medium,
the playlist information indicates a playback path of the primary stream and a playback path of the secondary stream,
the recording method comprises the steps of:
generating application data; and
recording the application data onto the second recording medium,
the application data includes a secondary stream, and playlist information indicating a playback path of the primary stream and a playback path of the secondary stream,
the secondary stream includes additional information to be played back in association with main video included in the primary stream,
the playlist information includes a plurality of playitem information pieces each defining a primary playback section of the main video, thereby indicating the playback path of the primary stream, and includes a plurality of sub-playitem information pieces each defining a secondary playback section of the additional information, thereby indicating the playback path of the secondary stream,
among the playitem information pieces, one of two consecutive playitem information pieces is previous playitem information and the other is current playitem information, and among the sub-playitem information pieces, one of two consecutive sub-playitem information pieces is previous playitem information and the other current sub-playitem information,
the current playitem information includes:
in_time that is time information indicating time at which playback of a primary playback section of the main video is started;
out_time that is time information indicating time at which playback of the primary playback section of the main video is ended; and
connection information indicating a connection state at a boundary between the previous playitem information and the current playitem information,
the current sub-playitem information includes:
in_time that is time information indicating time at which playback of a secondary playback section of the additional information is started;
out_time that is time information indicating time at which playback of the secondary playback section of the additional information is ended;
a playitem ID specifying one of the playitem information pieces with which the current sub-playitem information is played back in association;
playitem synchronization PTS information determining a time point of the current sub-playitem information, on a playback time axis of the playitem information specified by the playitem ID; and
sub-connection information indicating a connection state at a boundary between the previous sub-playitem information and the current sub-playitem information,
in a case where the playitem information specified by the playitem ID is the current playitem information, and the connection information indicates seamless playback, the sub-connection information also indicates seamless playback,
the time point determined by the playitem synchronization PTS information is equal to the in_time in the current playitem information, and the in_time of the current sub-playitem information is equal to the in_time of the current playitem information,
a video stream included in the main video whose playback section is defined by the previous playitem information and a video stream included in the main video whose playback section is defined by the current playitem information have a same resolution and a same frame rate, and
a code indicating an end of a sequence is provided at an end of a primary stream included in the main video whose playback section is defined by the previous playitem information.

* * * * *